(12) United States Patent
Maly et al.

(10) Patent No.: US 10,924,826 B2
(45) Date of Patent: *Feb. 16, 2021

(54) MOBILE AUDIO TRANSPORTATION SYSTEM AND METHOD

(71) Applicants: Andrew Alexander Maly, Bryan, TX (US); Viktor Yevgenievich Vlassov, College Station, TX (US)

(72) Inventors: Andrew Alexander Maly, Bryan, TX (US); Viktor Yevgenievich Vlassov, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,217

(22) Filed: May 18, 2020

(65) Prior Publication Data

US 2020/0280774 A1   Sep. 3, 2020

Related U.S. Application Data

(63) Continuation-in-part of application No. 16/672,782, filed on Nov. 4, 2019, now Pat. No. 10,659,881, which is a continuation-in-part of application No. 15/648,404, filed on Jul. 12, 2017, now Pat. No. 10,469,895, which is a continuation-in-part of application No. 14/336,786, filed on Jul. 21, 2014, now abandoned.

(60) Provisional application No. 61/856,519, filed on Jul. 19, 2013.

(51) Int. Cl.
| | | |
|---|---|---|
| *H04R 1/20* | (2006.01) | |
| *H04R 1/02* | (2006.01) | |
| *B62B 1/10* | (2006.01) | |
| *H02J 7/00* | (2006.01) | |
| *H04R 1/40* | (2006.01) | |
| *B62B 5/00* | (2006.01) | |

(52) U.S. Cl.
CPC .............. *H04R 1/02* (2013.01); *B62B 1/10* (2013.01); *B62B 5/00* (2013.01); *H02J 7/0045* (2013.01); *H04R 1/403* (2013.01)

(58) Field of Classification Search
CPC ........................................ H04R 1/02
USPC ............................................. 386/201
See application file for complete search history.

(56) References Cited

U.S. PATENT DOCUMENTS

2016/0350067 A1\* 12/2016 Sundaresan ............. G06F 3/165

\* cited by examiner

*Primary Examiner* — Eileen M Adams
*Assistant Examiner* — Daniel T Tekle
(74) *Attorney, Agent, or Firm* — Kevin Mark Klughart

(57) ABSTRACT

A mobile audio transportation (MAT) system/method allowing transportation of mobile audio modules (MAMs) is disclosed. The system/method incorporates a perforated acoustic tube (PAT) in the MAM allowing speaker energy to be efficiently emitted from the mobile speaker enclosure (MSE). The PAT is configured with an enclosure alignment pathway (EAP) within the MAM allowing a stack alignment rod (SAR) to penetrate through the PAT/EAP thus capturing and securing the MAM in an aligned MAM stack (AMS). Alignment and insertion of the SAR with a stack index rod (SIR) affixed to a mobile hand truck (MHT) allows the AMS to be coupled with the MHT for transportation of the AMS. The MHT incorporates a hand truck frame (HTF), hand truck wheels (HTW), hand truck platform (HTP) and SIR, hand truck handle (HTH), charger power strip (CPS), battery charger array (BCA), and optional hand truck coupler (HTC) to facilitate AMS transportation.

20 Claims, 96 Drawing Sheets

3600

3700

4300

4600

5000

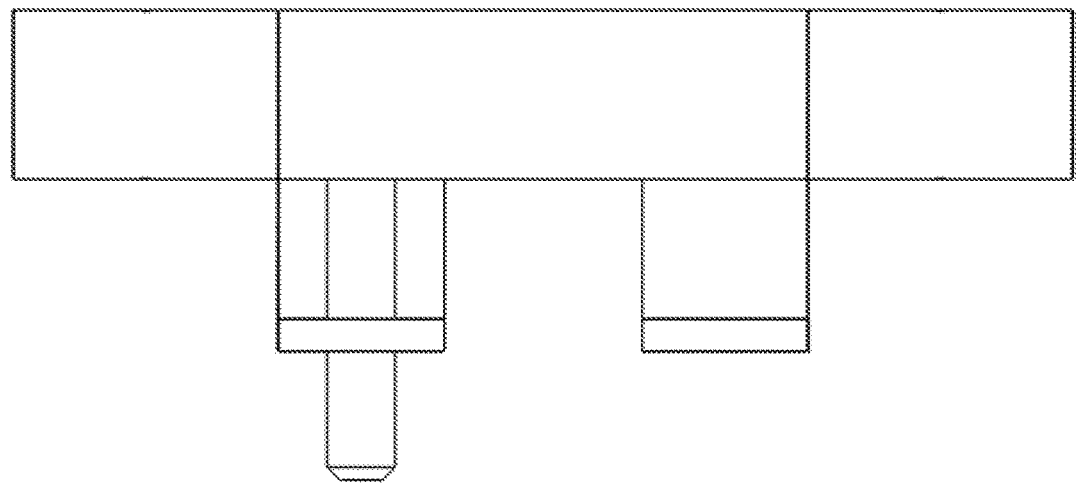
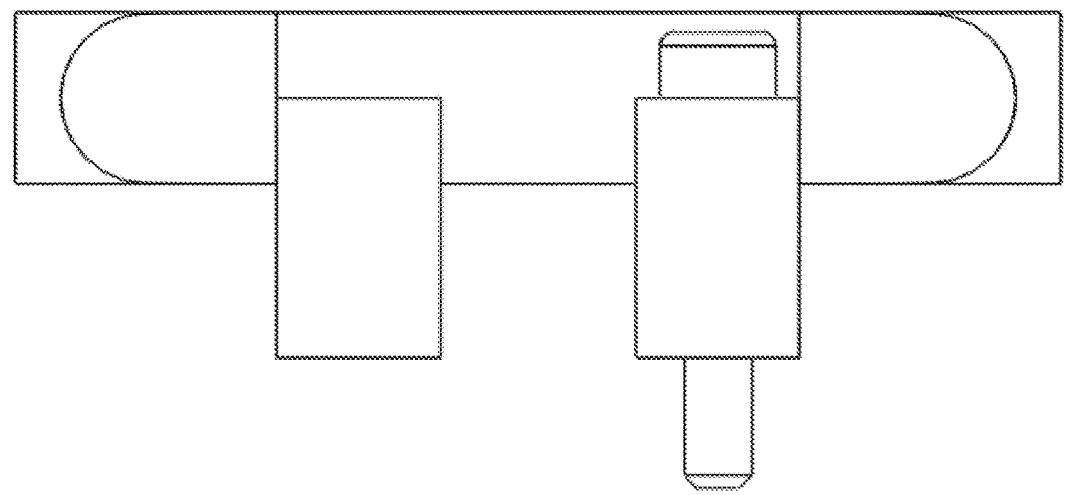
FIG. 75

9300

9600

MOBILE AUDIO TRANSPORTATION SYSTEM AND METHOD

CROSS REFERENCE TO RELATED APPLICATIONS

Continuation-in-Part Patent Application (CIP)

This is a continuation-in-part (CIP) patent application of and incorporates by reference United States Utility patent application for MOBILE AUDIO MESH DISTRIBUTION SYSTEM AND METHOD by inventor Andrew Maly, et al., filed electronically with the USPTO on 4 Nov. 2019, with Ser. No. 16/672,782, EFS ID 37644606, confirmation number 4699, issued as U.S. Pat. No. 10,659,881 on May 19, 2020.

Utility Patent Applications

U.S. Utility patent application for MOBILE AUDIO MESH DISTRIBUTION SYSTEM AND METHOD by inventor Andrew Maly, et al., filed electronically with the USPTO on 4 Nov. 2019, with Ser. No. 16/672,782, EFS ID 37644606, confirmation number 4699, issued as U.S. Pat. No. 10,659,881 on May 19, 2020 is a continuation-in-part (CIP) patent application of and incorporates by reference U.S. Utility patent application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as U.S. Pat. No. 10,469,895 on Nov. 5, 2019.

This patent application claims benefit under 35 U.S.C. 120 and incorporates by reference U.S. Utility patent application for MOBILE AUDIO MESH DISTRIBUTION SYSTEM AND METHOD by inventor Andrew Maly, et al., filed electronically with the USPTO on 4 Nov. 2019, with Ser. No. 16/672,782, EFS ID 37644606, confirmation number 4699, issued as U.S. Pat. No. 10,659,881 on May 19, 2020.

This patent application claims benefit under 35 U.S.C. § 120 and incorporates by reference U.S. Utility patent application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as U.S. Pat. No. 10,469,895 on Nov. 5, 2019.

U.S. Utility patent application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as U.S. Pat. No. 10,469,895 on Nov. 5, 2019 claims benefit under 35 U.S.C. § 120 and incorporates by reference U.S. Utility patent application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, (formerly MALY001 US0).

Provisional Patent Applications

U.S. Utility patent application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, (formerly MALY001US0) claims benefit under 35 U.S.C. § 119 and incorporates by reference U.S. Provisional Patent Application for MOBILE AUDIO/STEREO NETWORK AND SYSTEM by inventor Andrew Maly, et al., filed electronically with the USPTO on Jul. 19, 2013, with Ser. No. 61/856,519, EFSID 27287845, confirmation number 8965, (formerly MALY001USP).

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated transportation of mobile audio modules (MAMs) over a spatially diverse area. MAMs in this context typically include autonomous audio/speaker systems that are linked together using a wireless network to support dissemination of sound over a spatially diverse area. Without limitation, the present invention relates to efficient transportation and setup of these MAMs by an operator or other technician. To this end, a transportation device and method are disclosed that aid in this objective.

BRIEF SUMMARY OF THE INVENTION

The present invention allows efficient transportation of a plurality of independent spatially diverse mobile audio modules (MAMs) to present coordinated audio that is distributed over a wide geographic area. Each MAM provides for distribution of audio from an audio playback recorder (APR) and/or synchronization input from a radio frequency receiver. The system and method described permit these MAMs to be securely stacked on a mobile hand truck (MHT) to allow distribution of the MAMs as well as mass MAM battery charging when the MAMs are not in use.

The present invention is particularly well suited for deployment of MAMs as described in U.S. Pat. Nos. 10,659,881, 10,469,895, and the patent applications they include by reference. However, the present invention is not limited to this particular application context.

BRIEF DESCRIPTION OF THE DRAWINGS

For a fuller understanding of the advantages provided by the invention, reference should be made to the following detailed description together with the accompanying drawings wherein:

FIG. 75 illustrates front and back views of a preferred exemplary hand truck coupler (HTC) embodiment useful in some preferred invention embodiments;

DESCRIPTION OF THE PRESENTLY PREFERRED EXEMPLARY EMBODIMENTS

Figure 1:
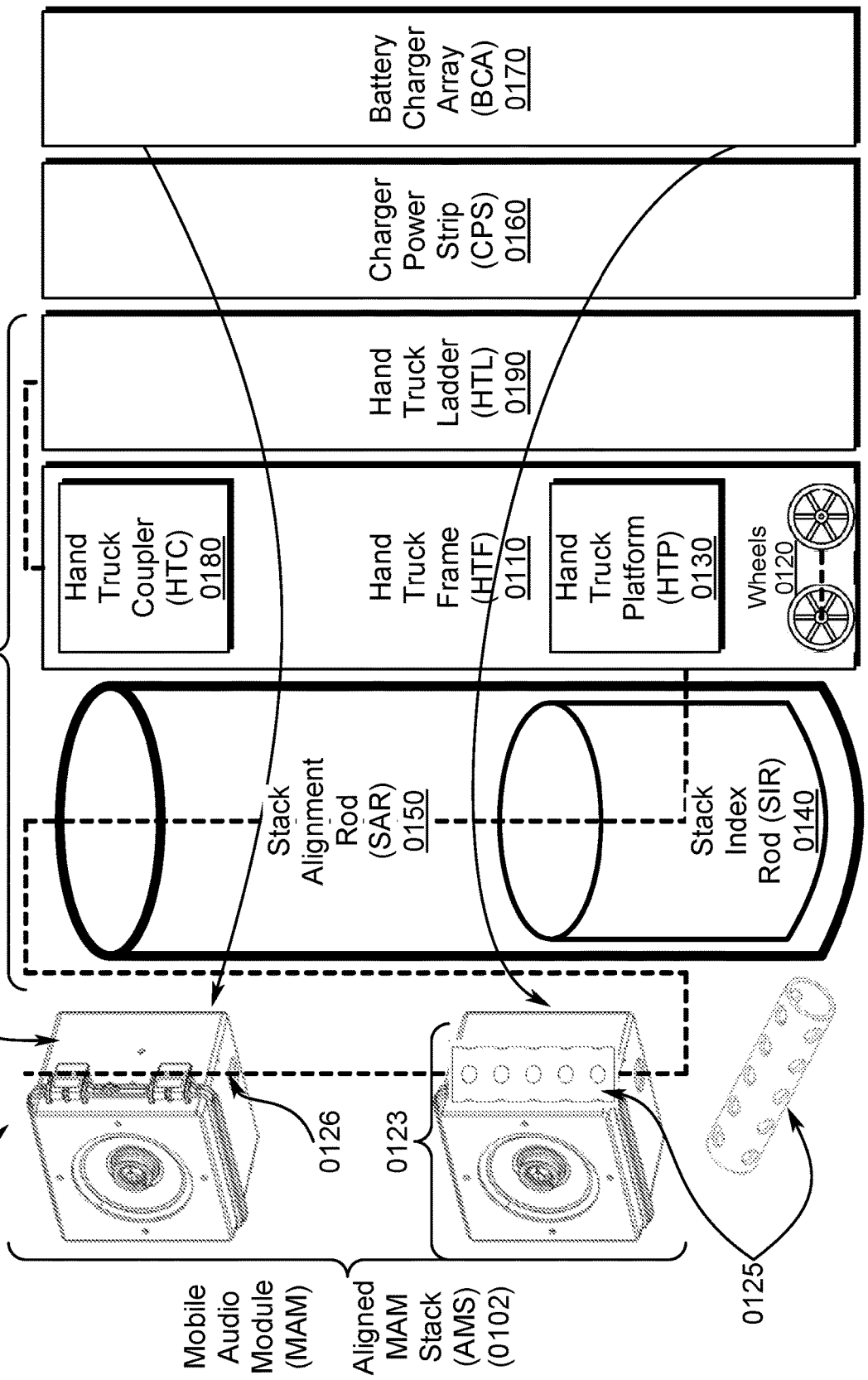
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MOBILE AUDIO TRANSPORTATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

BCA Not Limitive

While the battery charger array (BCA) is illustrated herein as having separate primary battery chargers (PBCs), some preferred embodiments may incorporate a single PBC having multiple outputs to allow charging of the plurality of MAMs retained by the MHT.

System Overview (0100)

An overview of a preferred exemplary system embodiment is illustrated in FIG. 1 (0100), wherein the system is depicted having a mobile hand truck (MHT) (0101) comprising a hand truck frame (HTF) (0110), hand truck wheels (HTW) (0120), hand truck platform (HTP) (0130), stack index rod (SIR) (0140), stack alignment rod (SAR) (0150), charger power strip (CPS) (0160), and battery charger array (BCA) (0170). The MHT (0101) may also be optionally configured with a hand truck coupler (HTC) (0180) (used to couple multiple MHTs together for unified transport) and/or a hand truck ladder (HTL) (0190) (allowing the HTF (0110) to operate as a ladder as well as transport mechanism).

The HTF (0110) is generally configured to couple to the HTW (0120) via an axle assembly with the HTW (0120) typically having two wheels to provide rolling transport of the MHT (0101). The HTP (0130) is typically in perpendicular alignment with the HTF (0110) such that it rests on the ground when the HTF (0110) is normally vertically positioned with the HTW (0120) in contact with the ground. The SIR (0140) is mechanically coupled to the HTP (0130) typically in a perpendicular alignment to provide an index point for a plurality of MAMs (aligned MAM stack (AMS)) (0102) to be stacked on the HTP (0130).

Each of the MAMs (0103) in the AMS (0102) is configured with mobile speaker enclosure (MSE) (0104) in which a perforated acoustic tube (PAT) (0105) in the MAM (0103) allows speaker energy to be efficiently emitted from the MSE (0104). The PAT is (0105) configured with an enclosure alignment pathway (EAP) (0106) within the MAM (0103) allowing the SIR (0140) and/or SAR (0150) to penetrate through the PAT (0105)/EAP (0106) thus capturing and secure the MAM (0103) in an aligned MAM stack (AMS) (0102). Insertion of the SAR (0150) through the EAP (0106) in the AMS (0102) and over the SIR (0140) on the MHT (0101) HTP (0130) serves to secure the AMS (0102) to the MHT (0101) for transportation of the AMS (0102) and MHT (0101) to a remote location.

Once the AMS (0102) is secured in place on the HTP (0130) using the SIR (0140) and SAR (0150), each of the MAMs (0103) may be optionally charged using a charger power strip (CPS) (0160) that distributes AC power to a battery charger array (BCA) (0170) that includes a plurality of primary battery chargers (PBC) configured to supply individual battery charging cables to each of the MAMs (0103) within the AMS (0102).

Once secured and optionally charged, the MHT (0101) may be inclined and transported to a desired location for deployment of the MAMs (0103) in the AMS (0102). Deployment involves removing the SAR (0150) from the EAP (0106) in the AMS (0102) and the SIR (0140) on the MHT (0101) to allow individual MAM (0103) elements of the AMS (0102) to be unstacked from the HTP (0130).

The process described above is repeated for situations in which the MAMs (0103) must be gathered for redeployment to a new location or for optional charging of batteries within the MAMs (0103).

The system as described allows multiple MHTs (0101) to be coupled together using an optional hand truck coupler (HTC) (0180) that mechanically links one MHT (0101) to another MHT (0101) for transportation my a mobile transport unit (MTU) such as a golf cart, all-terrain vehicle (ATV), or some other powered vehicle.

The system as described also anticipates a modification to the HTF (0110) in which a hand truck ladder (HTL) (0190) is configured in an A-frame fashion with the HTF (0110) to allow the MHT (0101) to function as a ladder when deployed to a remote location. This combination allows height placement of the MAMs (0103) without the need for transportation of a separate ladder implement, thus allowing one person to make a single transportation trip with the MHT (0101) that includes all tools necessary to install the MAMs (0103) in a remote location.

Method Overview (0200)

Figure 2:
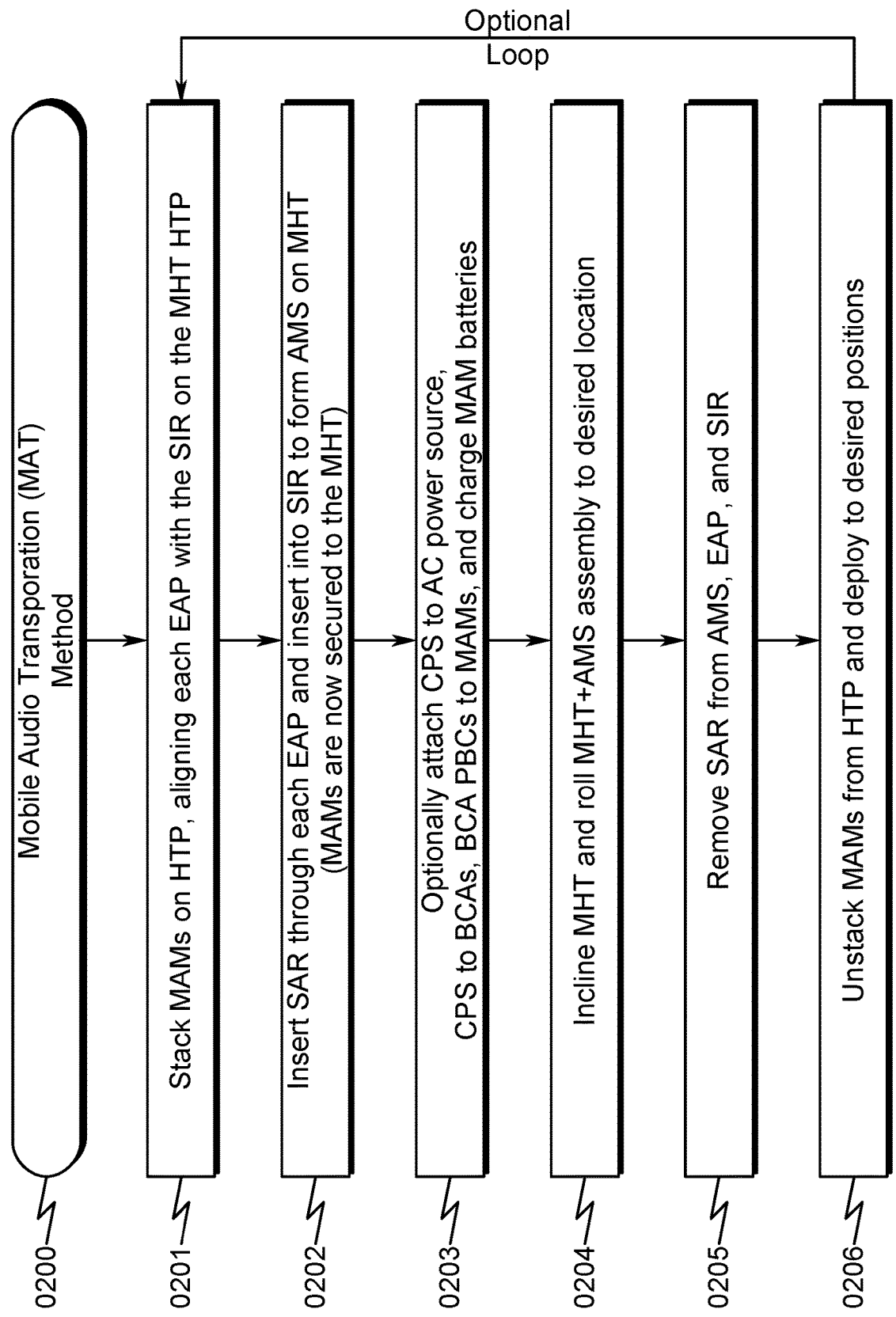
FIG. 2 illustrates a flowchart of a preferred exemplary method embodiment useful in some preferred embodiments of the present invention.

As depicted in FIG. 2 (0200), the MAT system depicted in FIG. 1 (0100) may be associated with a transportation method in which the MAMs are stacked on the MHT, optionally recharged, deployed to a remote location, and then unstacked and positioned for use. This method generally involves the following steps:

(1) stacking the MAMs on the HTP, aligning each the EAP with the SIR on the MHT HTP (0201);
(2) inserting the SAR through each of the EAP and inserting the SAR into the SIR to form the AMS on the MHT to secure the MAMs to the MHT (0202);
(3) optionally attaching the CPS to an AC power source, the CPS to the BCA, the BCA PBCs to the MAMs, and charging batteries in the MAM (0203);
(4) inclining the MHT and rolling the MHT and the AMS assembly to a desired location (0204);
(5) removing the SAR from the AMS and the SIR (0205); and
(6) unstacking the MAMs from the HTP and deploying the MAMs to desired positions and then proceeding to step (1) (0206).

One skilled in the art will recognize that these method steps may be augmented or rearranged without limiting the teachings of the present invention. This general method overview may be augmented by the various elements described herein to produce a wide variety of invention embodiments consistent with this overall design description.

This methodology allows a DDA to be deployed over a wide area and permits the DDA to bridge gaps between audio mesh networks that are spatially separated such that communication between MAM at the edges of these networks is not possible. Deployment of the DDA also permits GPS coordinates of disparate audio mesh networks to be determined and relayed back to the CCS.

Typical Application Context (0300)-(0800)

Figure 3:
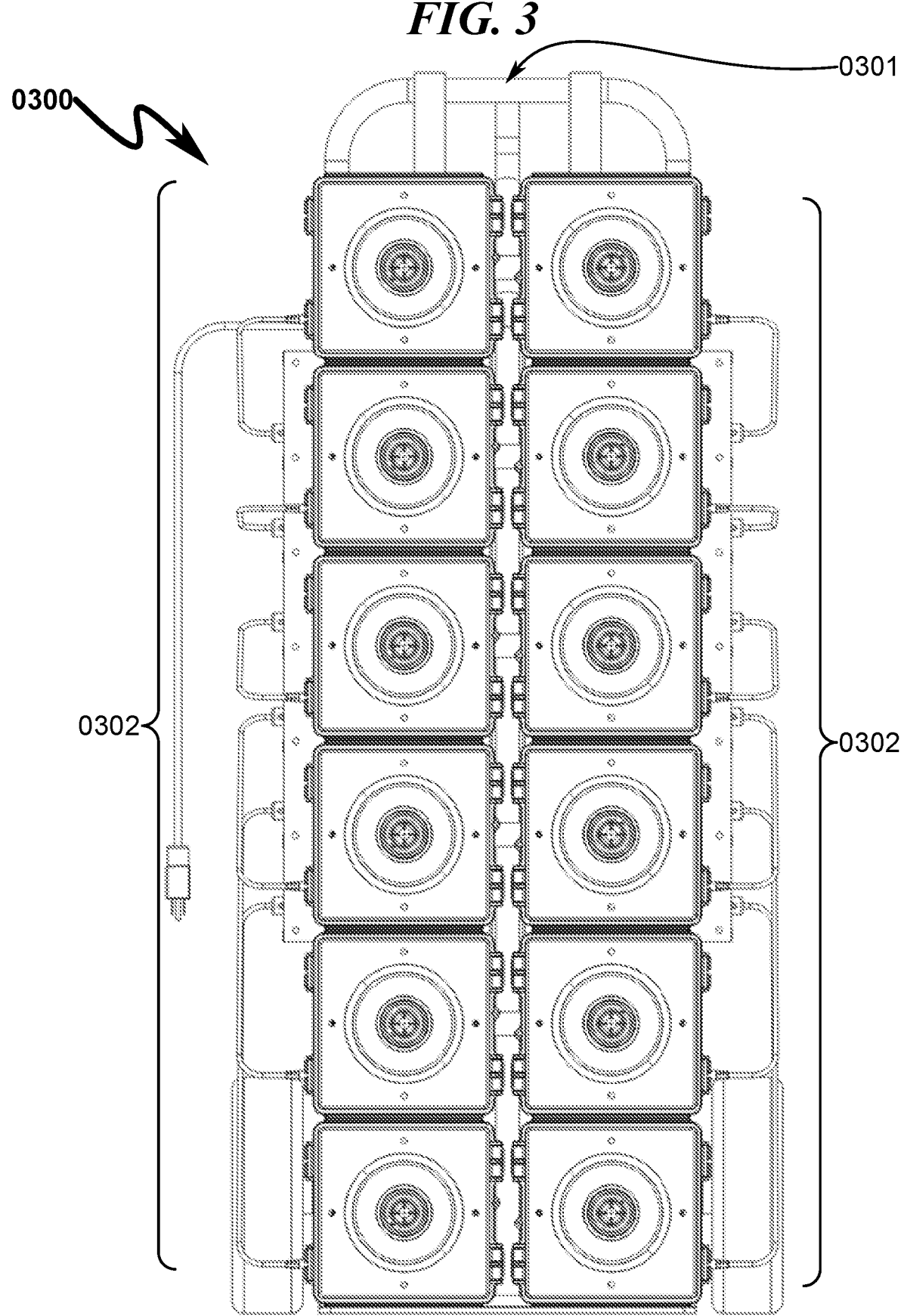
FIG. 3 illustrates a front view of a preferred exemplary system invention embodiment in which the MHT is loaded with a plurality of MAMs aligned in two MAS stacks.
Figure 4:
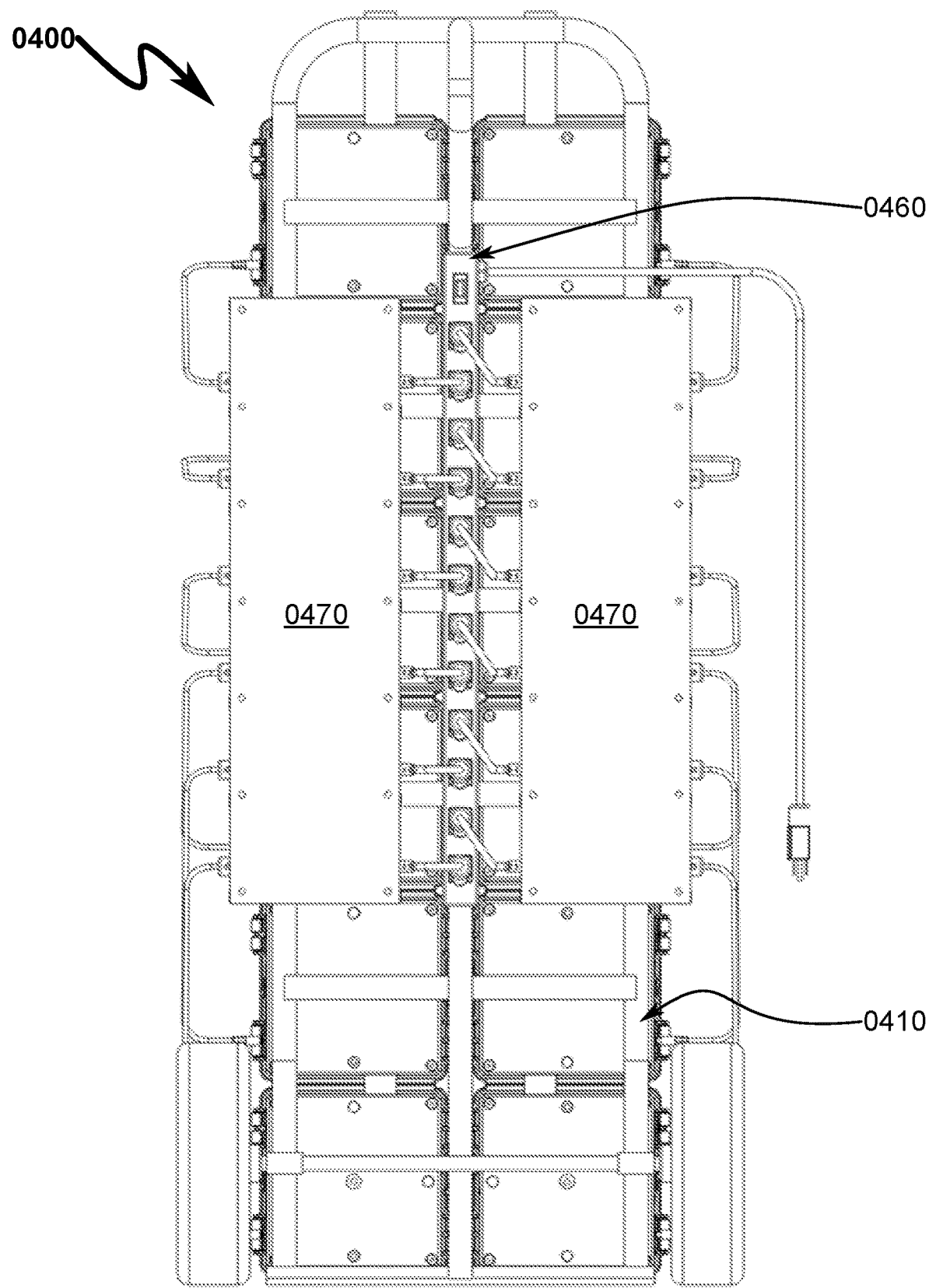
FIG. 4 illustrates a rear view of a preferred exemplary system invention embodiment in which the MHT is loaded with a plurality of MAMs aligned in two MAS stacks.
Figure 8:
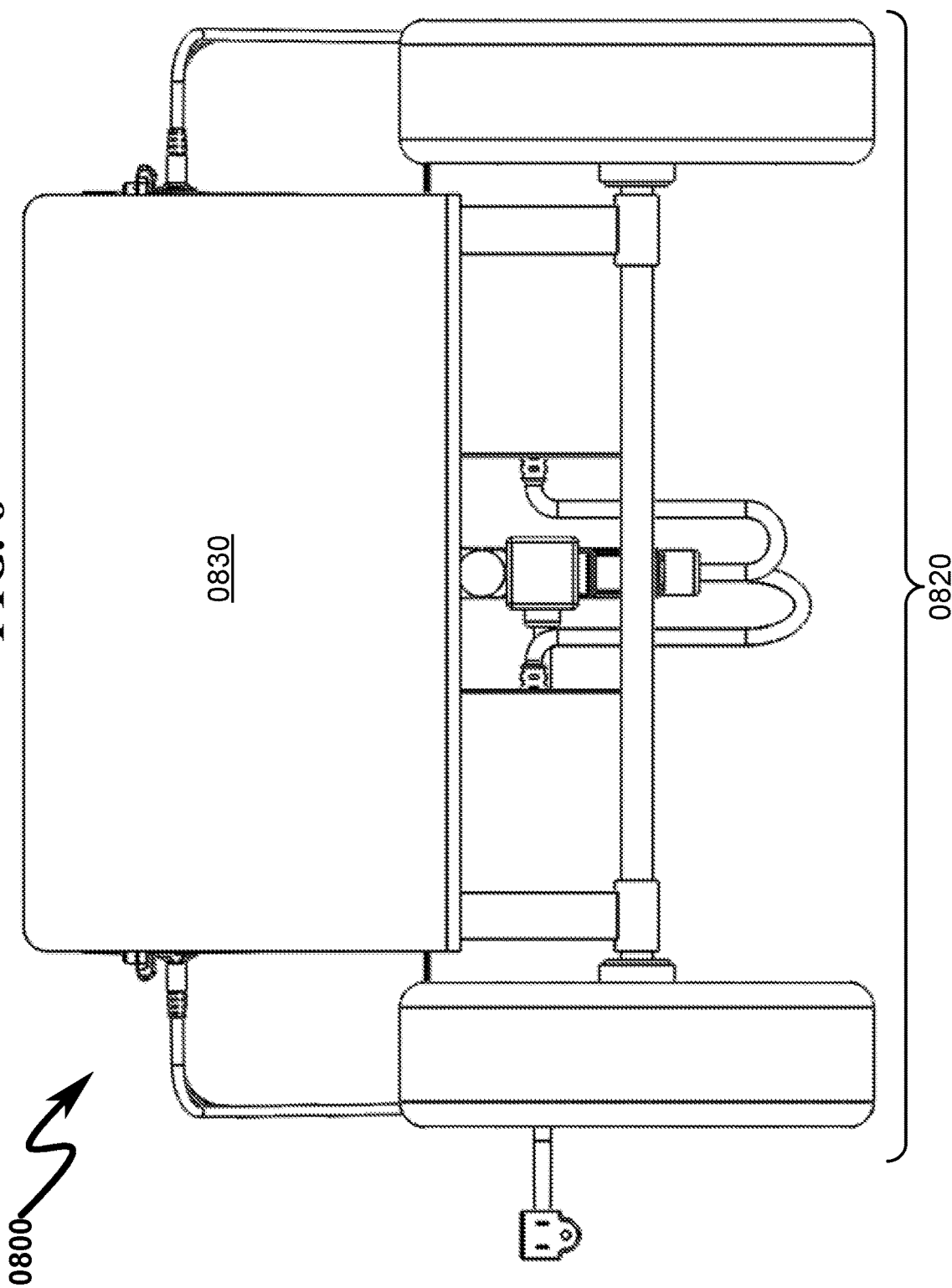
FIG. 8 illustrates a bottom view of a preferred exemplary system invention embodiment in which the MHT is loaded with a plurality of MAMs aligned in two MAS stacks.

A typical application context for the present invention is generally depicted in FIG. 3 (0300)-FIG. 8 (0800) wherein a mobile hand truck (0301) is used to transport two aligned mobile audio module stacks (AMS) (0302, 0502, 0602). These views illustrate the hand truck frame (HTF) (0410), hand truck wheels (HTW) (0820), hand truck platform (HTP) (0830), stack alignment rod(s) (0550, 0650), charger power strip (CPS) (0460), and battery charger array(s) (BCA) (0470, 0570, 0670).

Mobile Hand Truck (MHT) Mechanical Detail (0900)-(2400)

Figure 9:
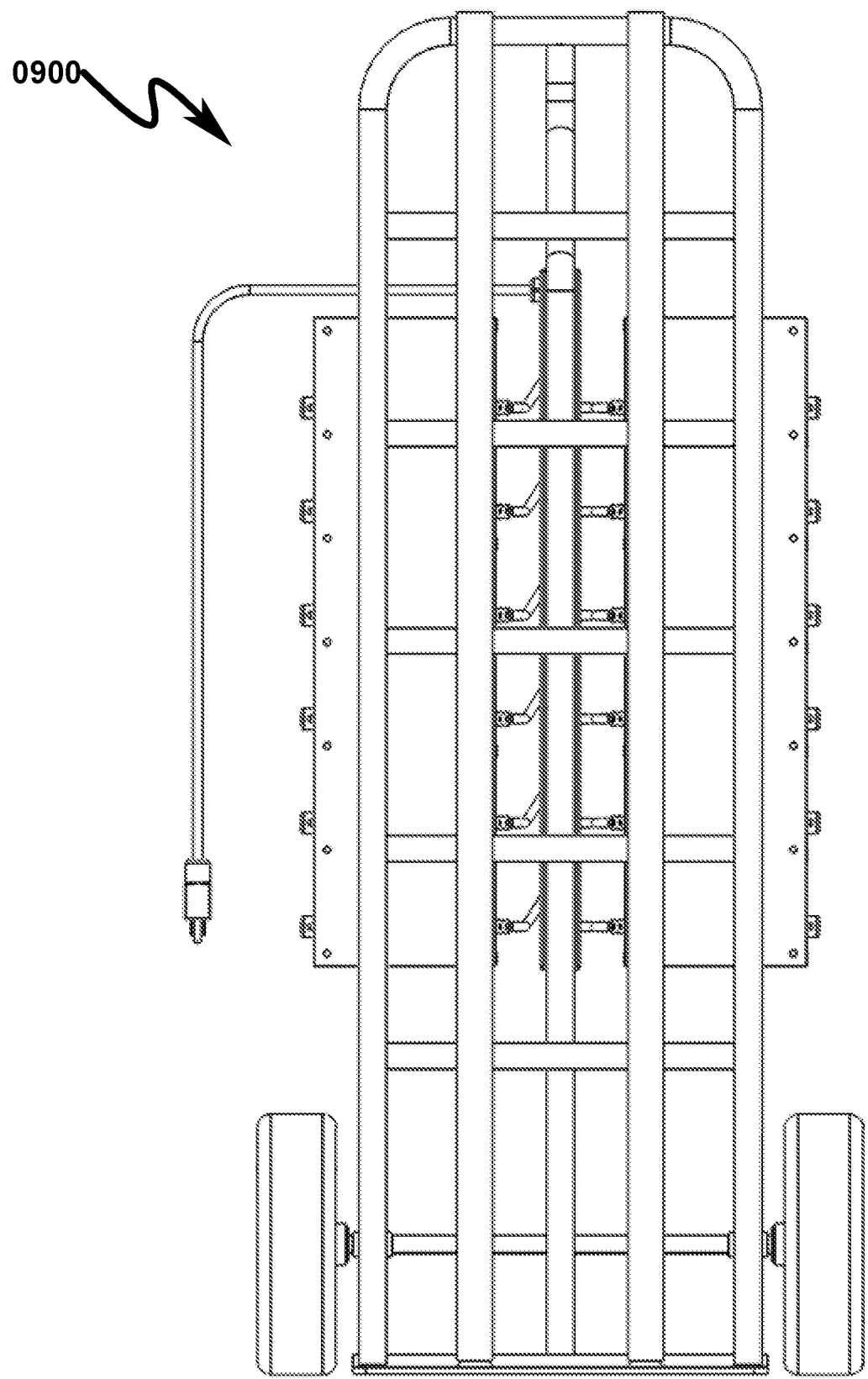
FIG. 9 illustrates a front view of a preferred exemplary system invention embodiment that has been unloaded with the SAR installed over the SIR.
Figure 10:
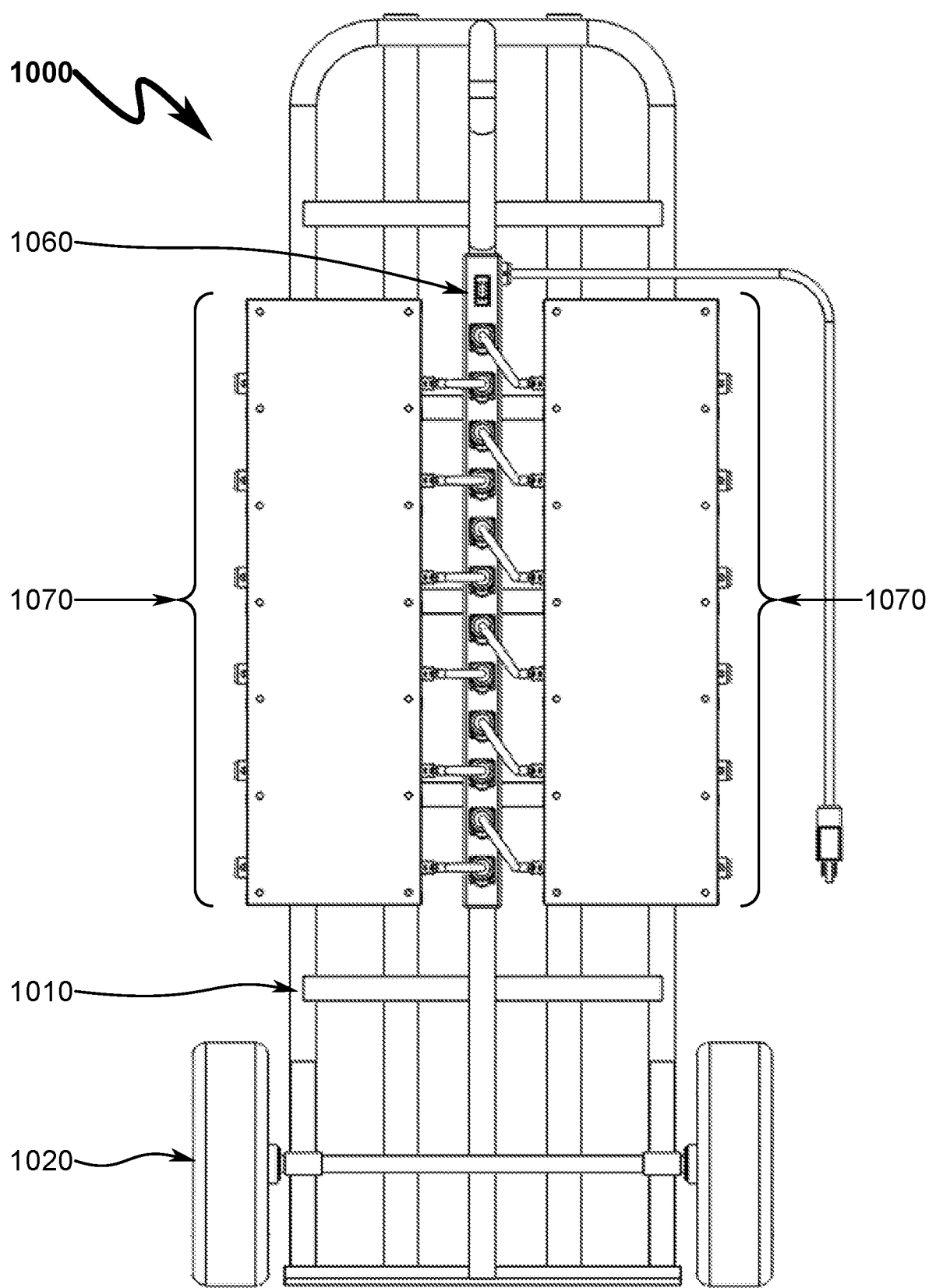
FIG. 10 illustrates a rear view of a preferred exemplary system invention embodiment that has been unloaded with the SAR installed over the SIR.
Figure 11:
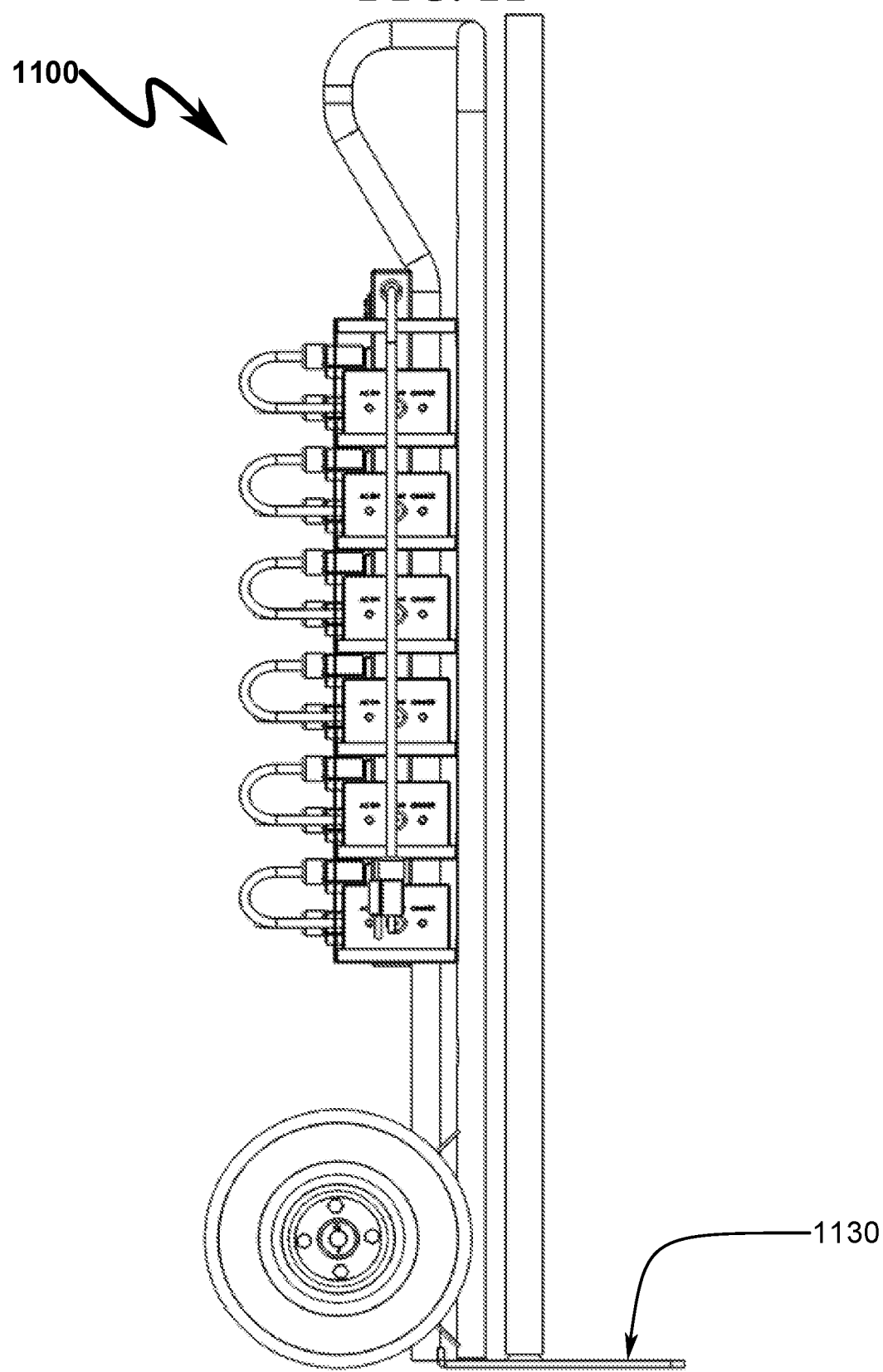
FIG. 11 illustrates a left side view of a preferred exemplary system invention embodiment that has been unloaded with the SAR installed over the SIR.
Figure 12:
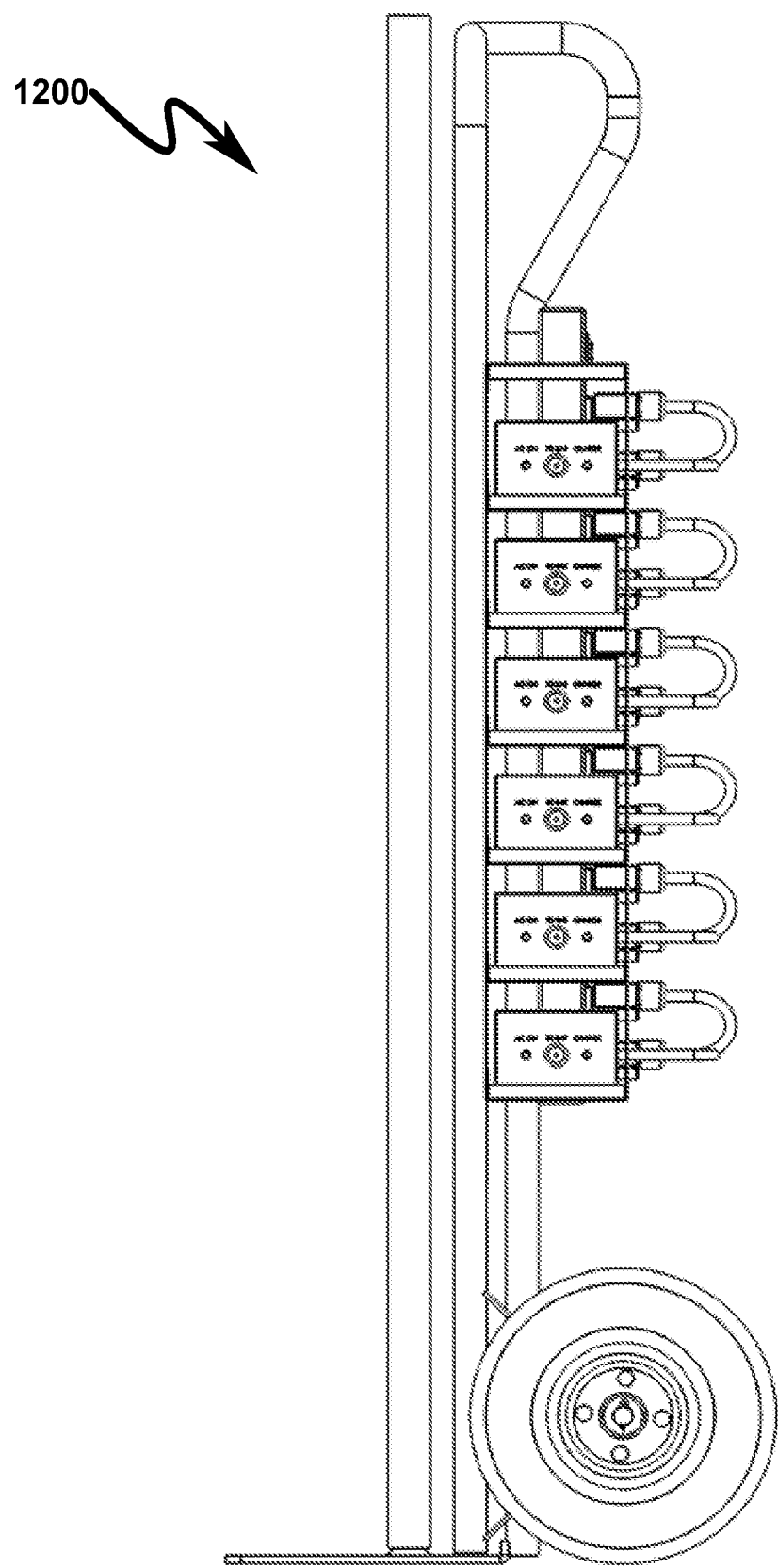
FIG. 12 illustrates a right side view of a preferred exemplary system invention embodiment that has been unloaded with the SAR installed over the SIR.
Figure 13:
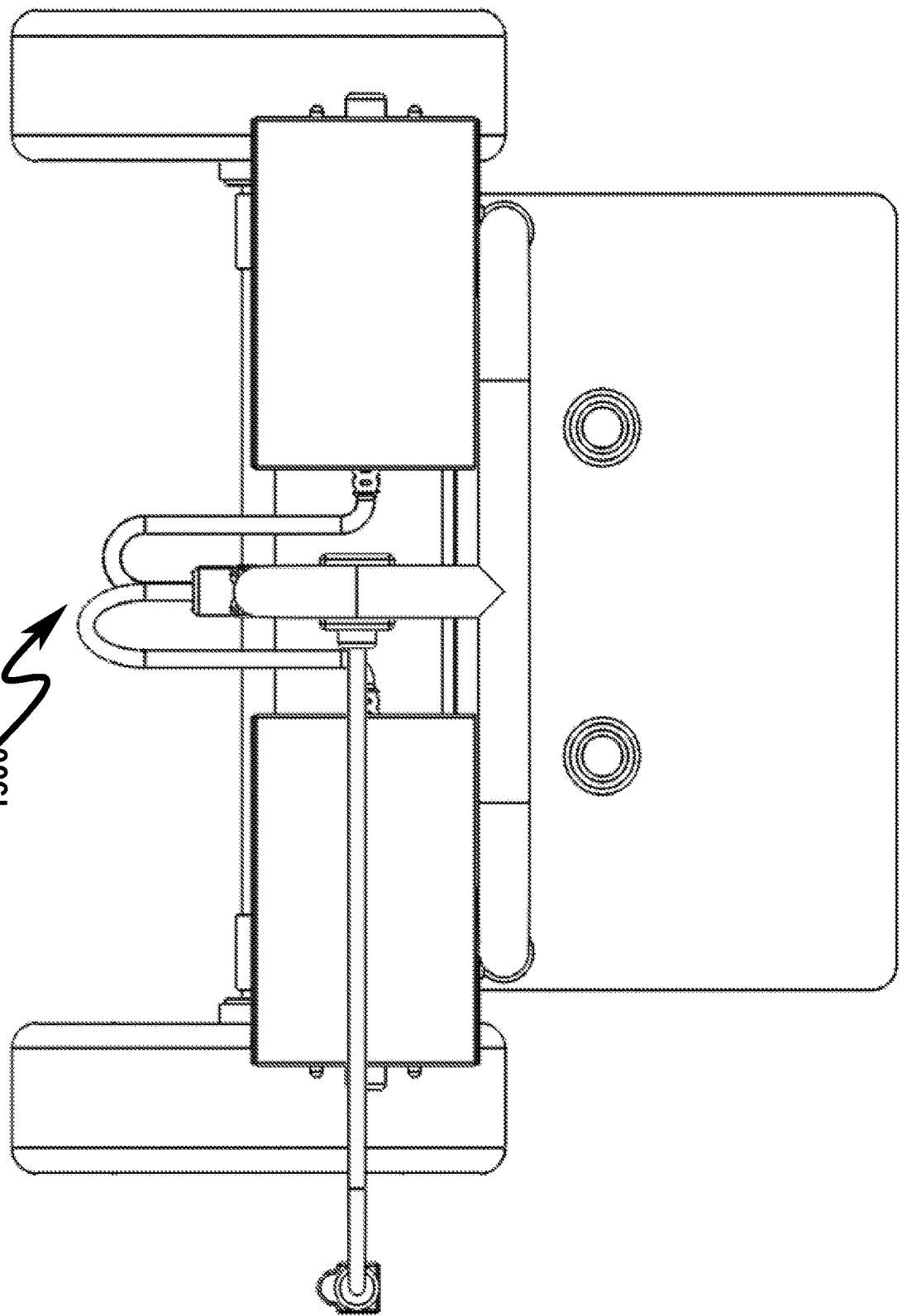
FIG. 13 illustrates a top view of a preferred exemplary system invention embodiment that has been unloaded with the SAR installed over the SIR.
Figure 14:
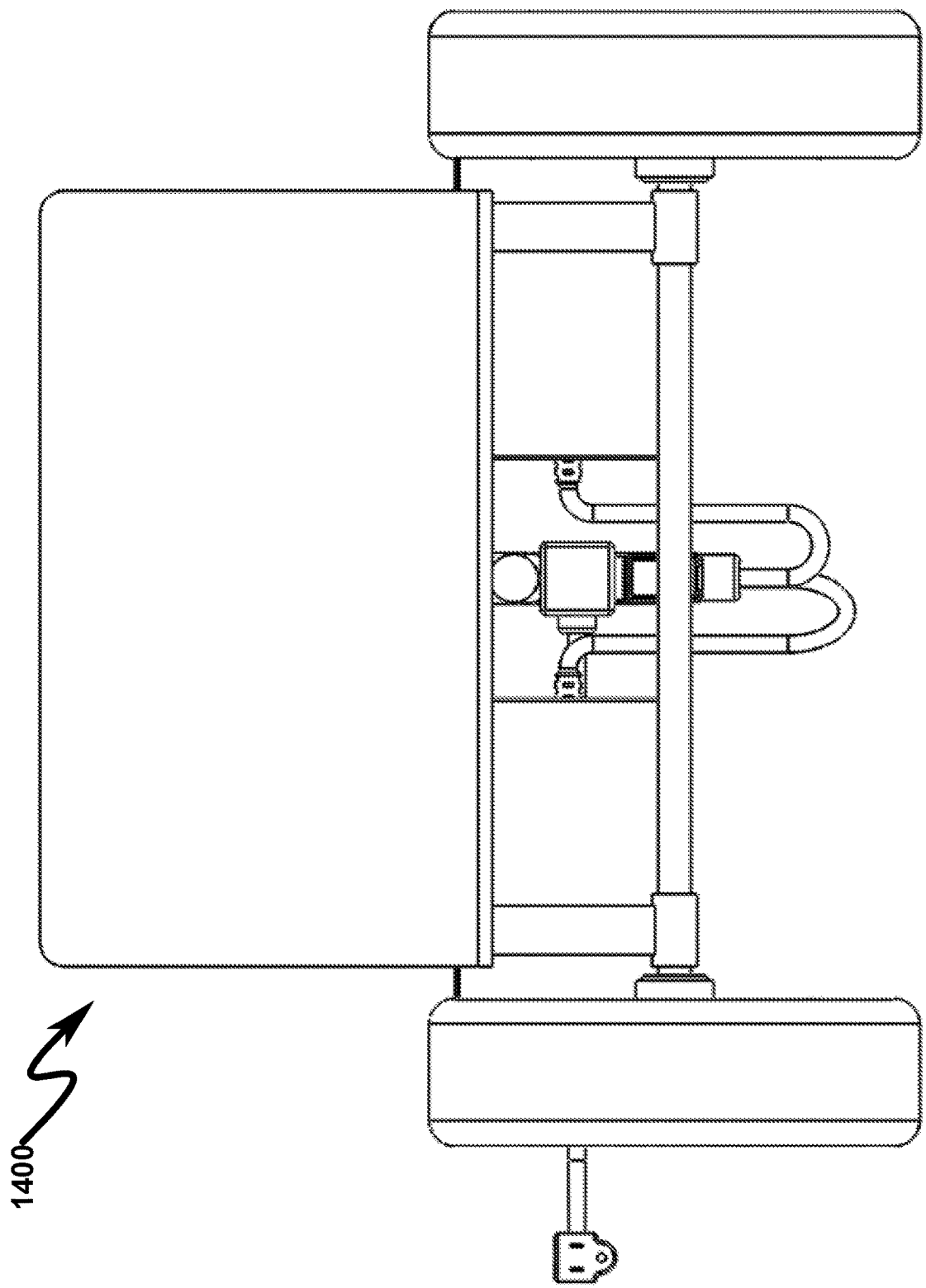
FIG. 14 illustrates a bottom view of a preferred exemplary system invention embodiment that has been unloaded with the SAR installed over the SIR.
Figure 24:
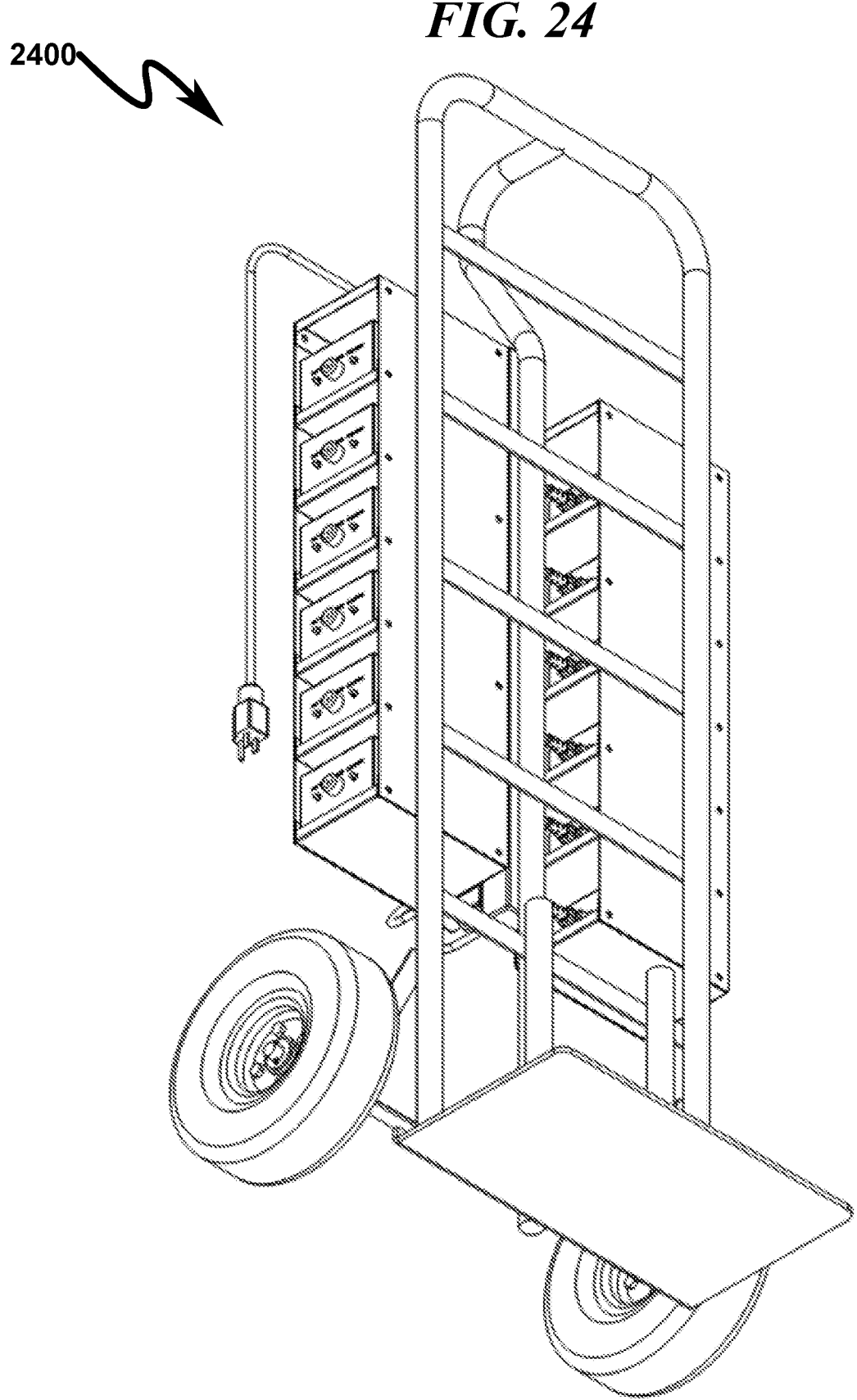
FIG. 24 illustrates a bottom left front perspective view of a preferred exemplary system invention embodiment in which the SAR elements have been removed.

A preferred exemplary embodiment of a mobile hand truck (MHT) with the MAS unloaded is generally depicted in FIG. 09 (0900)-FIG. 24 (2400). These diagrams depict the hand truck frame (HTF) (1010), hand truck wheels (HTW) (1020), hand truck platform (HTP) (1130), stack index rod(s) (SIR) (1540), stack alignment rod(s) (1550), charger power strip (CPS) (1060), and battery charger array(s) (BCA) (1070). As illustrated in these drawings, the stack index rod(s) (SIR) (1540), stack alignment rod(s) (1550), and battery charger array(s) (BCA) (1070) may be replicated as needed depending on the application context of the invention.

Figure 15:
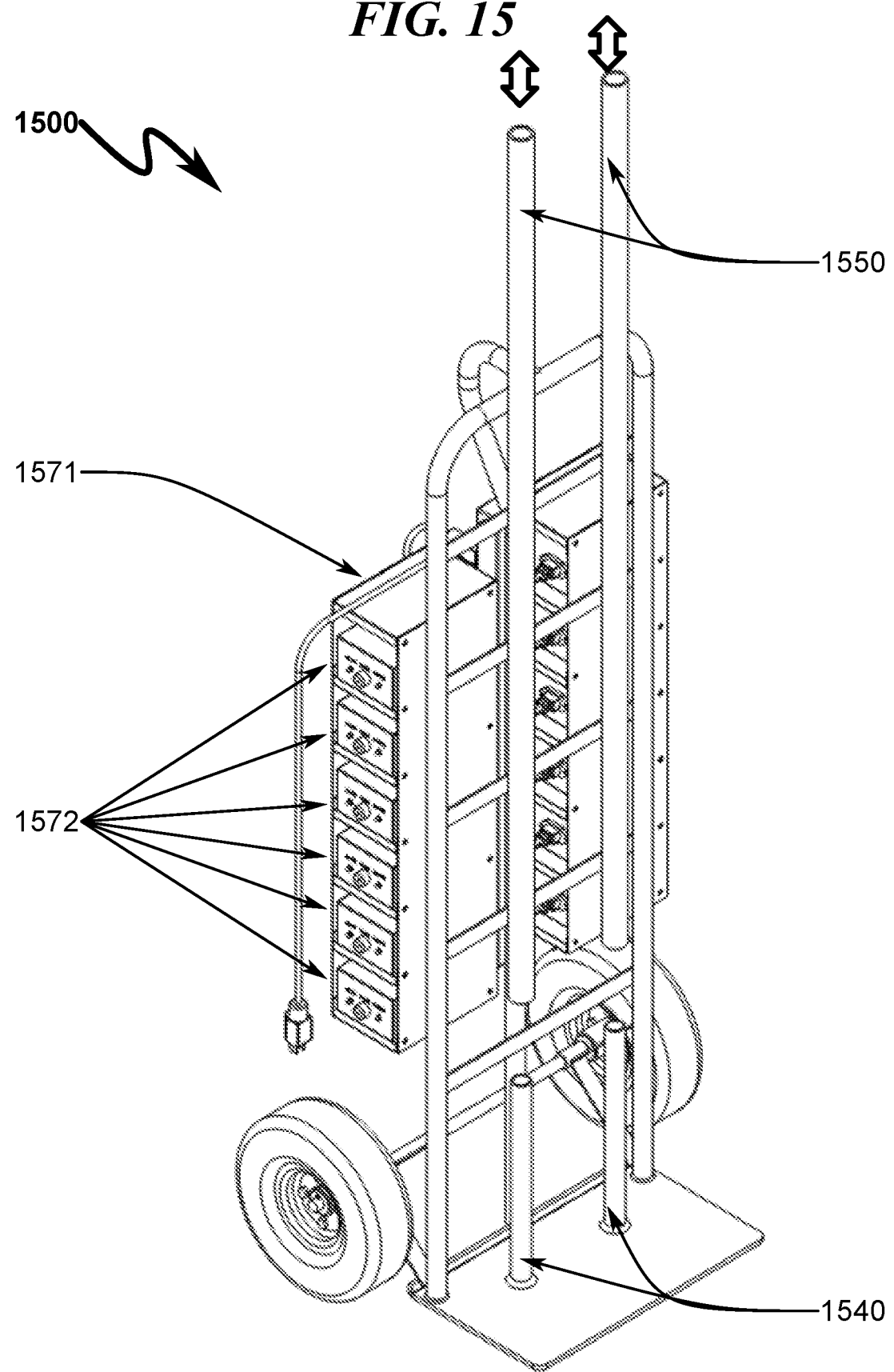
FIG. 15 illustrates a top left front perspective view of a preferred exemplary system invention embodiment that has been unloaded with SAR raised over the SIR in an assembly view of these two elements.
Figure 16:
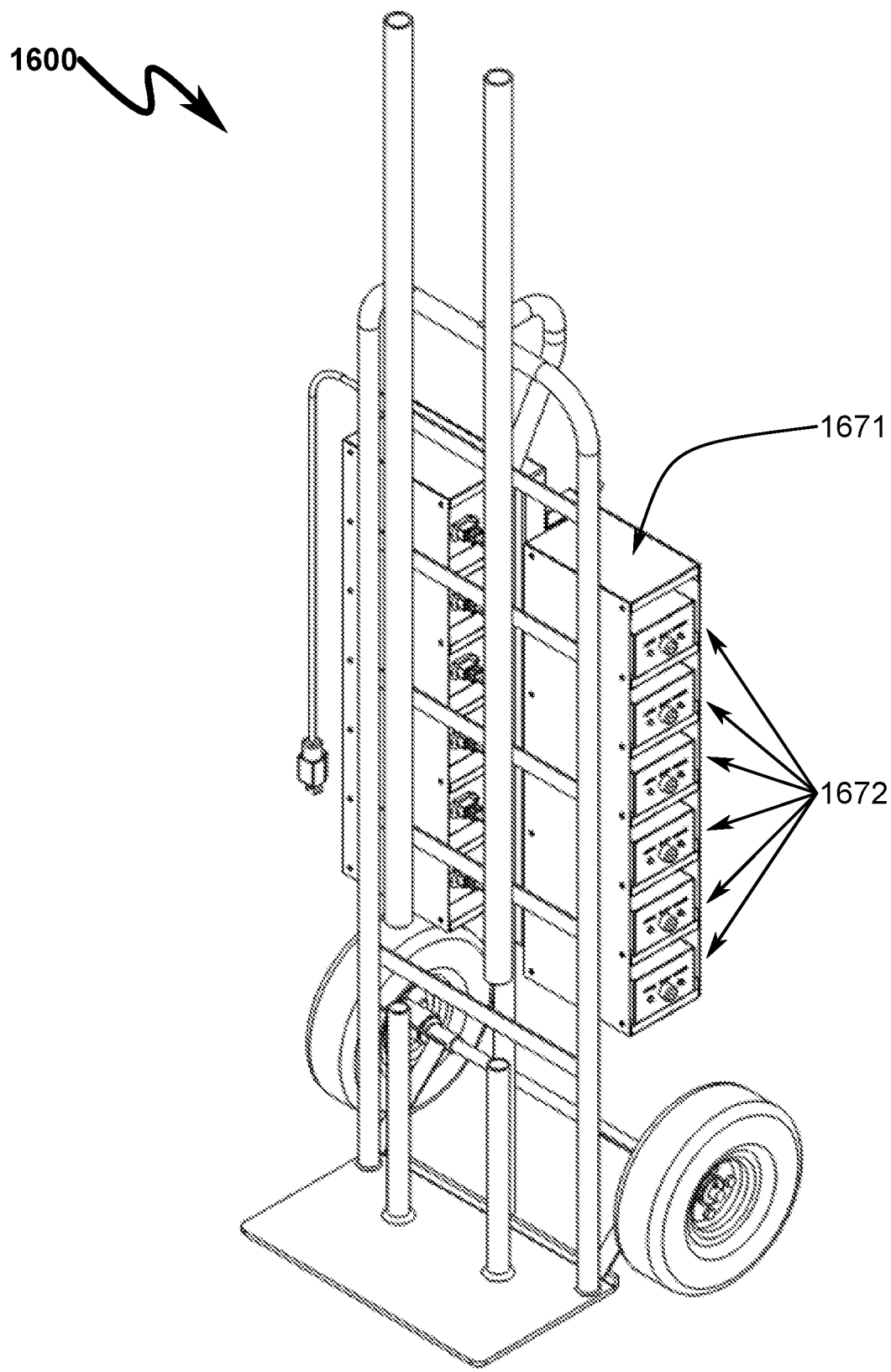
FIG. 16 illustrates a top right front perspective view of a preferred exemplary system invention embodiment that has been unloaded with SAR raised over the SIR in an assembly view of these two elements.
Figure 17:
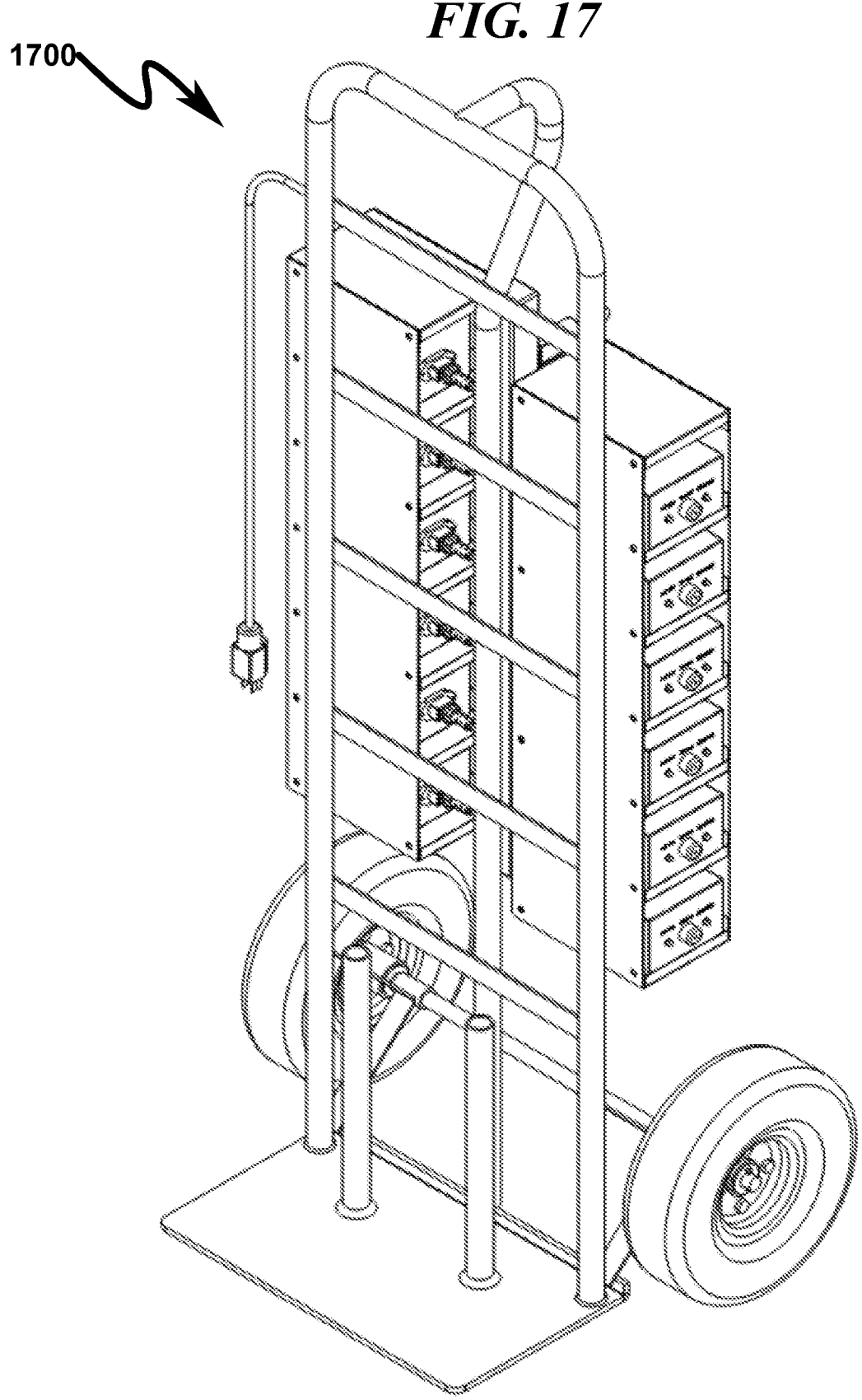
FIG. 17 illustrates a top right front perspective view of a preferred exemplary system invention embodiment in which the SAR elements have been removed.
Figure 18:
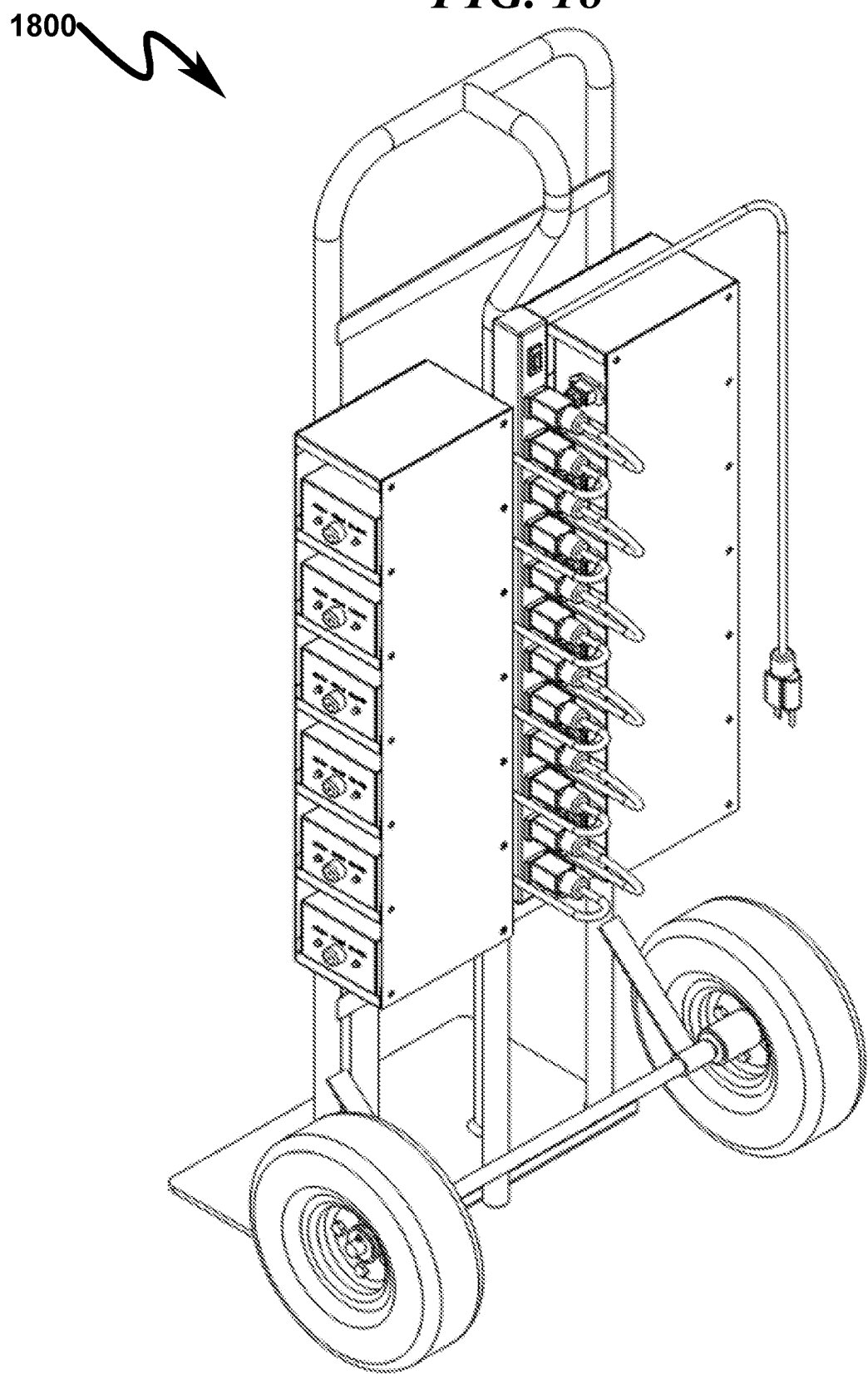
FIG. 18 illustrates a top right rear perspective view of a preferred exemplary system invention embodiment in which the SAR elements have been removed.
Figure 19:
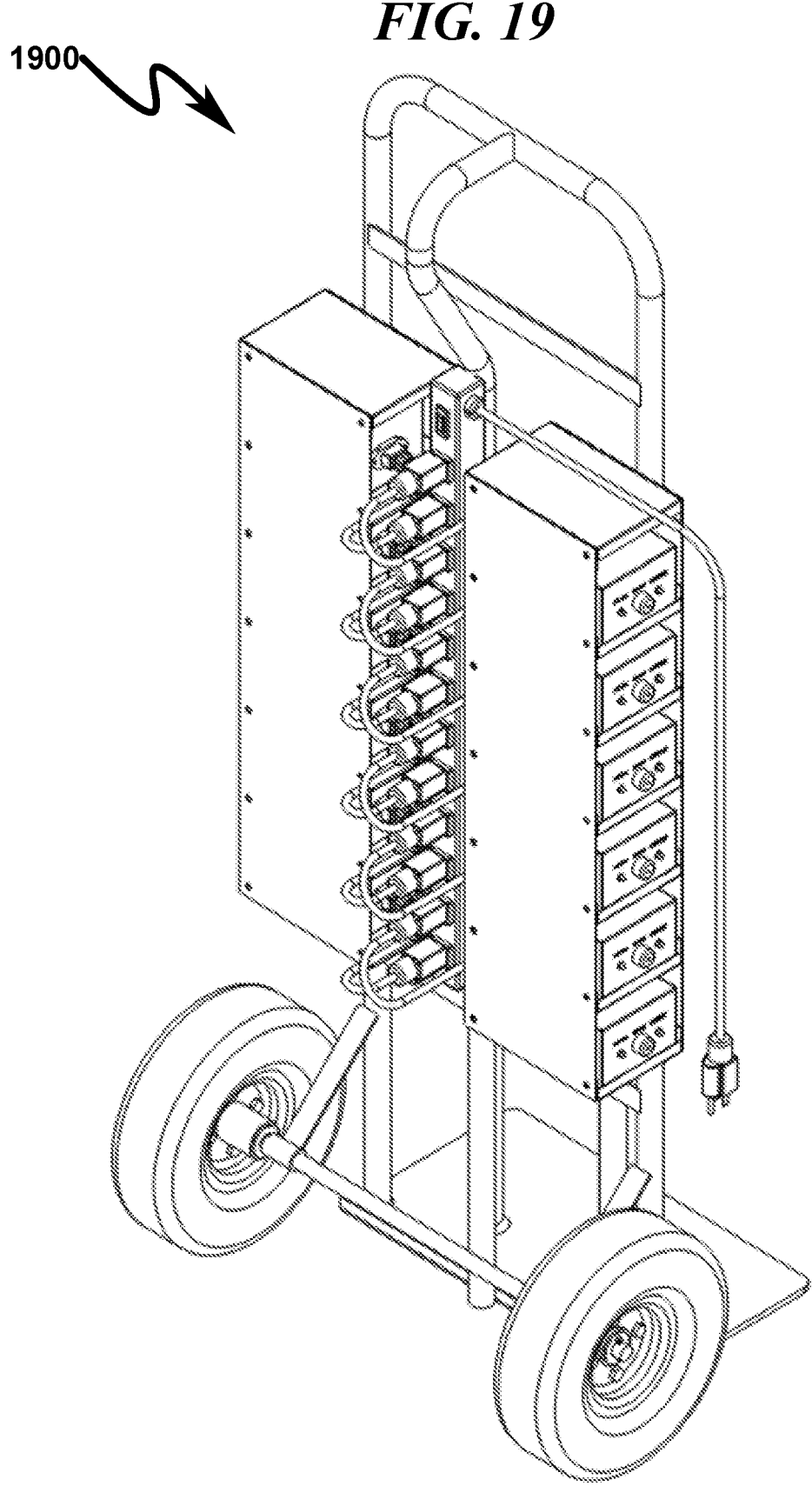
FIG. 19 illustrates a top left rear perspective view of a preferred exemplary system invention embodiment in which the SAR elements have been removed.
Figure 20:
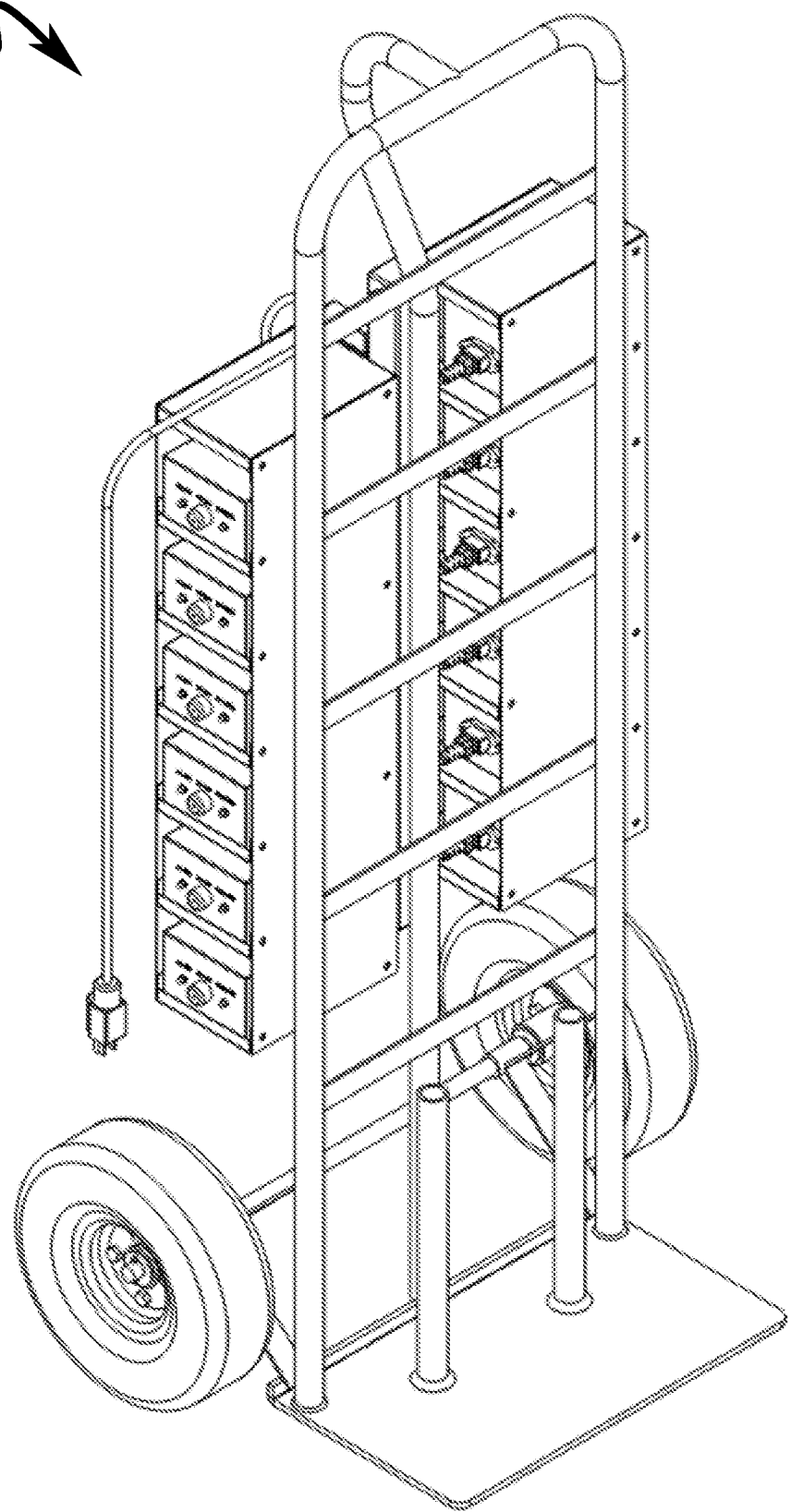
FIG. 20 illustrates a top left front perspective view of a preferred exemplary system invention embodiment in which the SAR elements have been removed.
Figure 21:
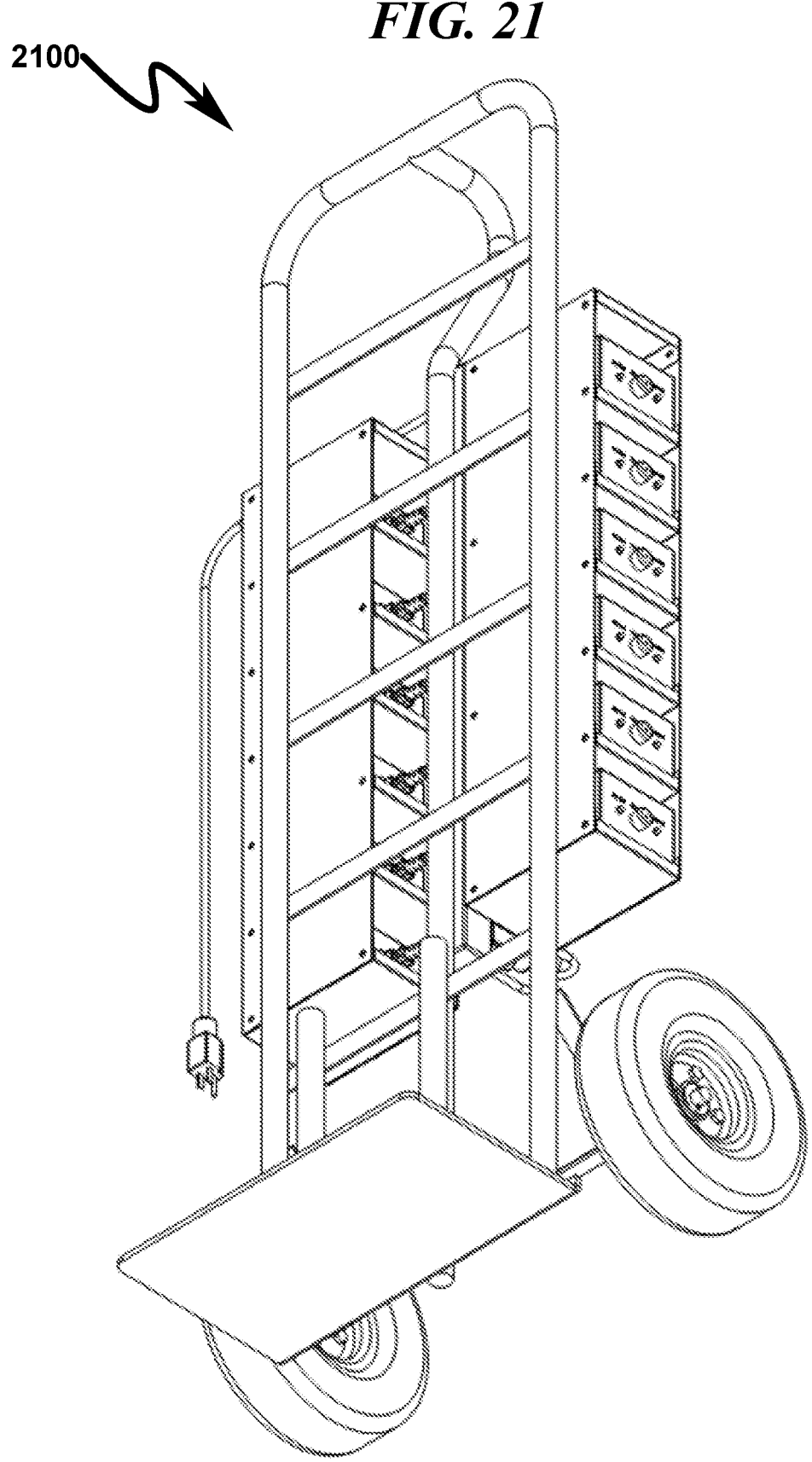
FIG. 21 illustrates a bottom right front perspective view of a preferred exemplary system invention embodiment in which the SAR elements have been removed.
Figure 22:
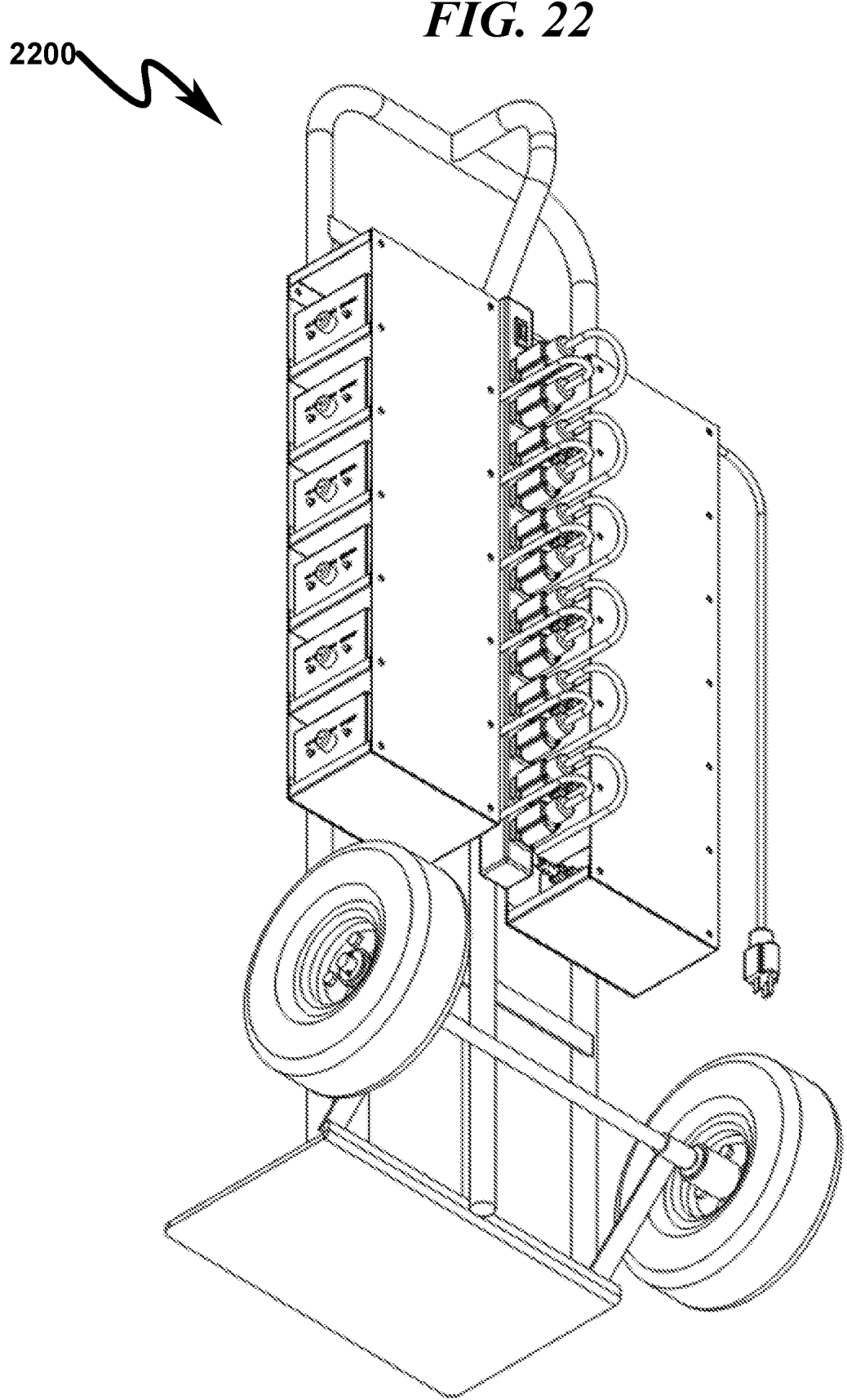
FIG. 22 illustrates a bottom right rear perspective view of a preferred exemplary system invention embodiment in which the SAR elements have been removed.
Figure 23:
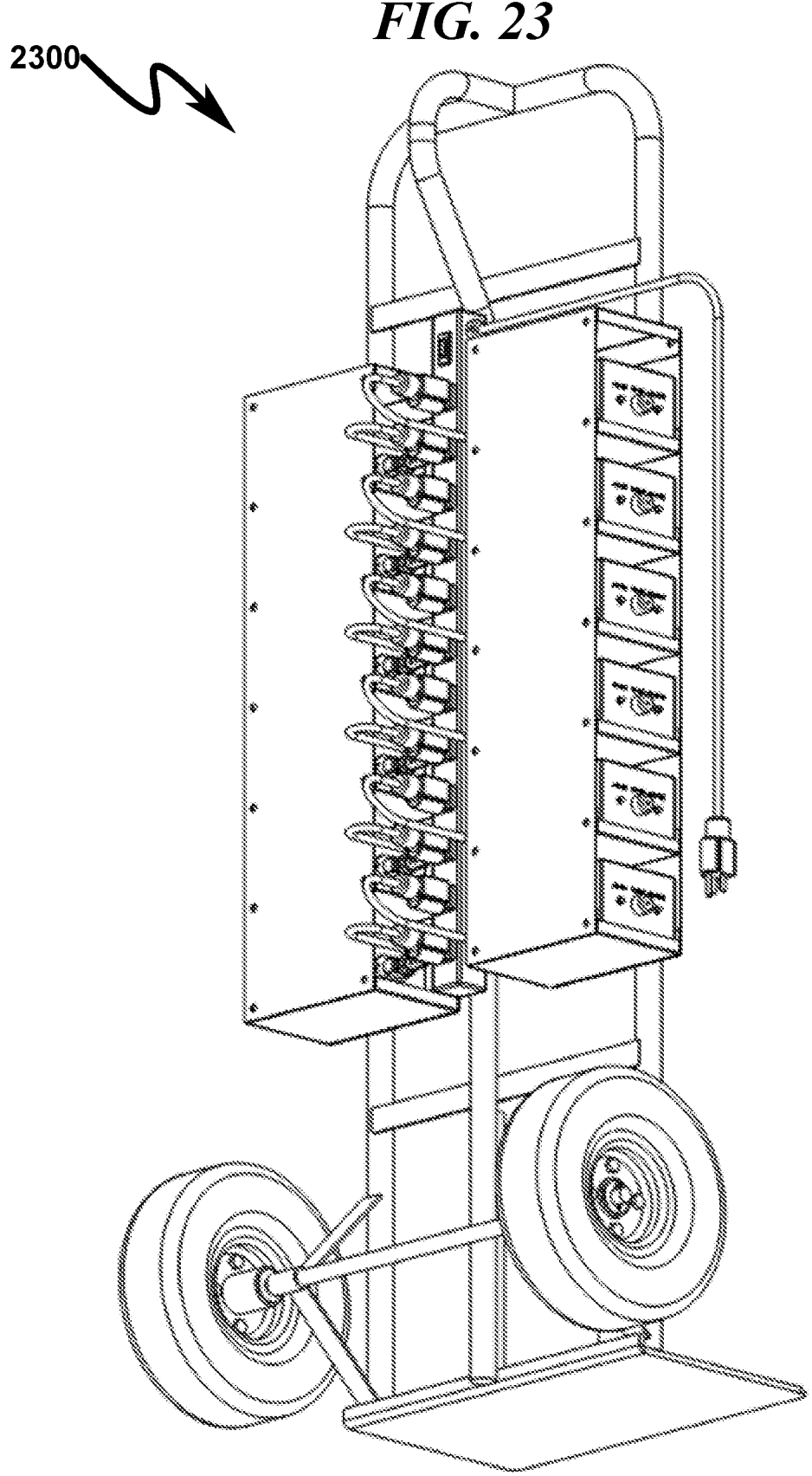
FIG. 23 illustrates a bottom left rear perspective view of a preferred exemplary system invention embodiment in which the SAR elements have been removed.

As generally depicted in FIG. 15 (1500)-FIG. 16 (1600) the stack index rod(s) (SIR) (1540) and stack alignment rod(s) (1550) are configured for a sliding fit over each other, with a preferred configuration having the stack alignment rod(s) (1550) sliding over the stack index rod(s) (SIR) (1540). In this manner, the MAMs may be stacked on the hand truck platform (HTP) (1130), engaging the stack index rod(s) (SIR) (1540) and then the stack alignment rod(s) (1550) can be inserted through the AMS and engage the stack index rod(s) (SIR) (1540), thus securing the AMS to the hand truck platform (HTP) (1130).

The battery charger array(s) (BCA) (1070) depicted in these figures are configured in retaining enclosure (1571, 1671) and comprises a plurality of primary battery chargers (PBC) (1572, 1672) that are configured to charge batteries contained within each of said MSE. FIG. 9 (0900)-FIG. 24 (2400) omit the charging cables between each individual PBC for each individual MAM that are illustrated in FIG. 3 (0300)-FIG. 8 (0800). These cables may be integrated within the PBC or configured as separately engaged cables between these elements.

The charger power strip (CPS) (1060) is configured with suitable AC outlets to support each PBC within the BCA and may optionally incorporate a master power on/off switch as shown. This centralized power distribution methodology allows connection of the MAMs to the BCA such that the AMS dolly may then be located at a suitable AC power source and the entire AMS charged in tandem. This may occur within a transportation truck or van as well as proximal to a conventional AC power source. Provision for a central power cord supplying AC power to the CPS is depicted in the drawings and typical of the CPS connection to an external power source. Note that while AC power is typically sourced to the BCA, in some circumstances the BCA may be driven by DC power. In this circumstance the CPS and associated power cord may be configured to supply DC power from a transportation vehicle, truck, generator, or other power source.

Mobile Audio Module (MAM) Mechanical Detail (2500)-(4000)

Figure 25:
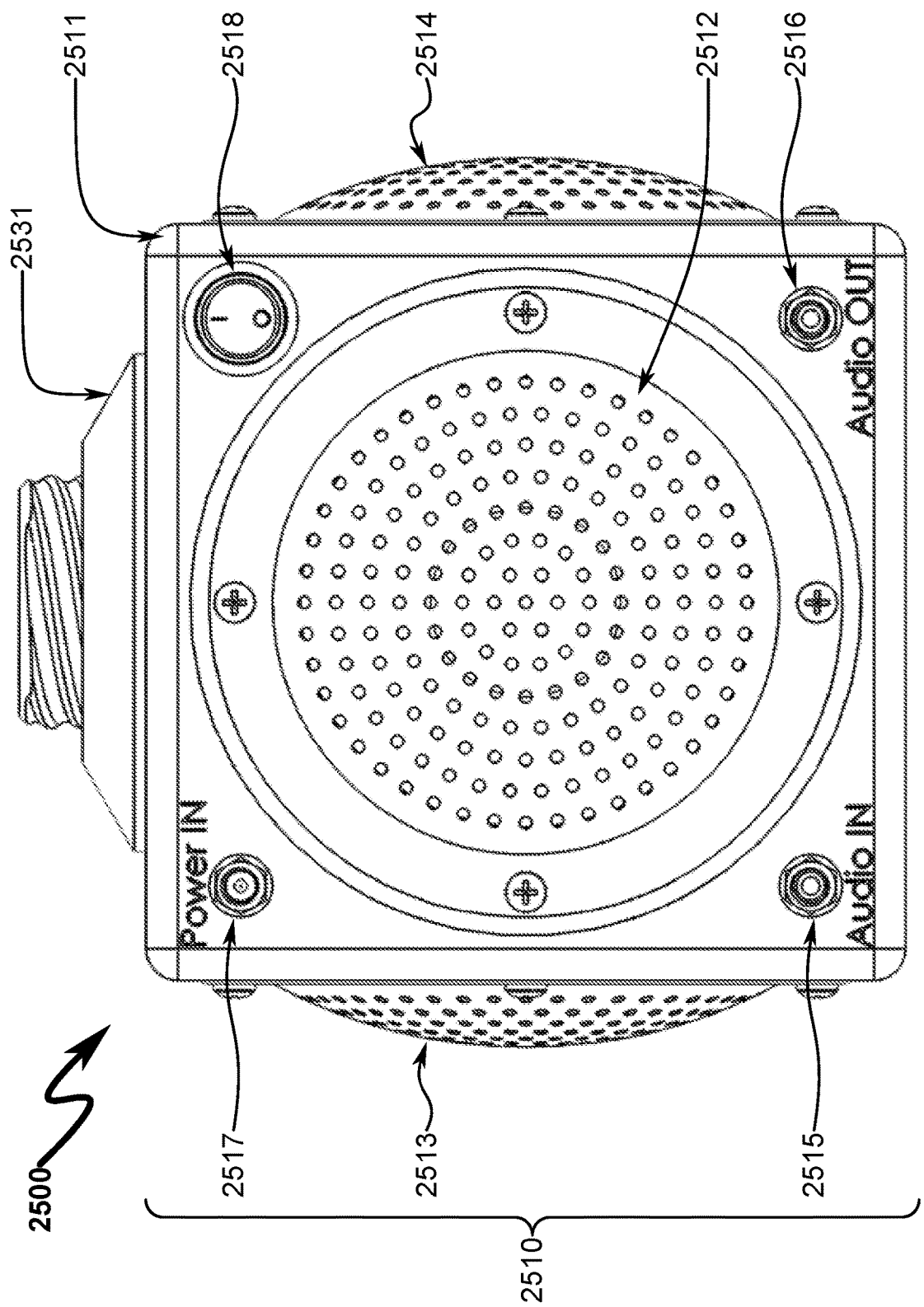
FIG. 25 illustrates a front view of a preferred exemplary modular audio module (MAM)
Figure 26:
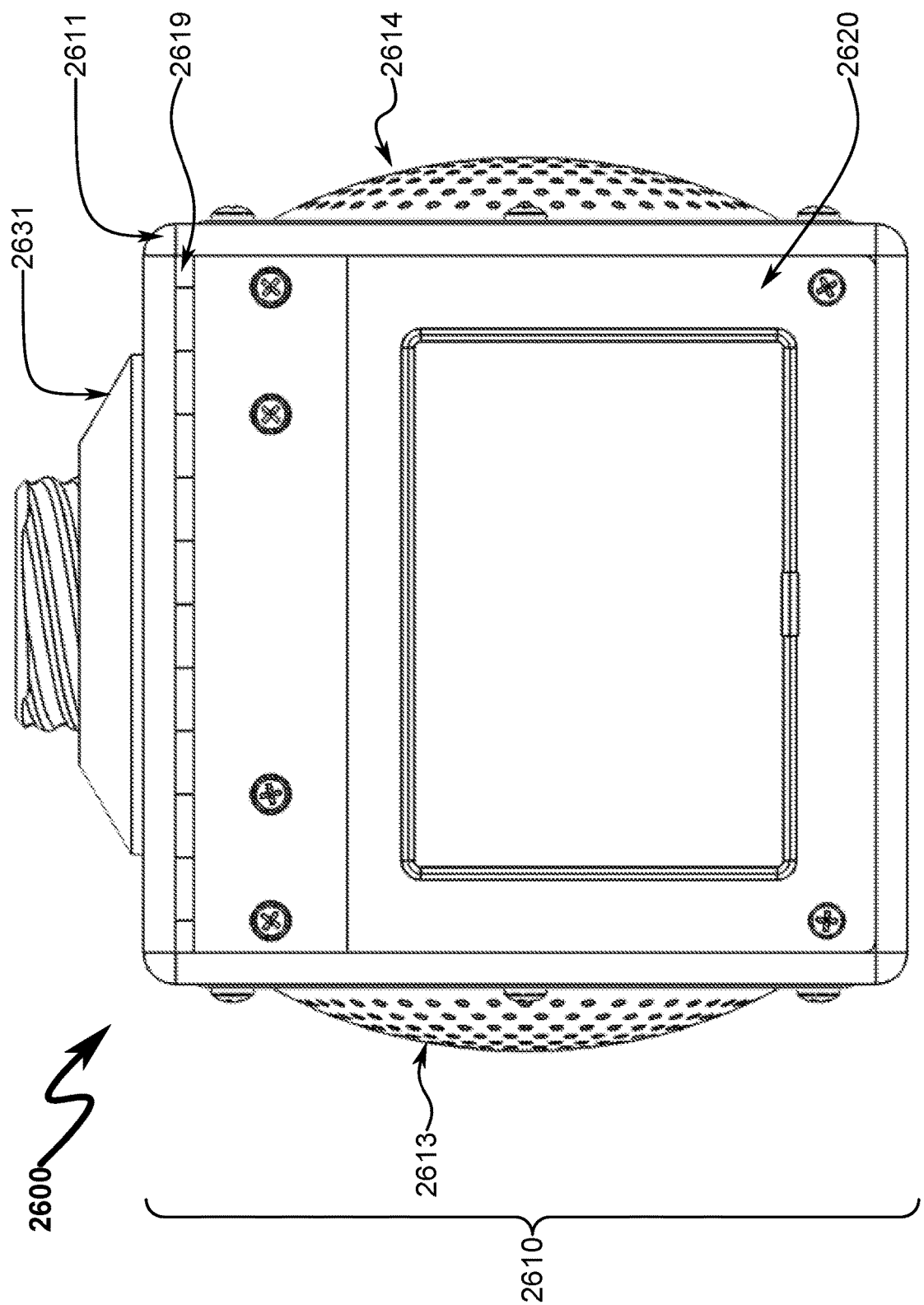
FIG. 26 illustrates a back view of a preferred exemplary modular audio module (MAM)
Figure 27:
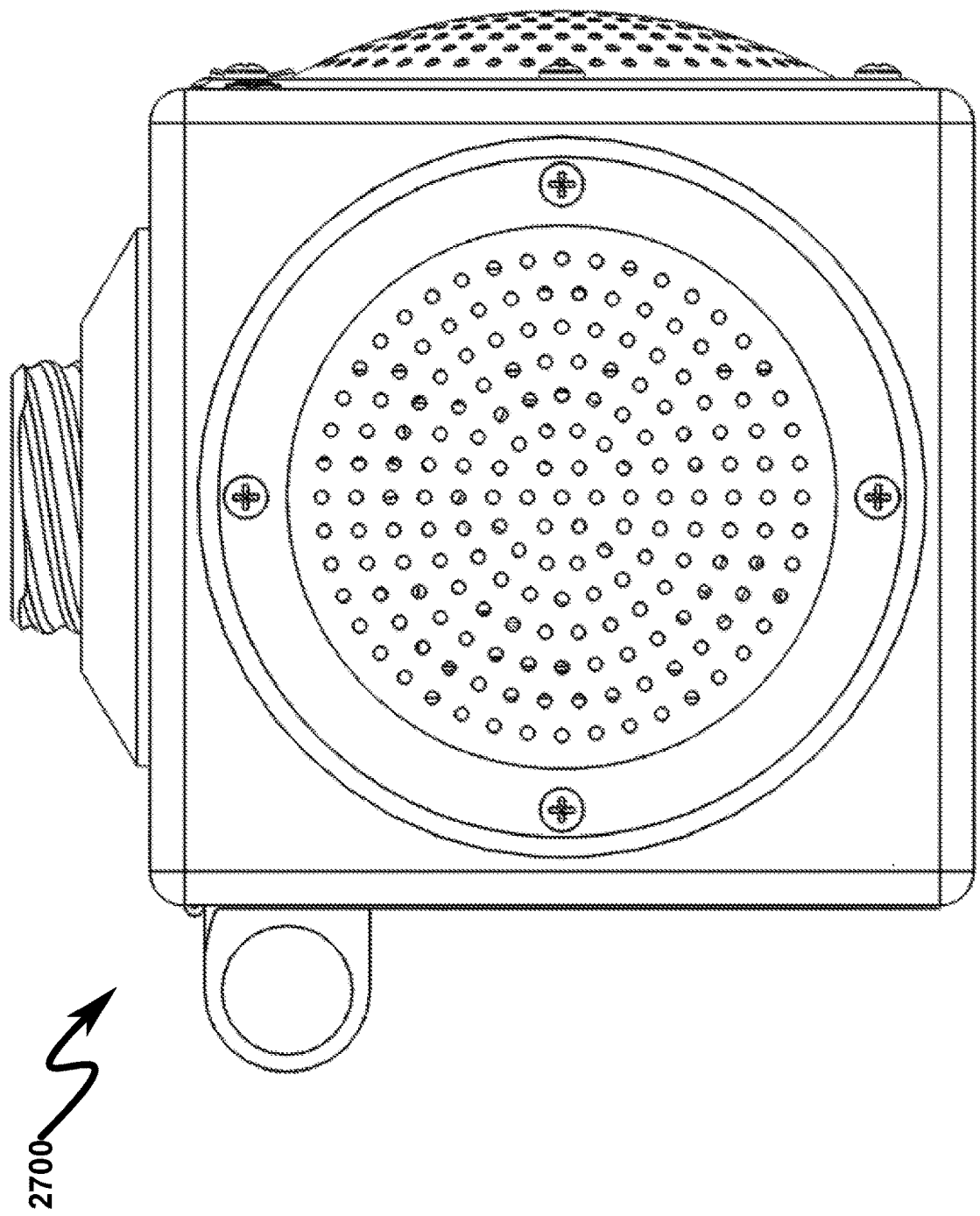
FIG. 27 illustrates a left side view of a preferred exemplary modular audio module (MAM)
Figure 28:
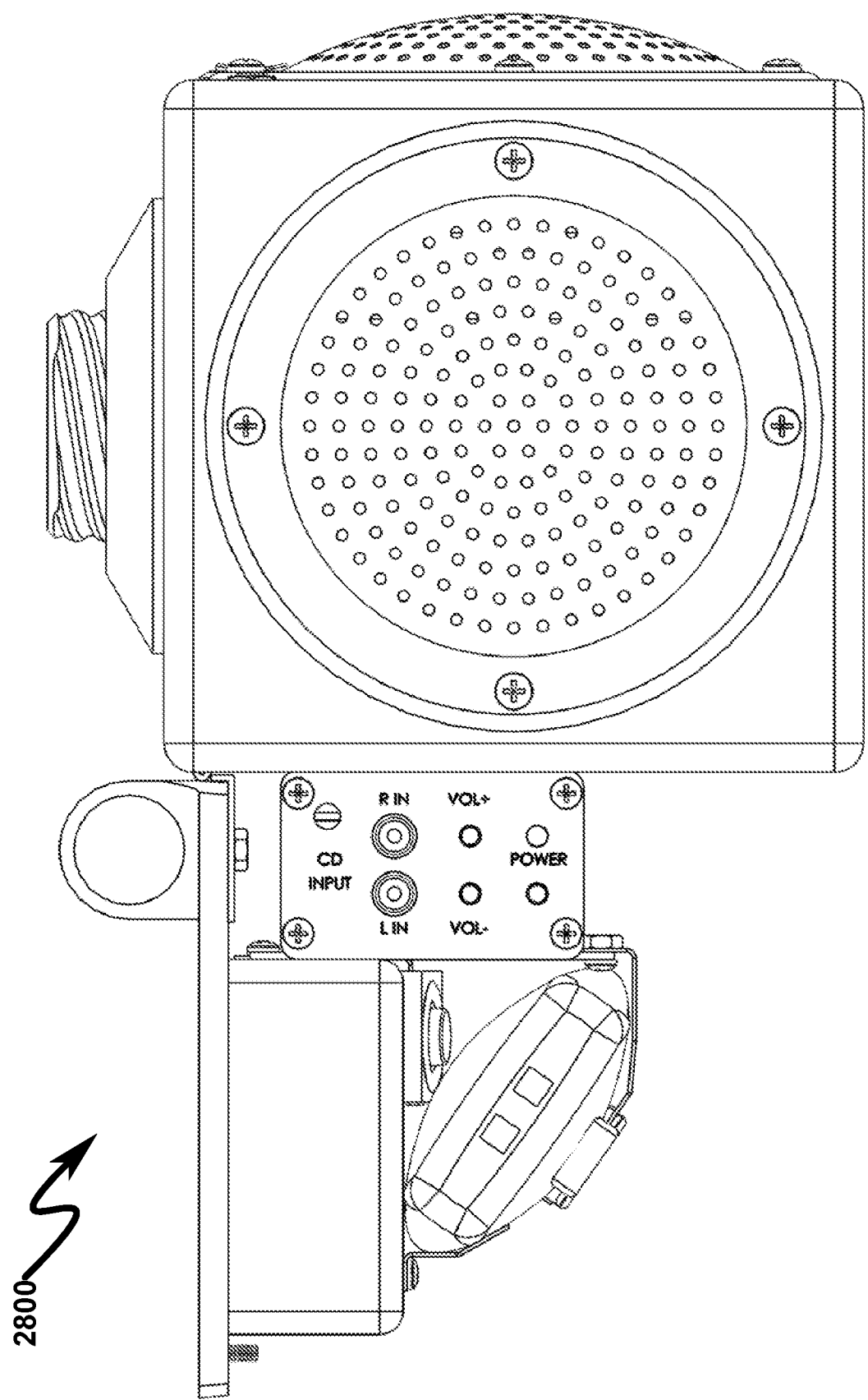
FIG. 28 illustrates a left side view of a preferred exemplary modular audio module (MAM) with rear opening lid (ROL) extended.
Figure 29:
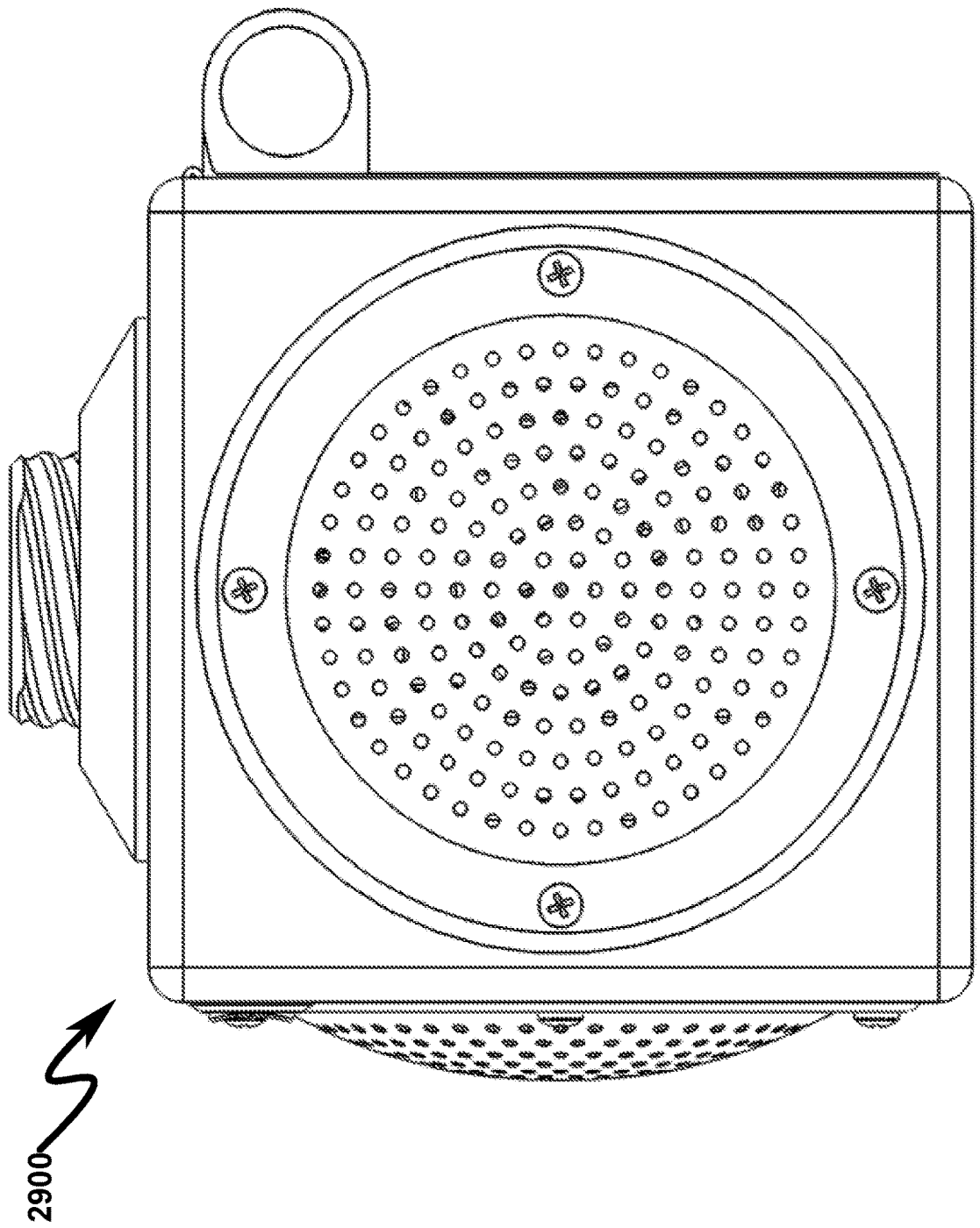
FIG. 29 illustrates a right side view of a preferred exemplary modular audio module (MAM)
Figure 30:
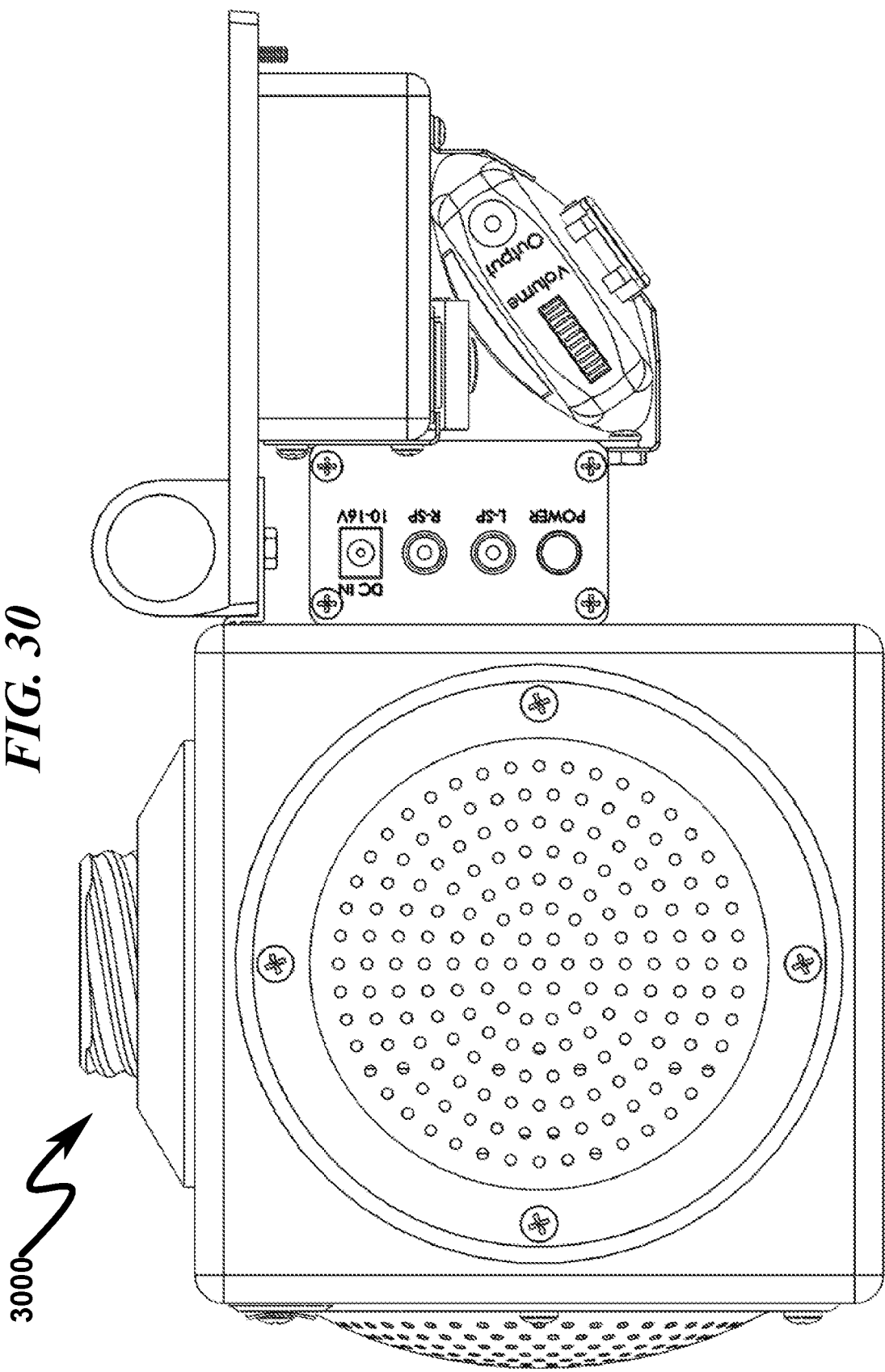
FIG. 30 illustrates a right side view of a preferred exemplary modular audio module (MAM) with rear opening lid (ROL) extended.
Figure 31:
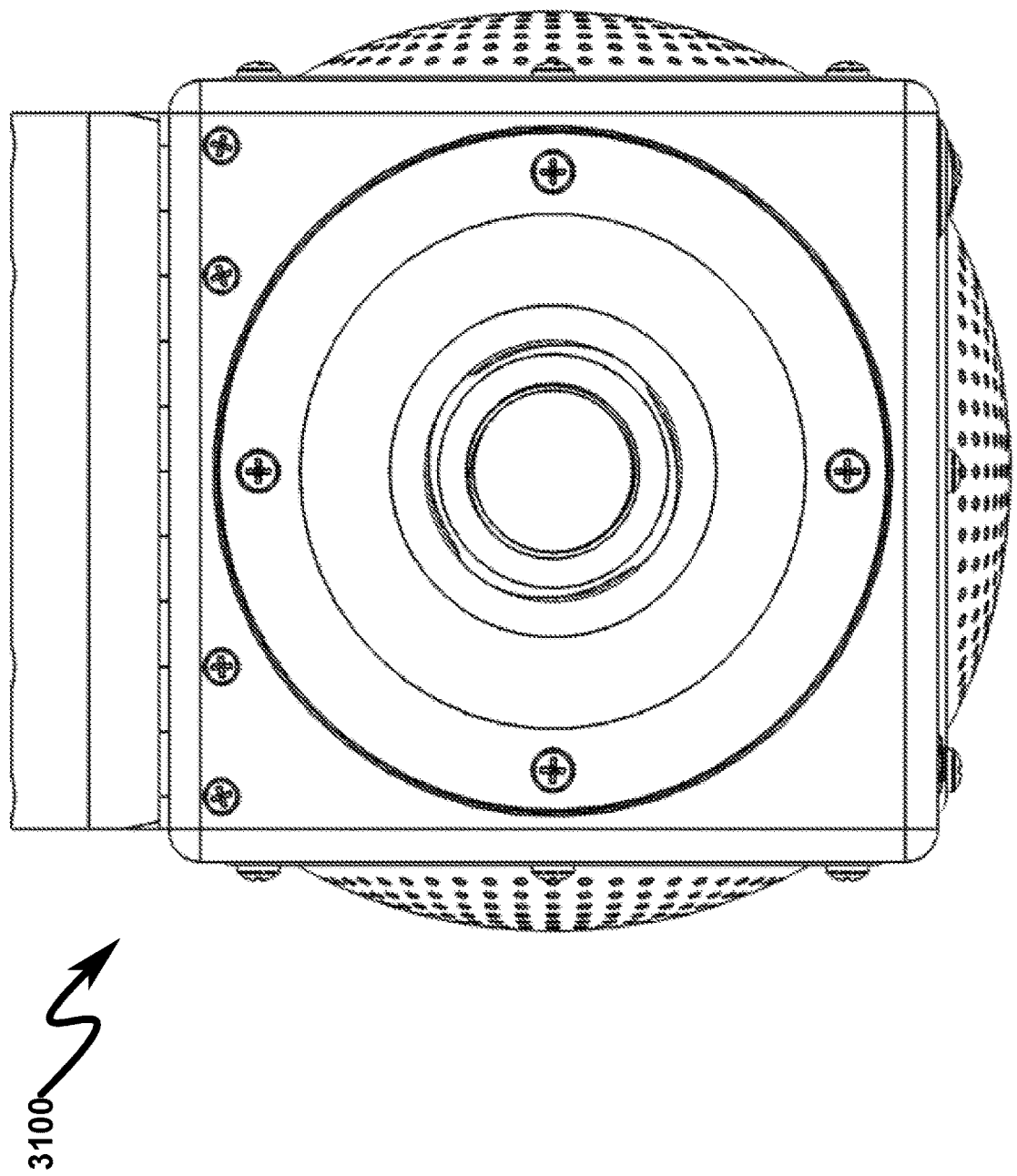
FIG. 31 illustrates a top view of a preferred exemplary modular audio module (MAM)
Figure 32:
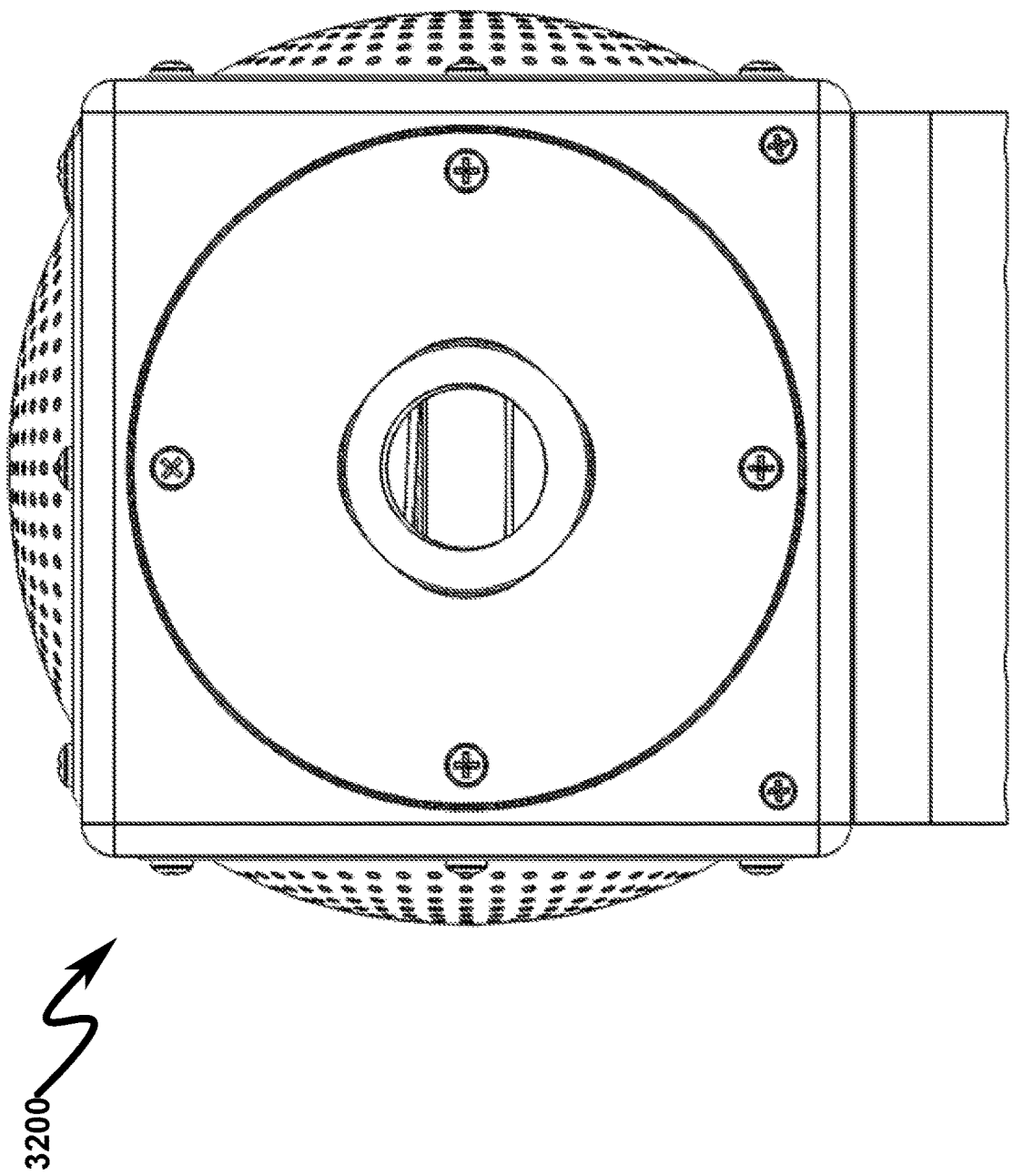
FIG. 32 illustrates a bottom view of a preferred exemplary modular audio module (MAM)
Figure 33:
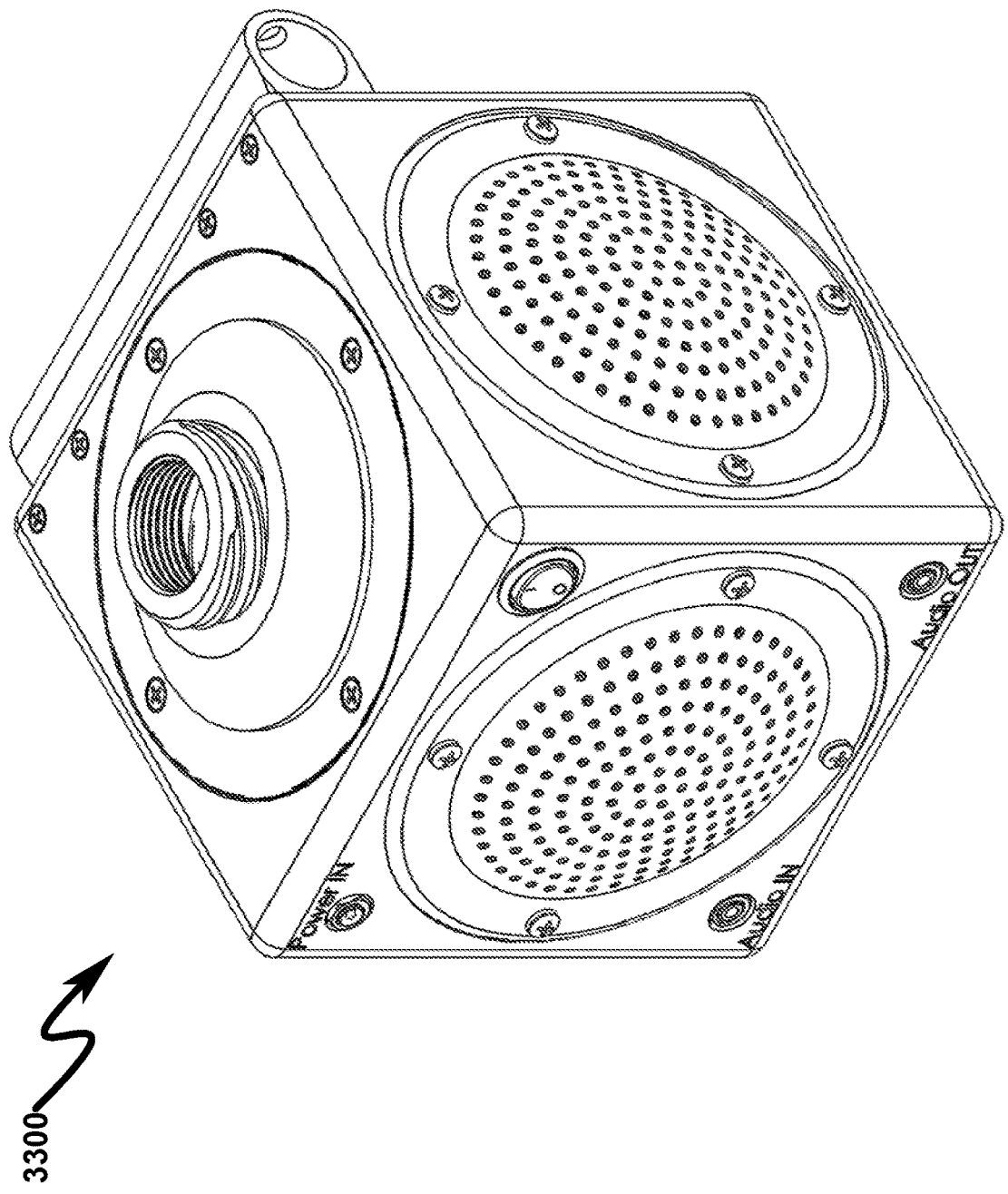
FIG. 33 illustrates a top right front perspective view of a preferred exemplary modular audio module (MAM)
Figure 34:
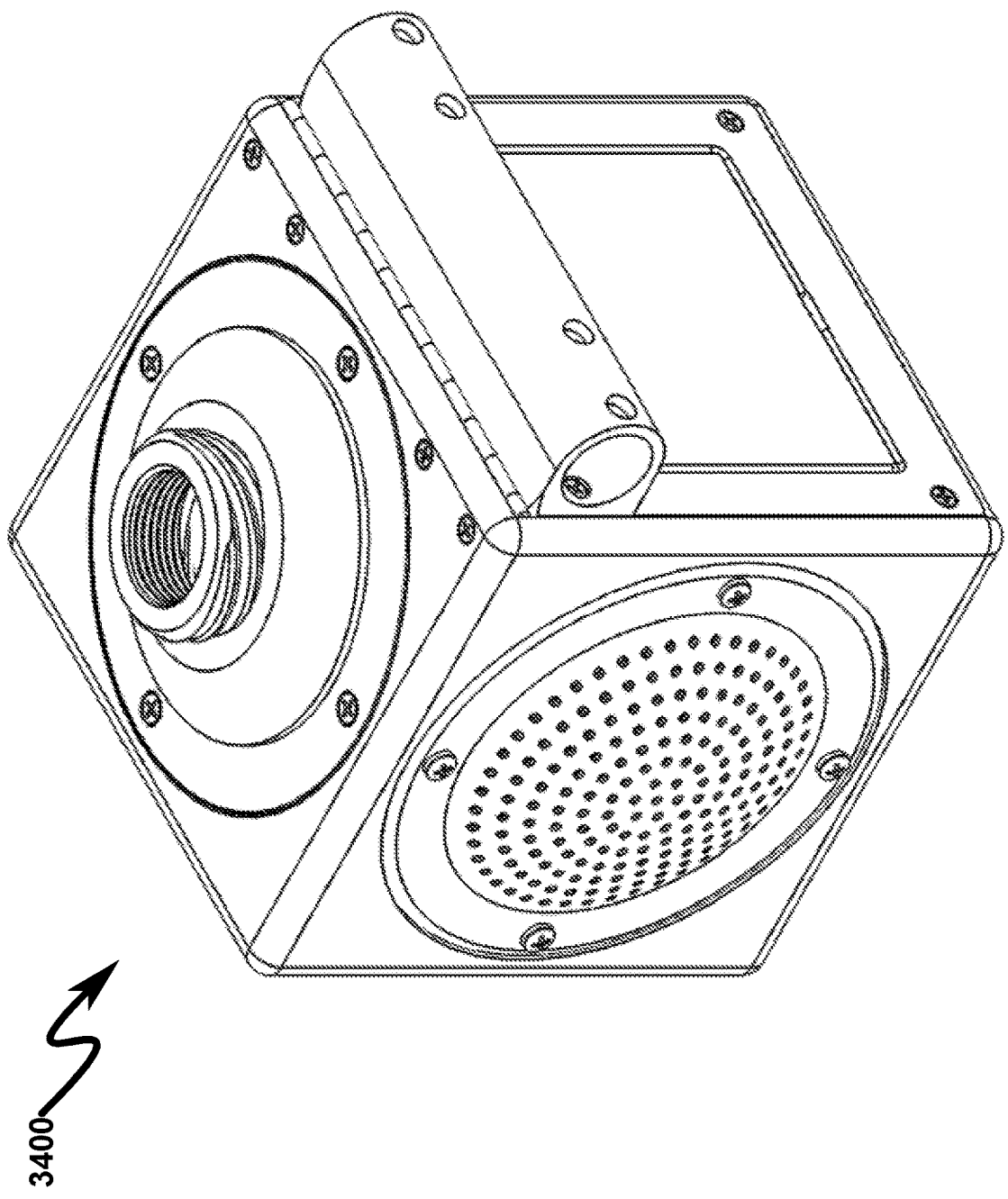
FIG. 34 illustrates a top right rear perspective view of a preferred exemplary modular audio module (MAM)
Figure 35:
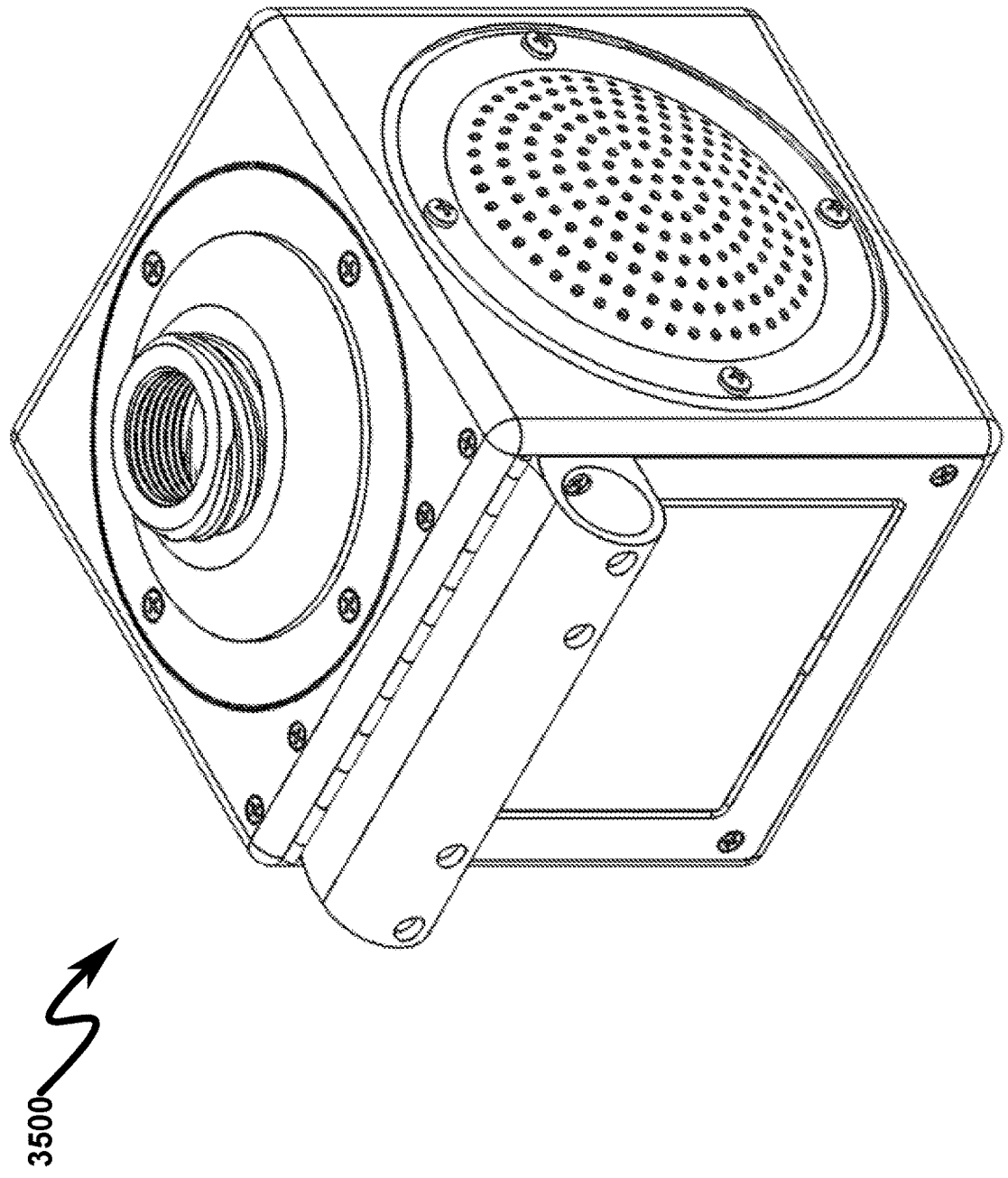
FIG. 35 illustrates a top left rear perspective view of a preferred exemplary modular audio module (MAM)
Figure 36:
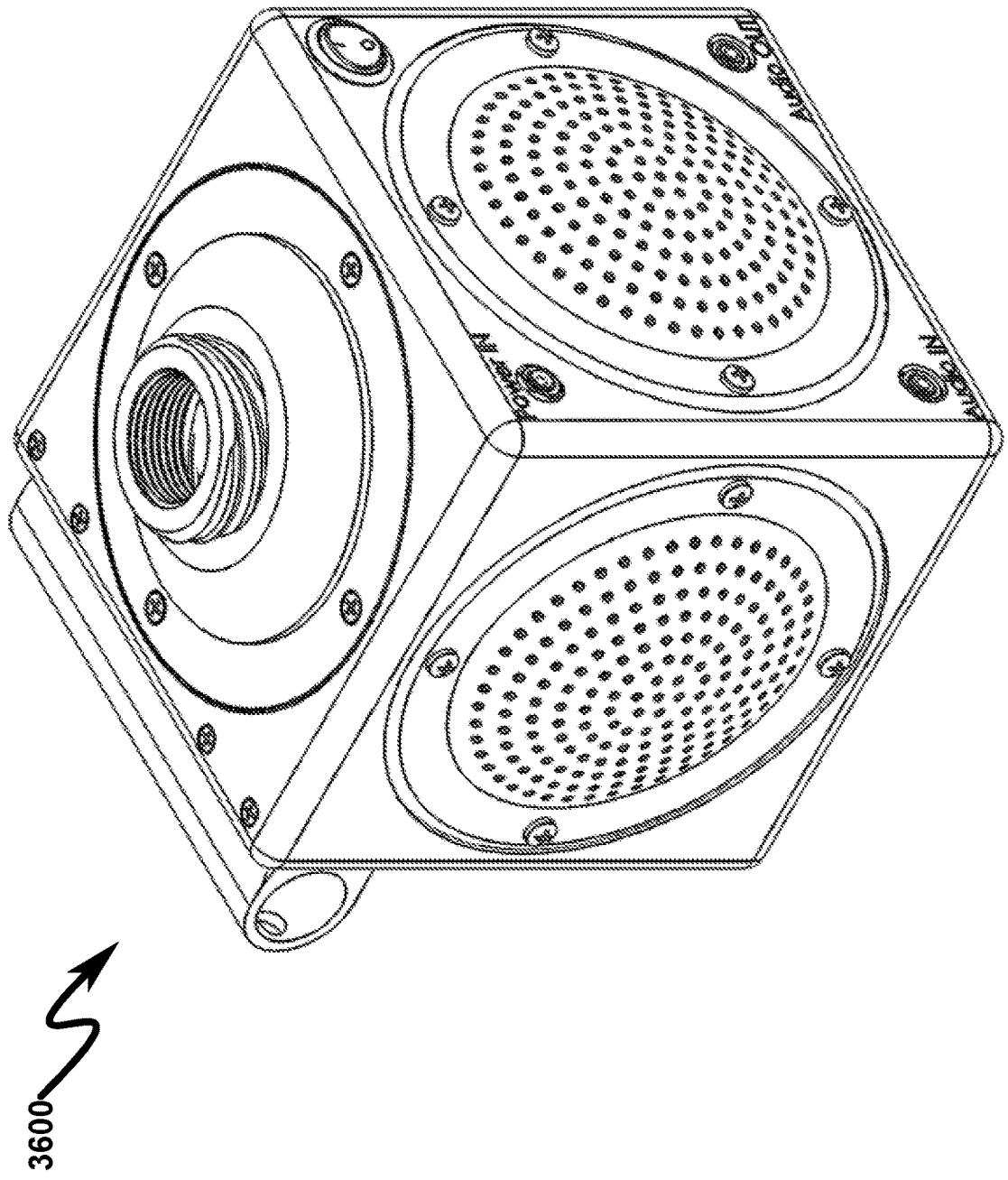
FIG. 36 illustrates a top left front perspective view of a preferred exemplary modular audio module (MAM)
Figure 37:
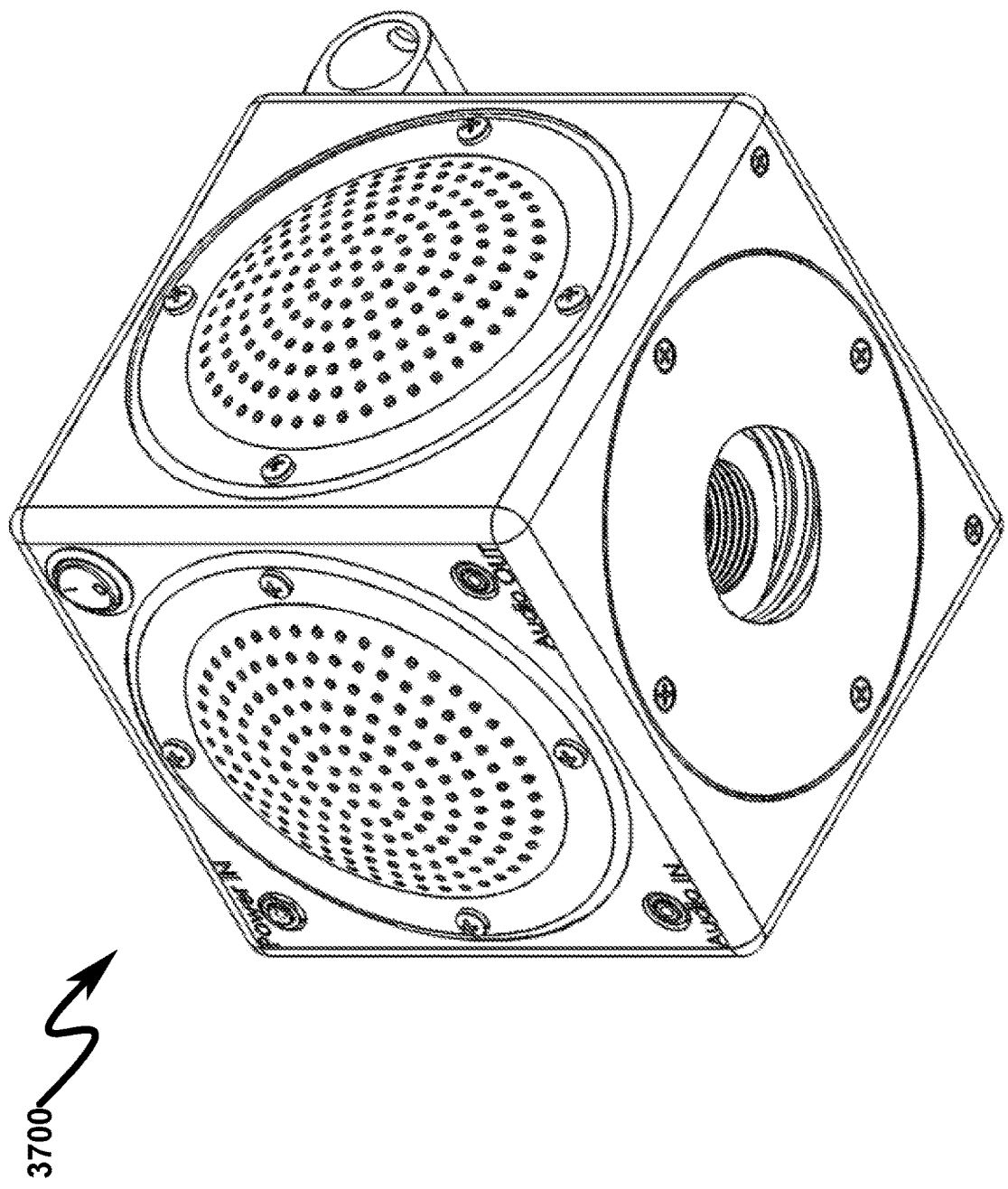
FIG. 37 illustrates a bottom right front perspective view of a preferred exemplary modular audio module (MAM)
Figure 38:
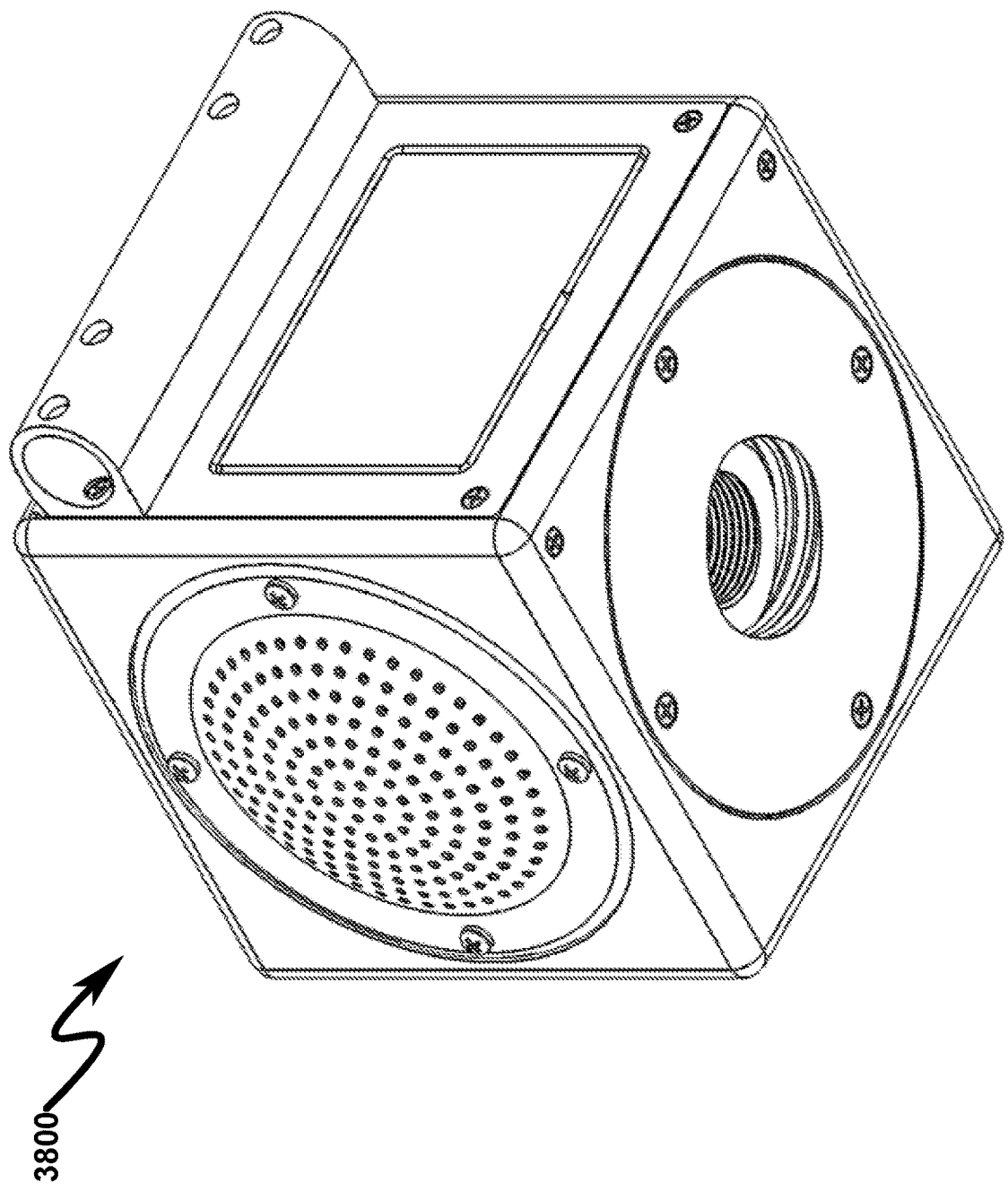
FIG. 38 illustrates a bottom right rear perspective view of a preferred exemplary modular audio module (MAM)
Figure 39:
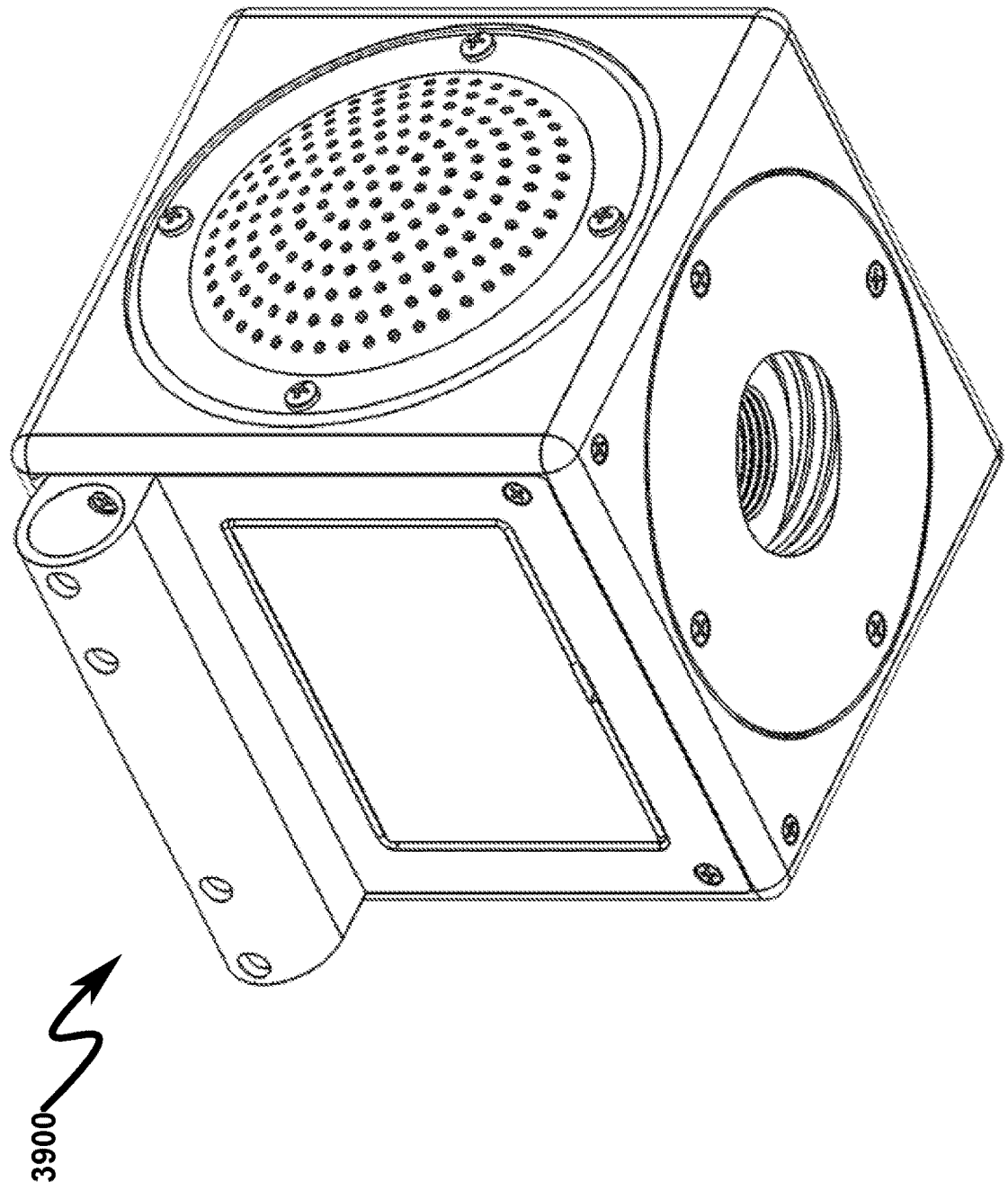
FIG. 39 illustrates a bottom left rear perspective view of a preferred exemplary modular audio module (MAM)
Figure 40:
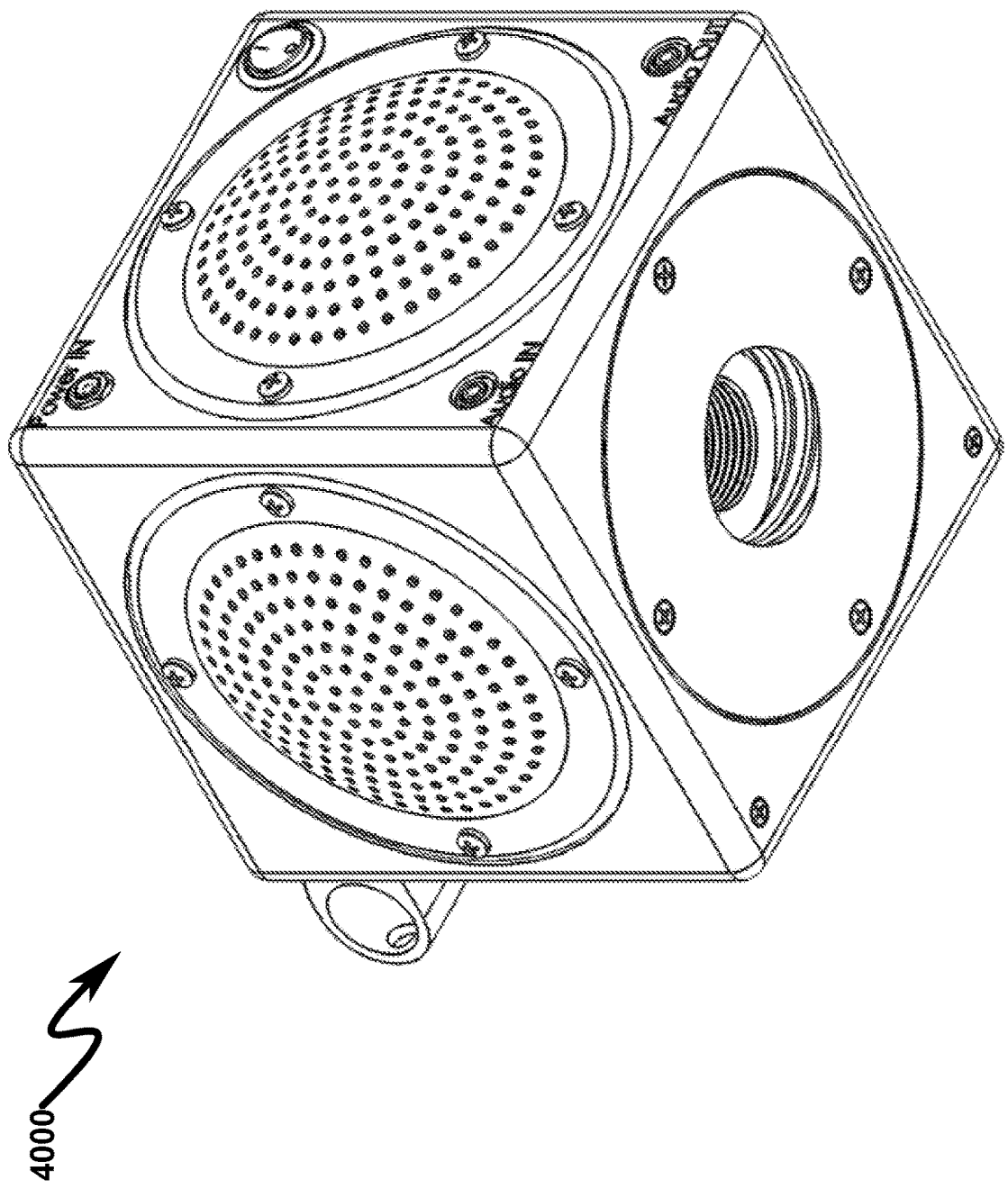
FIG. 40 illustrates a bottom left front perspective view of a preferred exemplary modular audio module (MAM)
Figure 41:
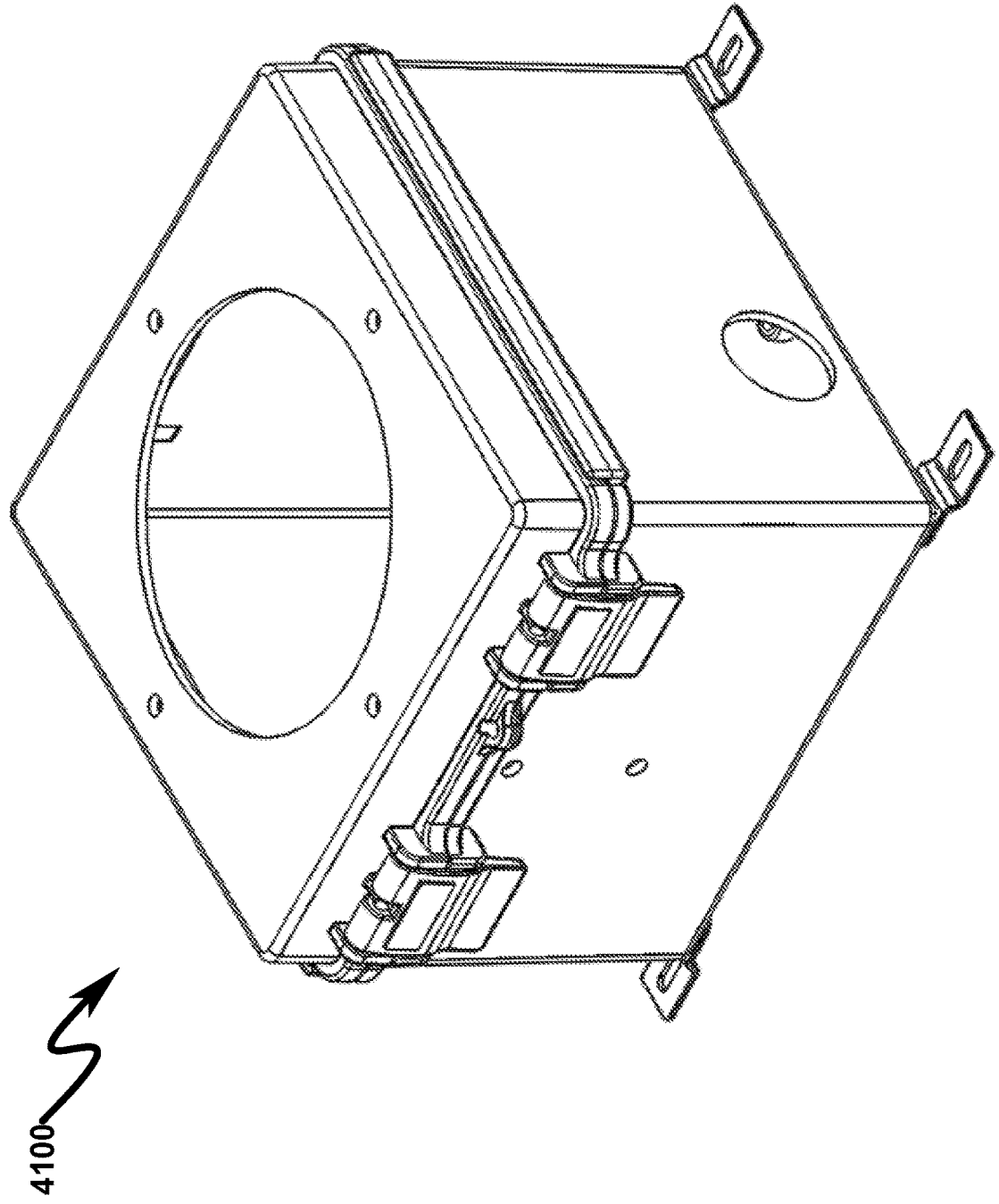
FIG. 41 illustrates a top right front perspective view of alternative modular audio module (MAM) enclosure incorporating water-tight seals.
Figure 42:
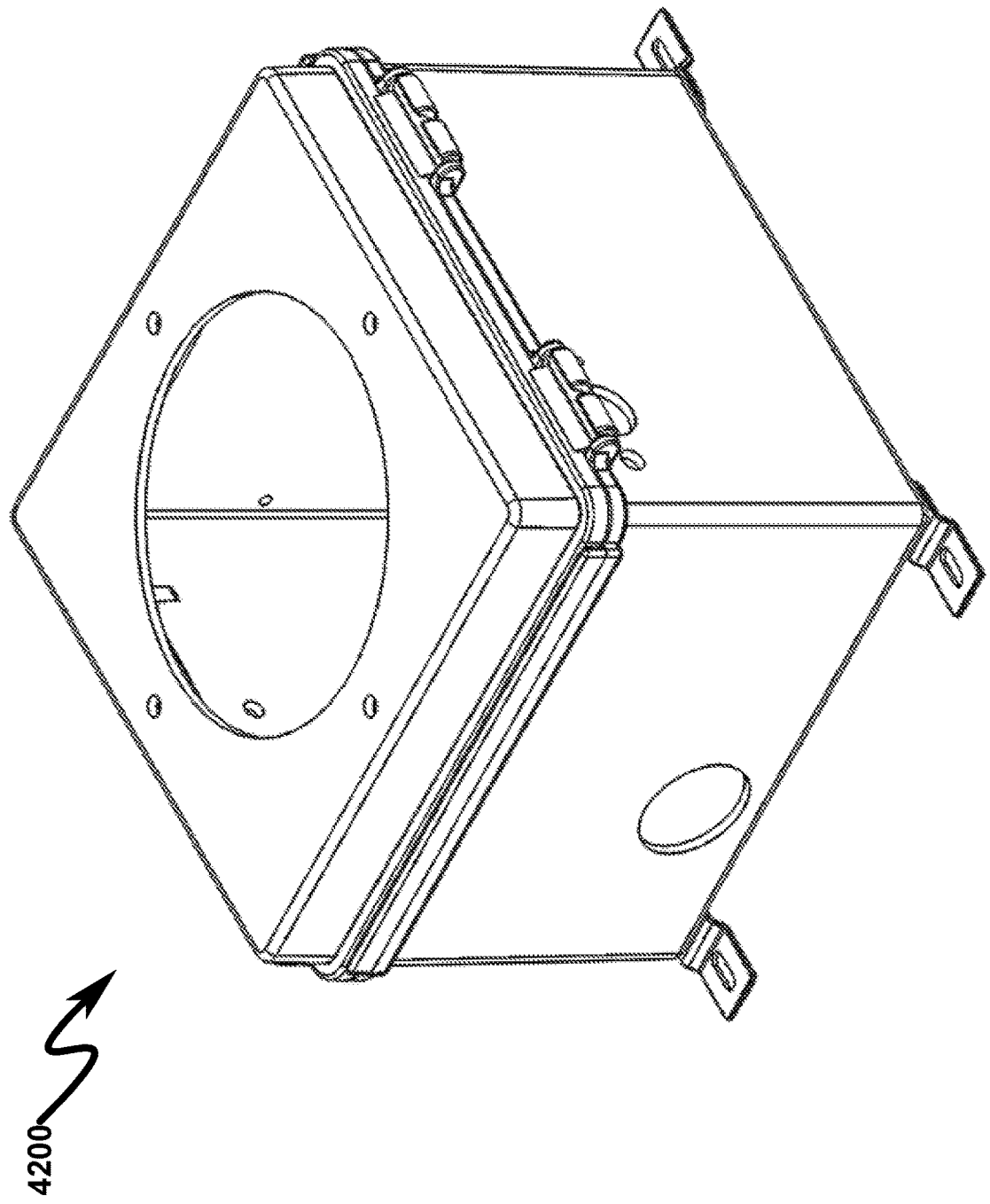
FIG. 42 illustrates a top right rear perspective view of alternative modular audio module (MAM) enclosure incorporating water-tight seals.
Figure 43:
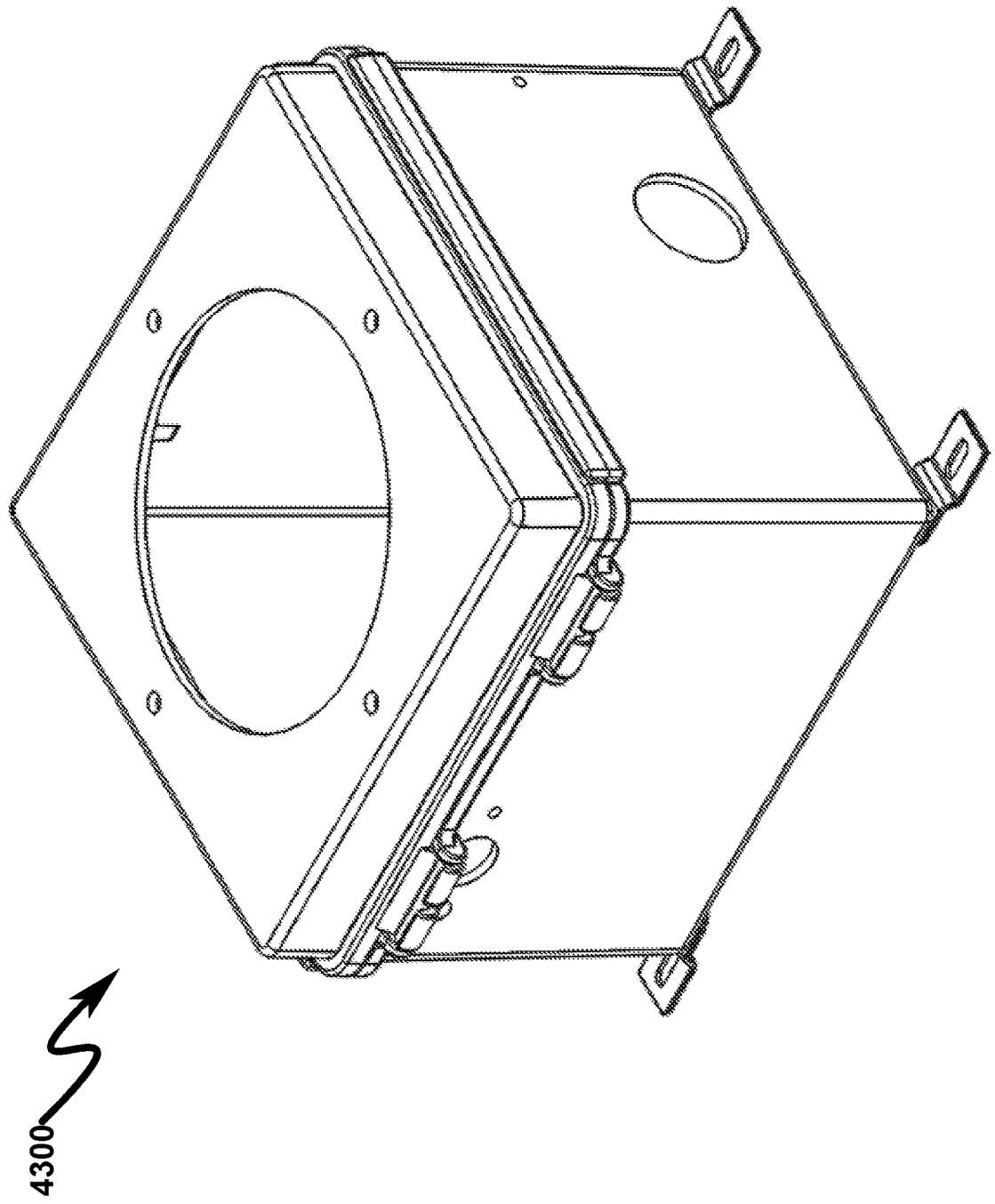
FIG. 43 illustrates a top left rear perspective view of alternative modular audio module (MAM) enclosure incorporating water-tight seals.
Figure 44:
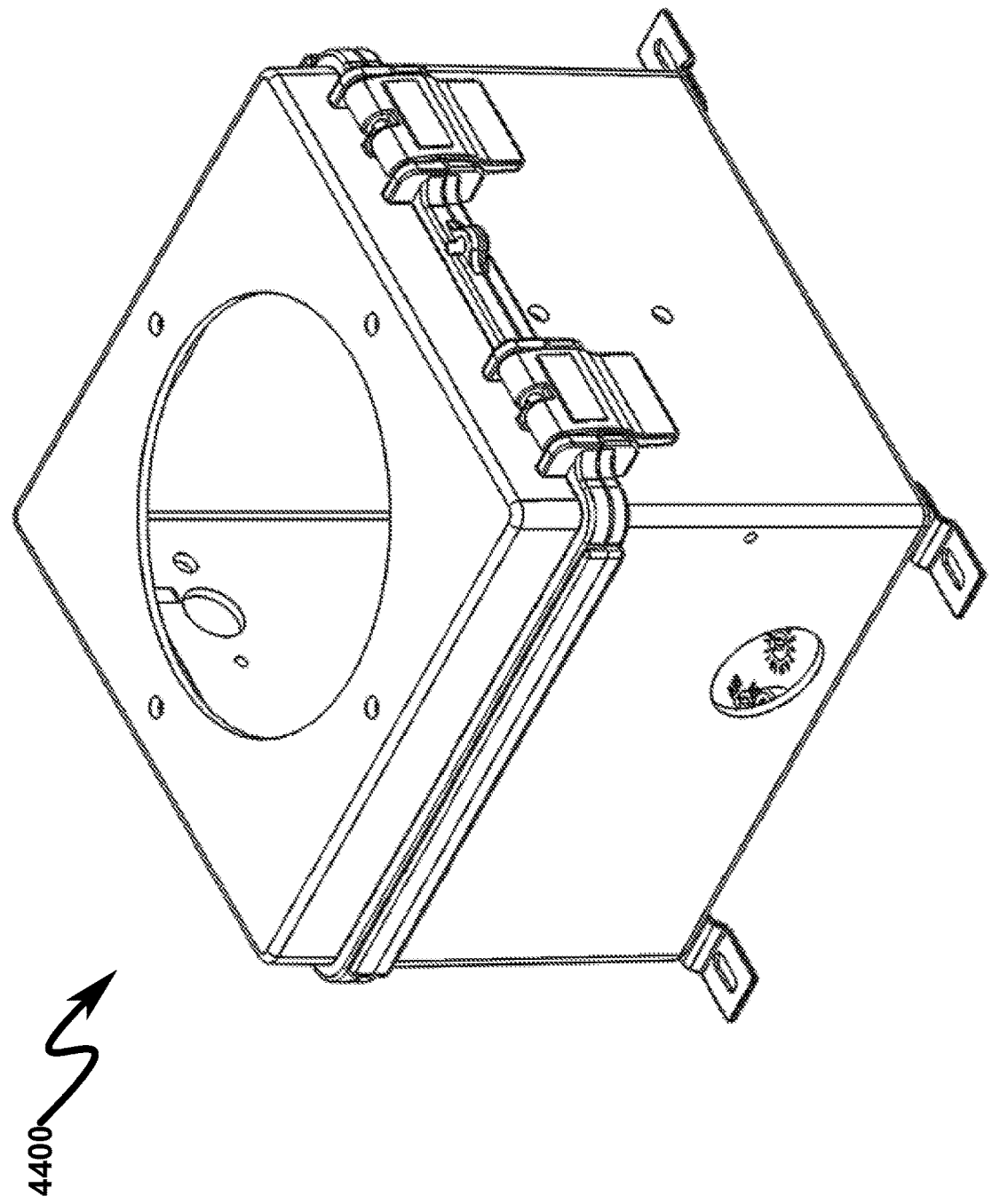
FIG. 44 illustrates a top left front perspective view of alternative modular audio module (MAM) enclosure incorporating water-tight seals.
Figure 45:
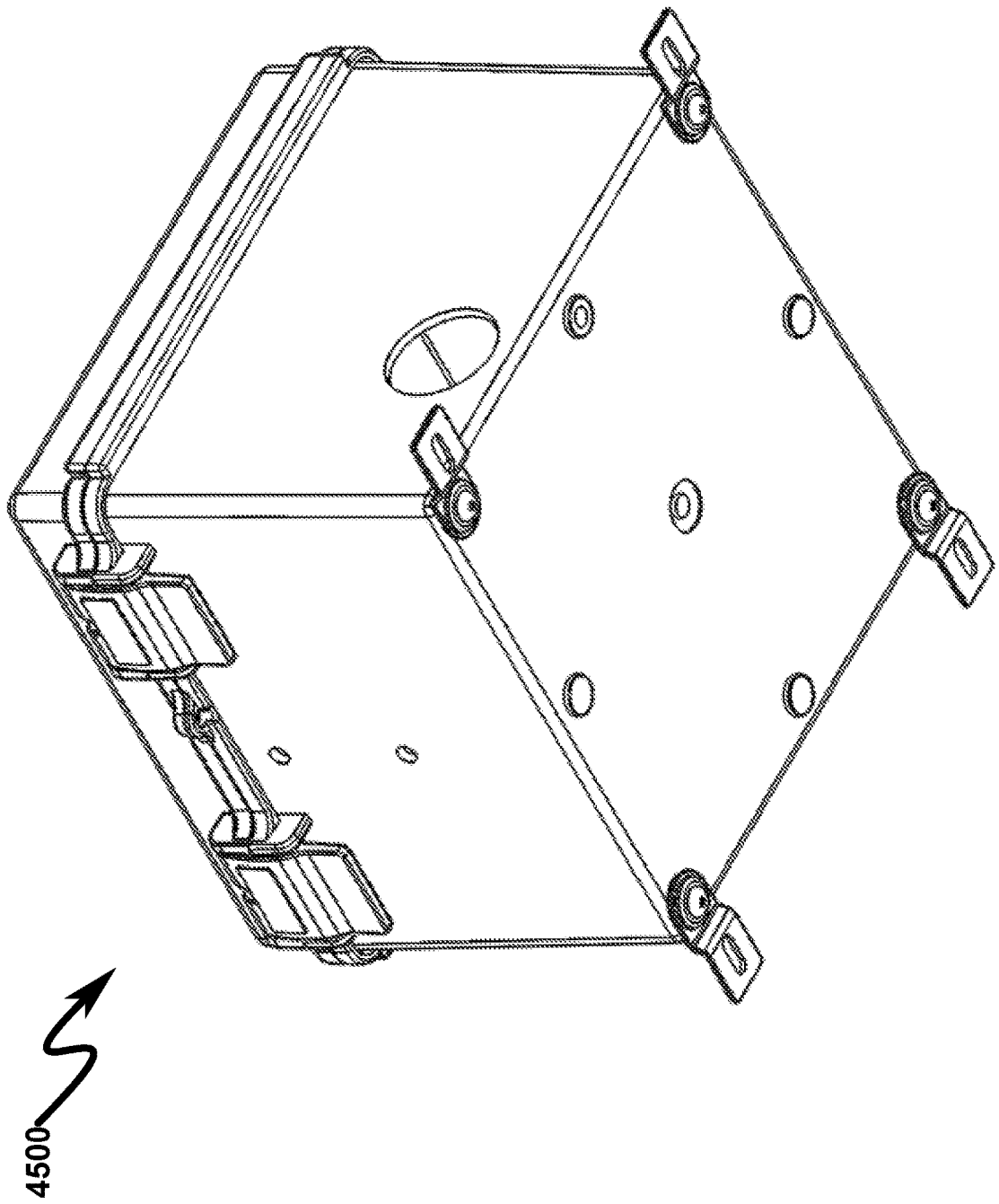
FIG. 45 illustrates a bottom right front perspective view of alternative modular audio module (MAM) enclosure incorporating water-tight seals.
Figure 46:
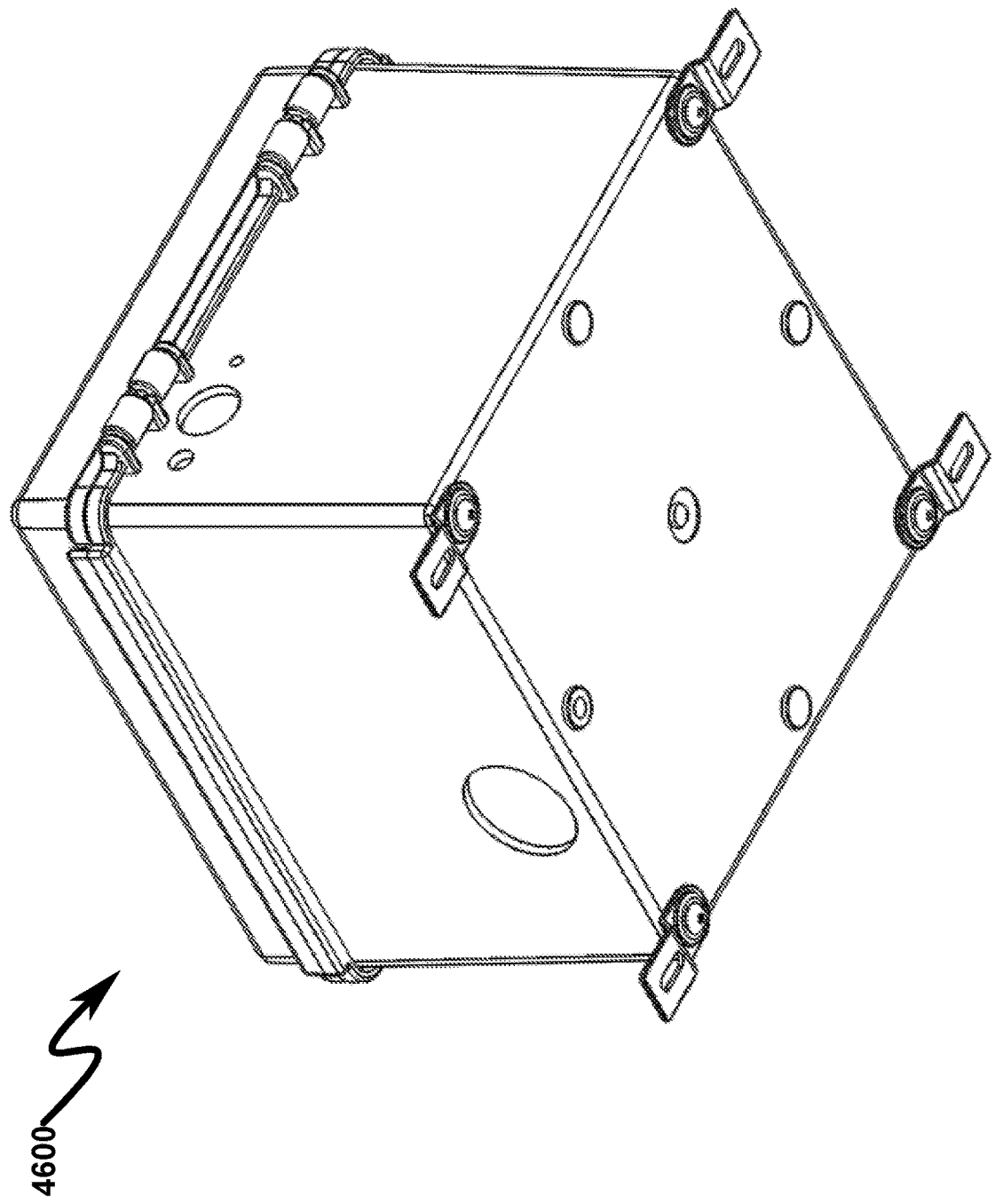
FIG. 46 illustrates a bottom right rear perspective view of alternative modular audio module (MAM) enclosure incorporating water-tight seals.
Figure 47:
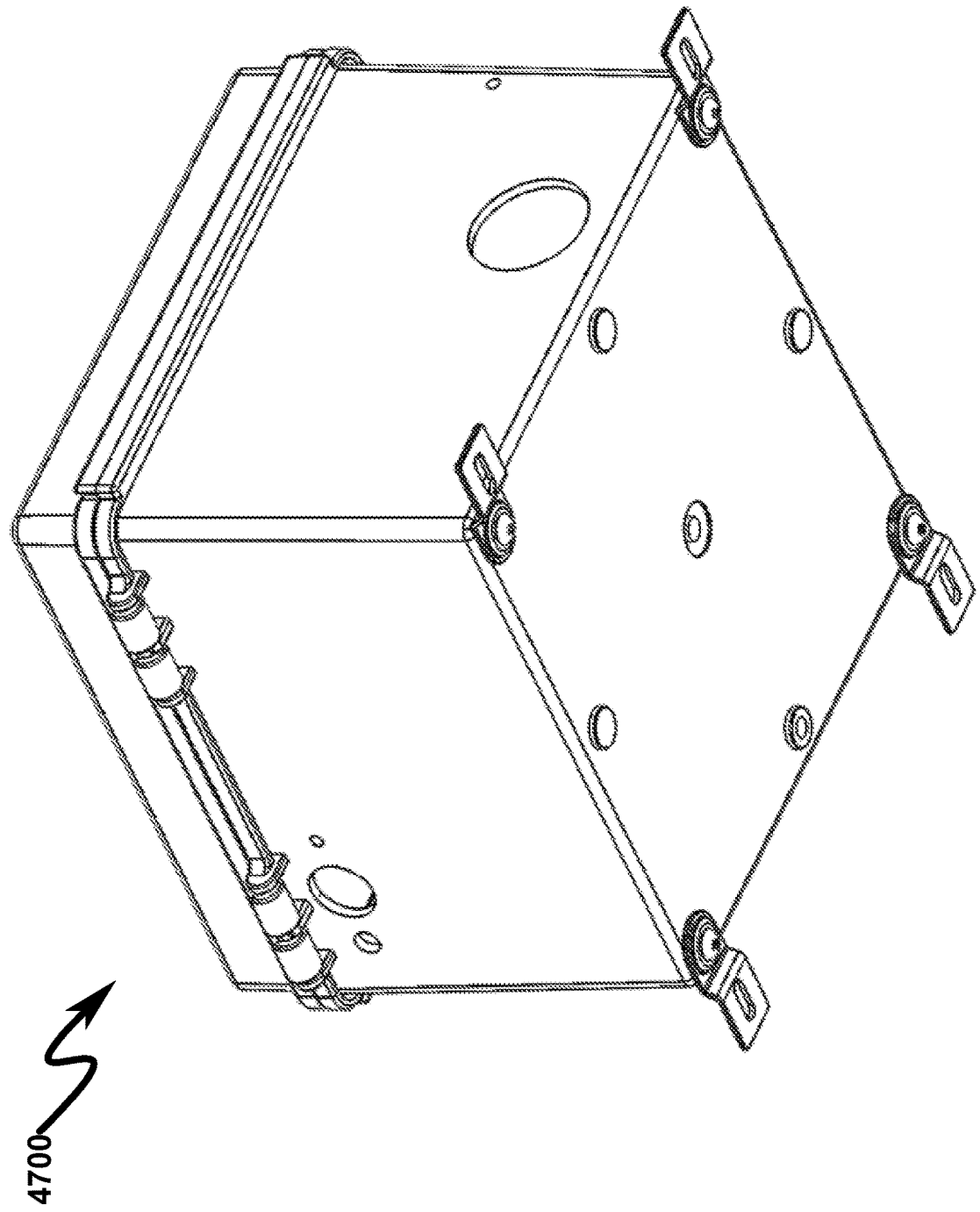
FIG. 47 illustrates a bottom left rear perspective view of alternative modular audio module (MAM) enclosure incorporating water-tight seals.
Figure 48:
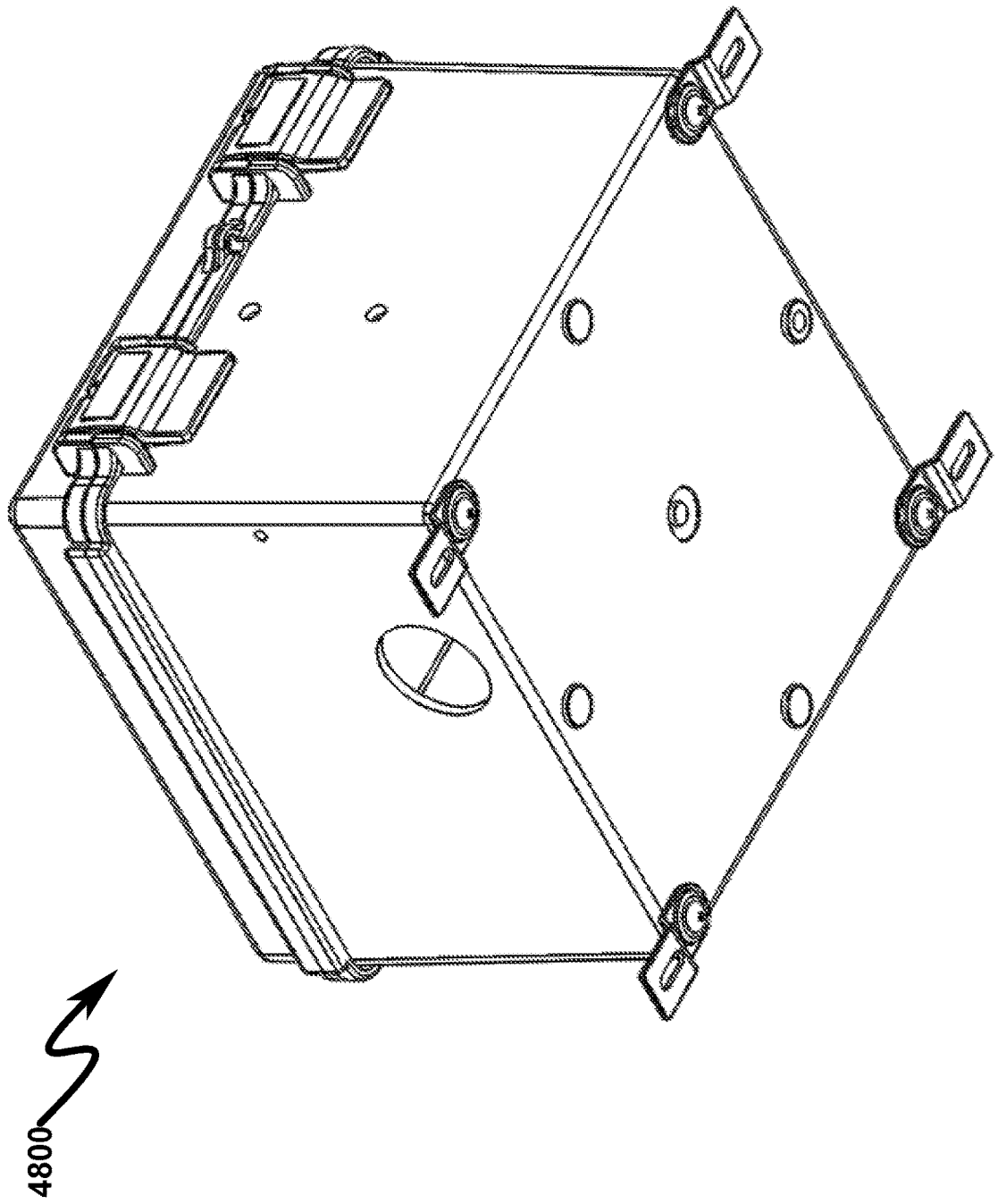
FIG. 48 illustrates a bottom left front perspective view of alternative modular audio module (MAM) enclosure incorporating water-tight seals.

A preferred exemplary embodiment of a mobile audio module (MAM) is generally depicted in FIG. 25 (2500)-FIG. 40 (4000). The MAM (2510, 2610) generally comprises a mobile containing enclosure (MCE) (2511, 2611) comprising a box having a front face (FF), right face (RF), left face (LF), top face (TF), and bottom face (BF), and a rear opening (RO). The FF typically incorporates an audio speaker grill (ASG) (2512, 2612) covering a mobile audio speaker (MAS). The RF and LF incorporate one or more audio speaker grill (ASG) (2513, 2514, 2613, 2614). The FF may incorporate AUDIO INPUT (2515), AUDIO OUTPUT (2516), and POWER INPUT (2517) jacks as well as a MASTER POWER ON/OFF switch (2518). Typical configurations of the MAM (2510, 2610) incorporate one or more hermaphroditic plate connectors (HPC) (2531, 2631) that can be used to support the MAM (2510, 2610) or interconnect one MAM (2510, 2610) with another MAM. The RO is covered with a rear opening lid (ROL) (2620) that is mechanically coupled to the mobile containing enclosure (2511, 2611) with a hinge (2619) or other equivalent articulating mechanical device.

Note that the hermaphroditic plate connectors (HPC) (2531, 2631) allow for an enclosure alignment pathway (EAP) within the MAM to be structured for insertion of the stack alignment rod (SAR) and/or stack index rod (SIR) to penetrate through the EAP thus capture and secure the MAM in an aligned MAM stack (AMS).

Alternative MAM Enclosure and Assembly (4900)-(6400)

Figure 49:
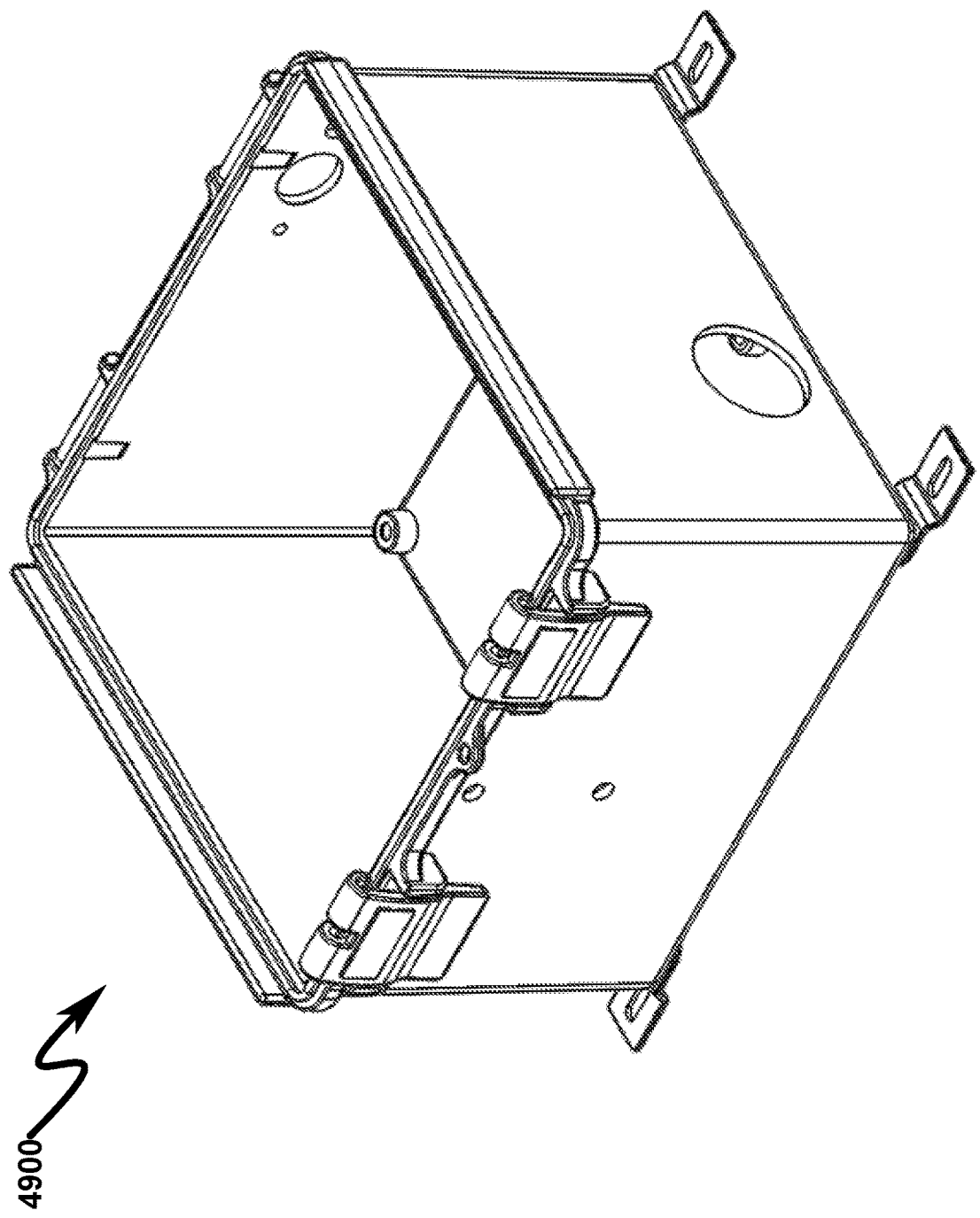
FIG. 49 illustrates a top right front perspective view of alternative modular audio module (MAM) enclosure bottom shell incorporating water-tight seals.
Figure 50:
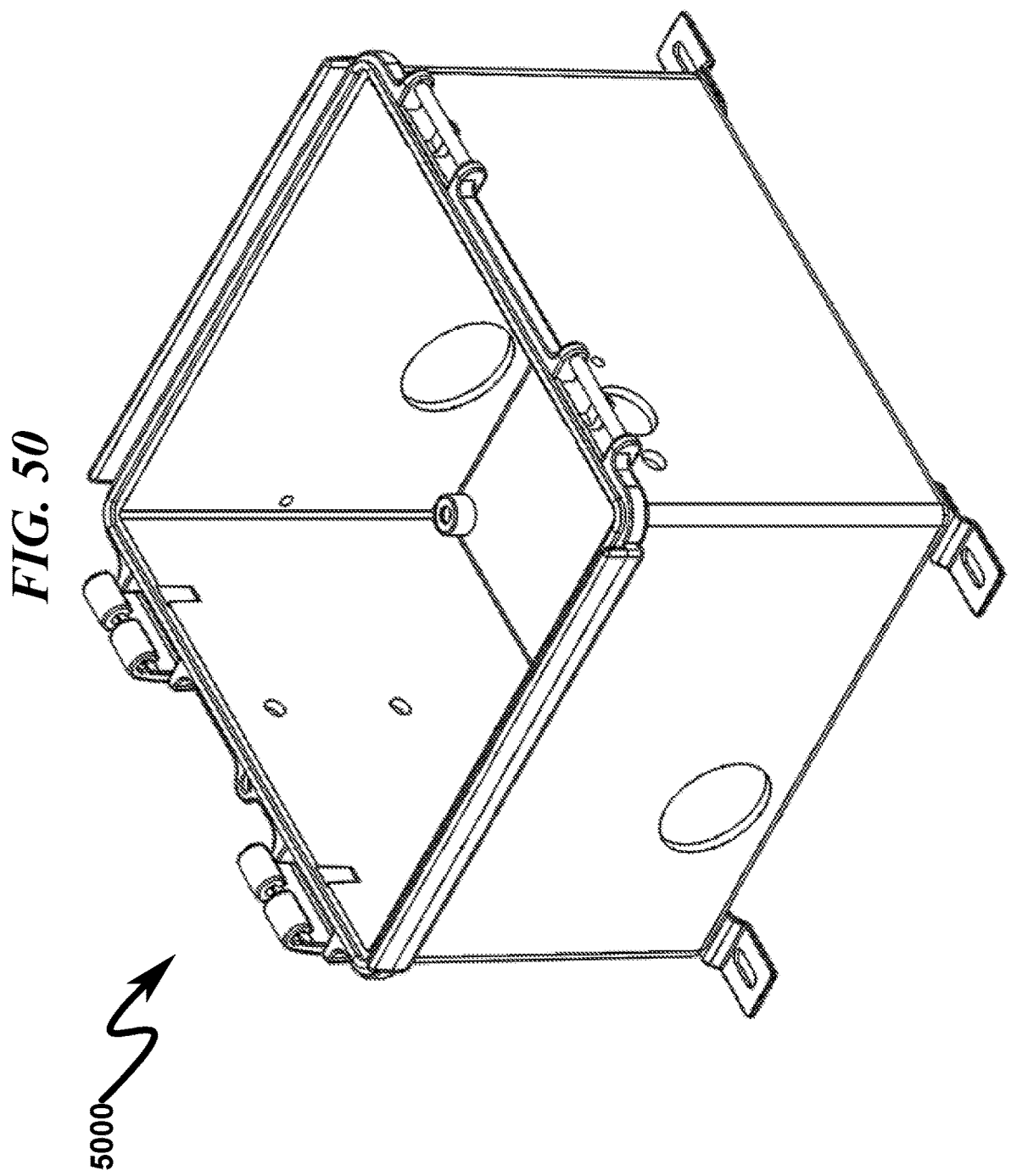
FIG. 50 illustrates a top right rear perspective view of alternative modular audio module (MAM) enclosure bottom shell incorporating water-tight seals.
Figure 51:
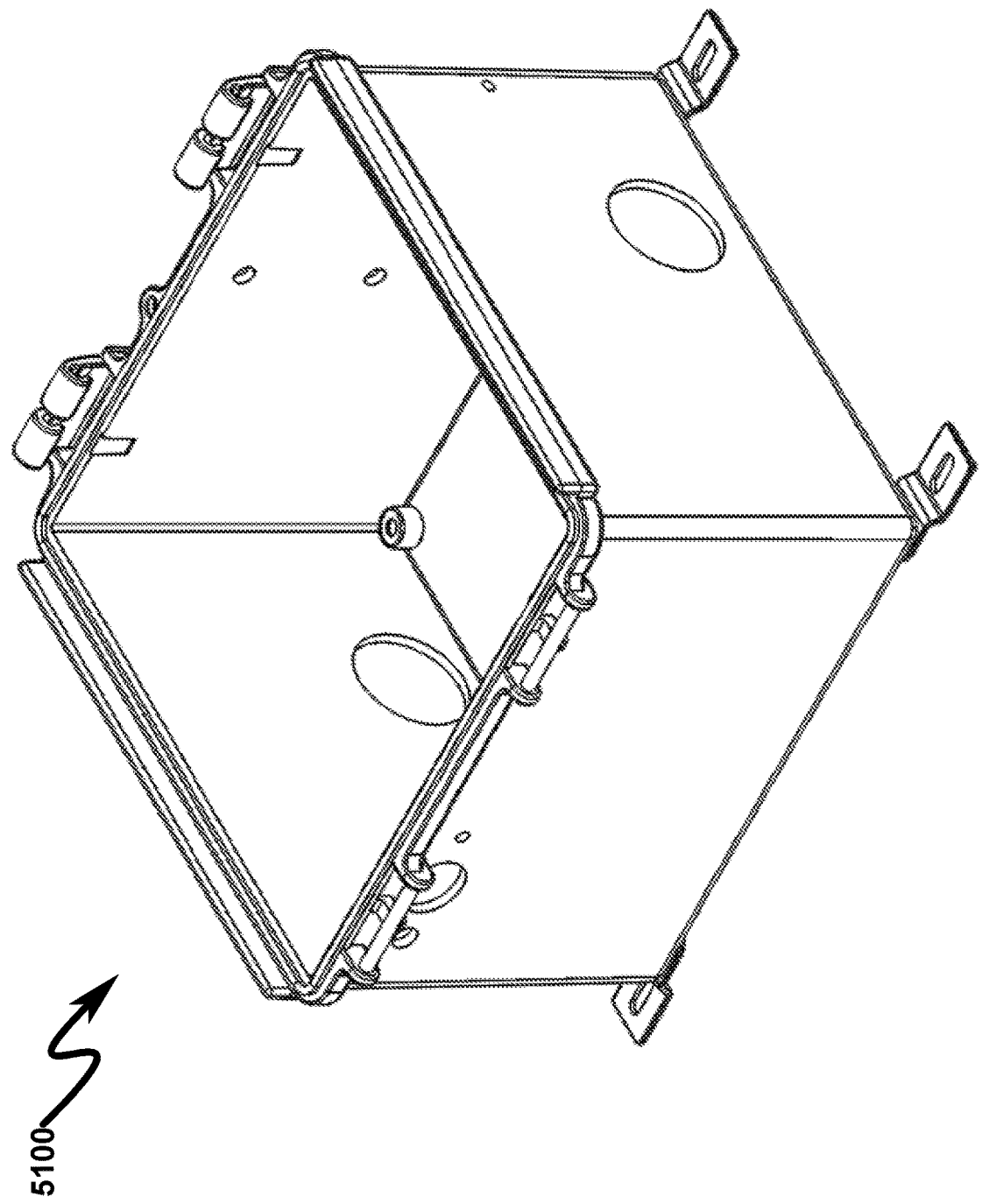
FIG. 51 illustrates a top left rear perspective view of alternative modular audio module (MAM) enclosure bottom shell incorporating water-tight seals.
Figure 52:
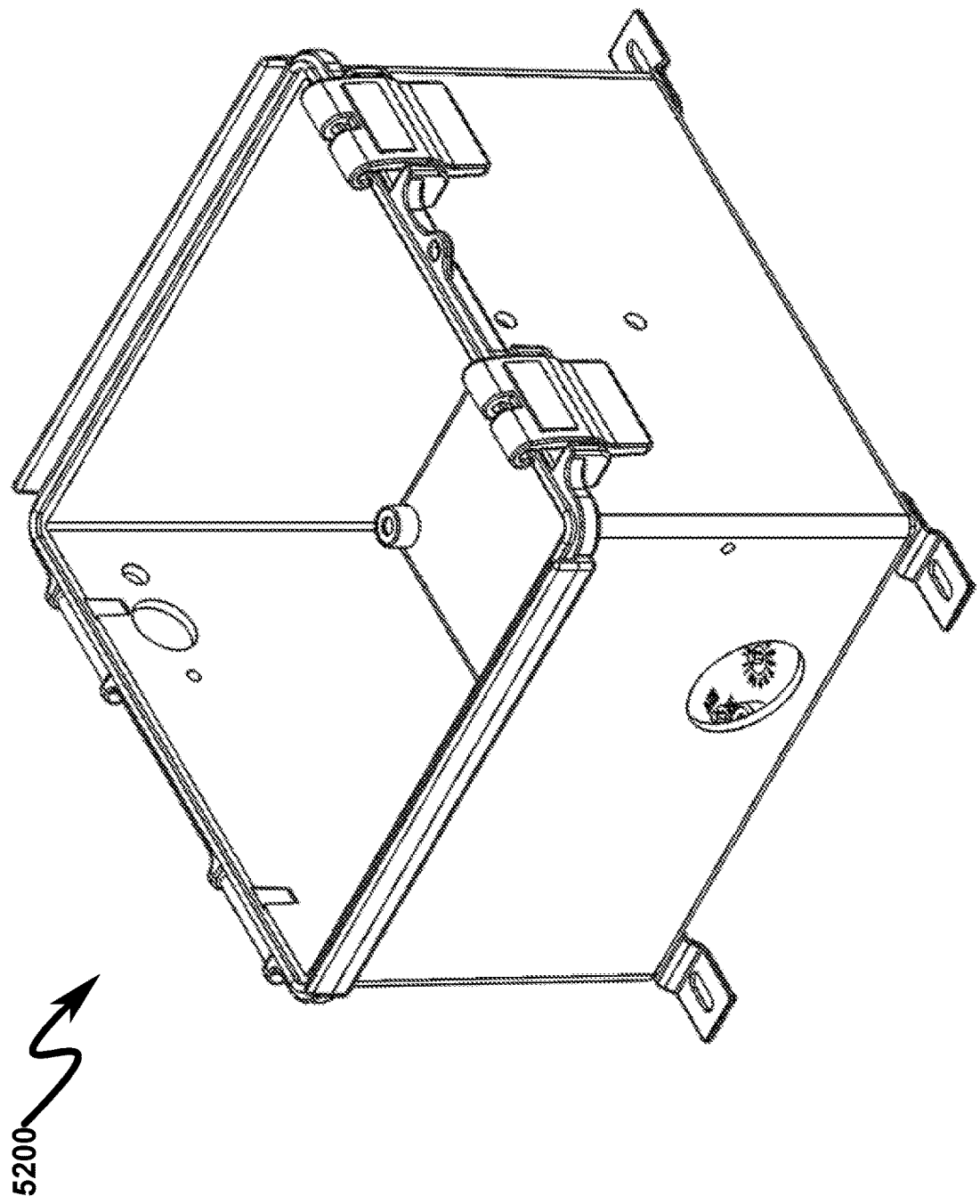
FIG. 52 illustrates a top left front perspective view of alternative modular audio module (MAM) enclosure bottom shell incorporating water-tight seals.
Figure 53:
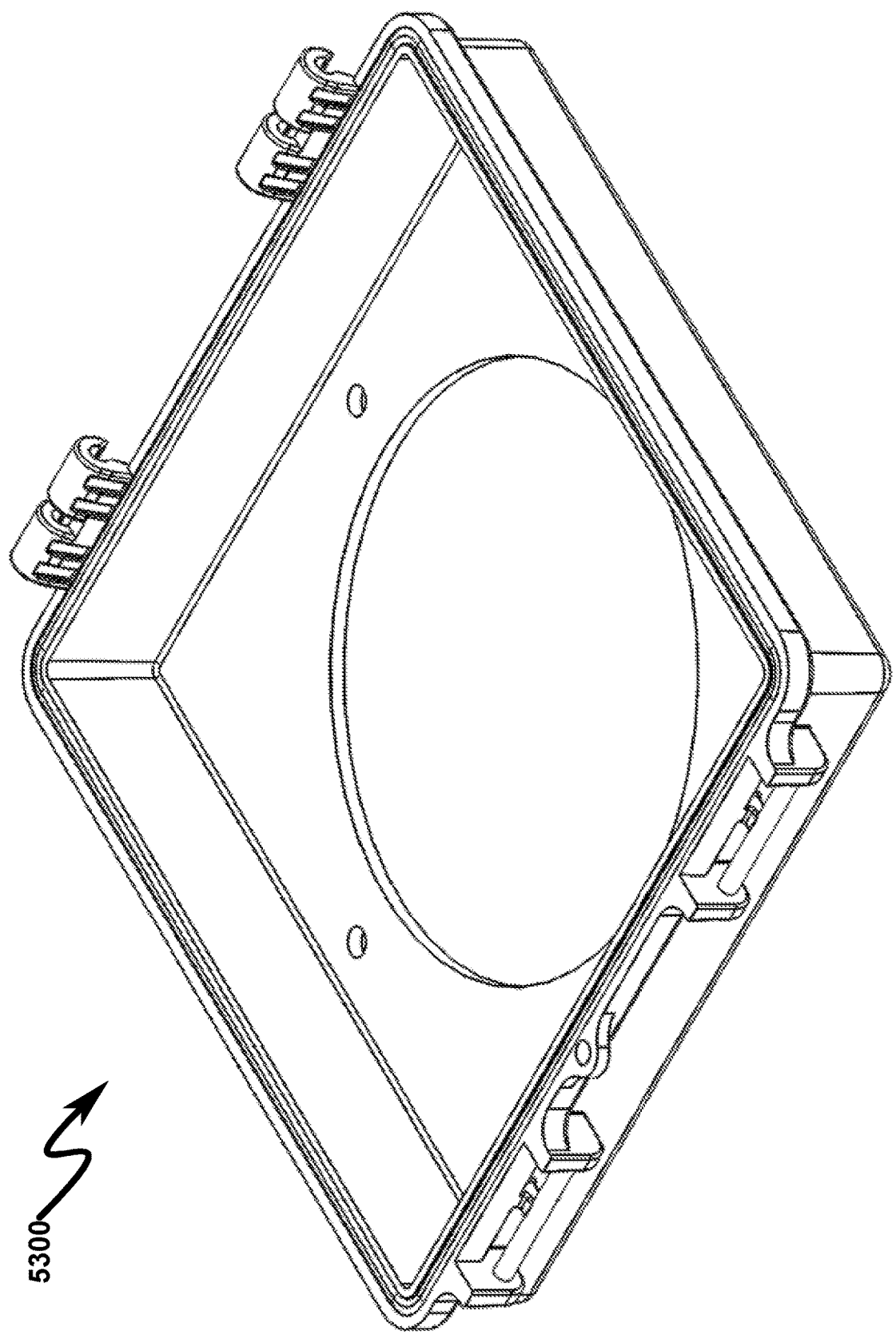
FIG. 53 illustrates a bottom right front perspective view of alternative modular audio module (MAM) enclosure top shell cover incorporating water-tight seals.
Figure 54:
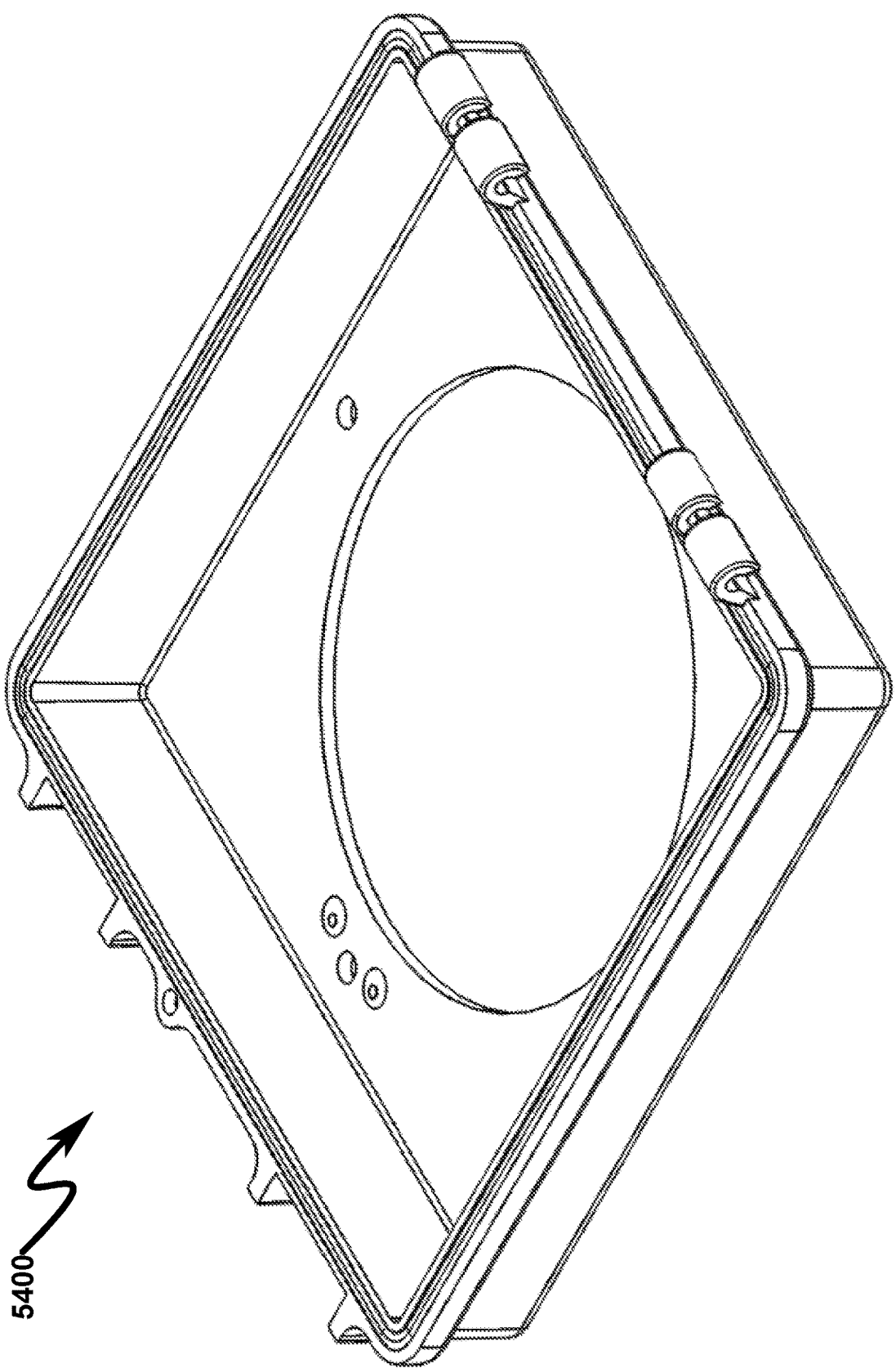
FIG. 54 illustrates a bottom right rear perspective view of alternative modular audio module (MAM) enclosure top shell cover incorporating water-tight seals.
Figure 55:
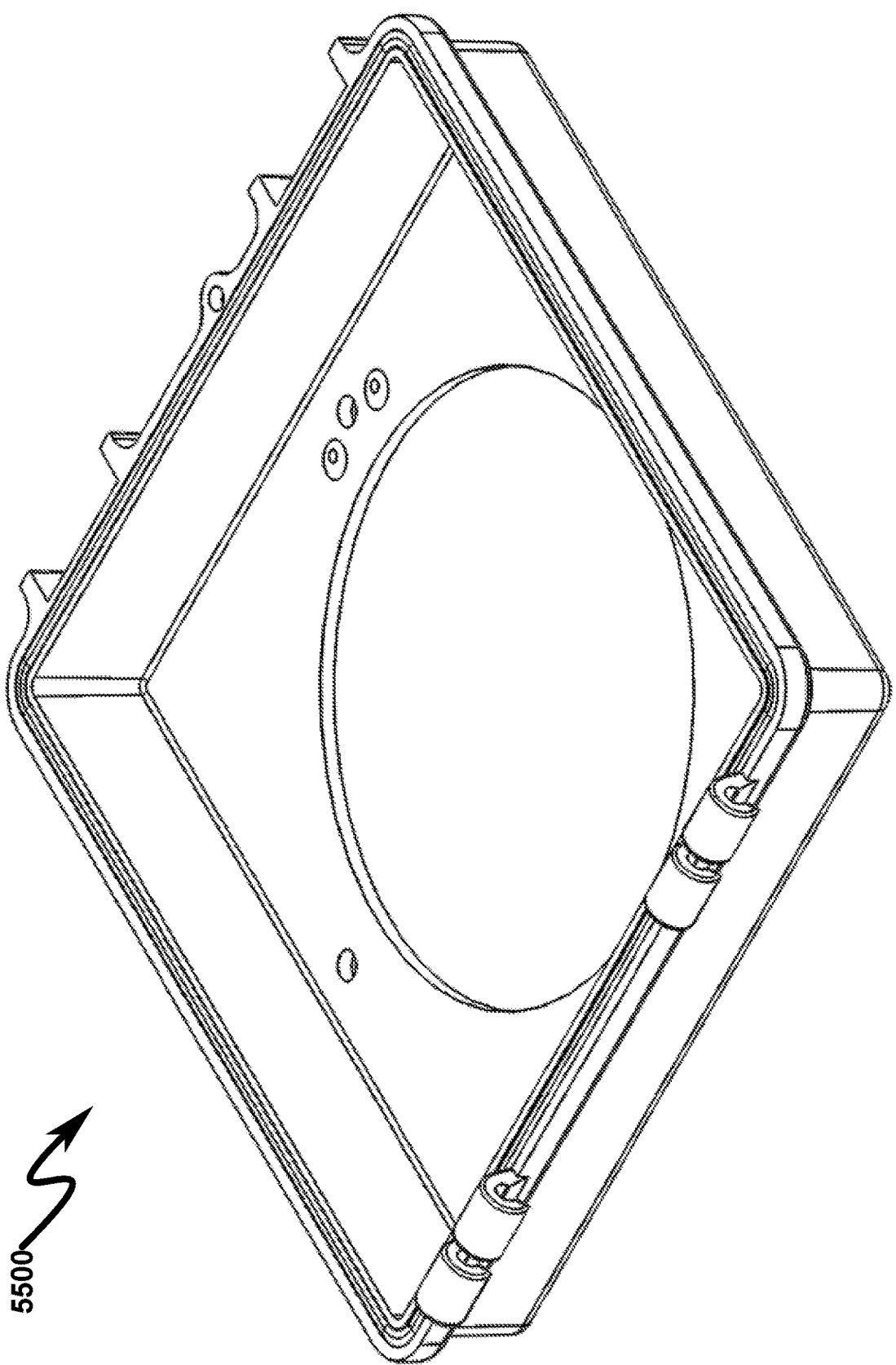
FIG. 55 illustrates a bottom left rear perspective view of alternative modular audio module (MAM) enclosure top shell cover incorporating water-tight seals.
Figure 56:
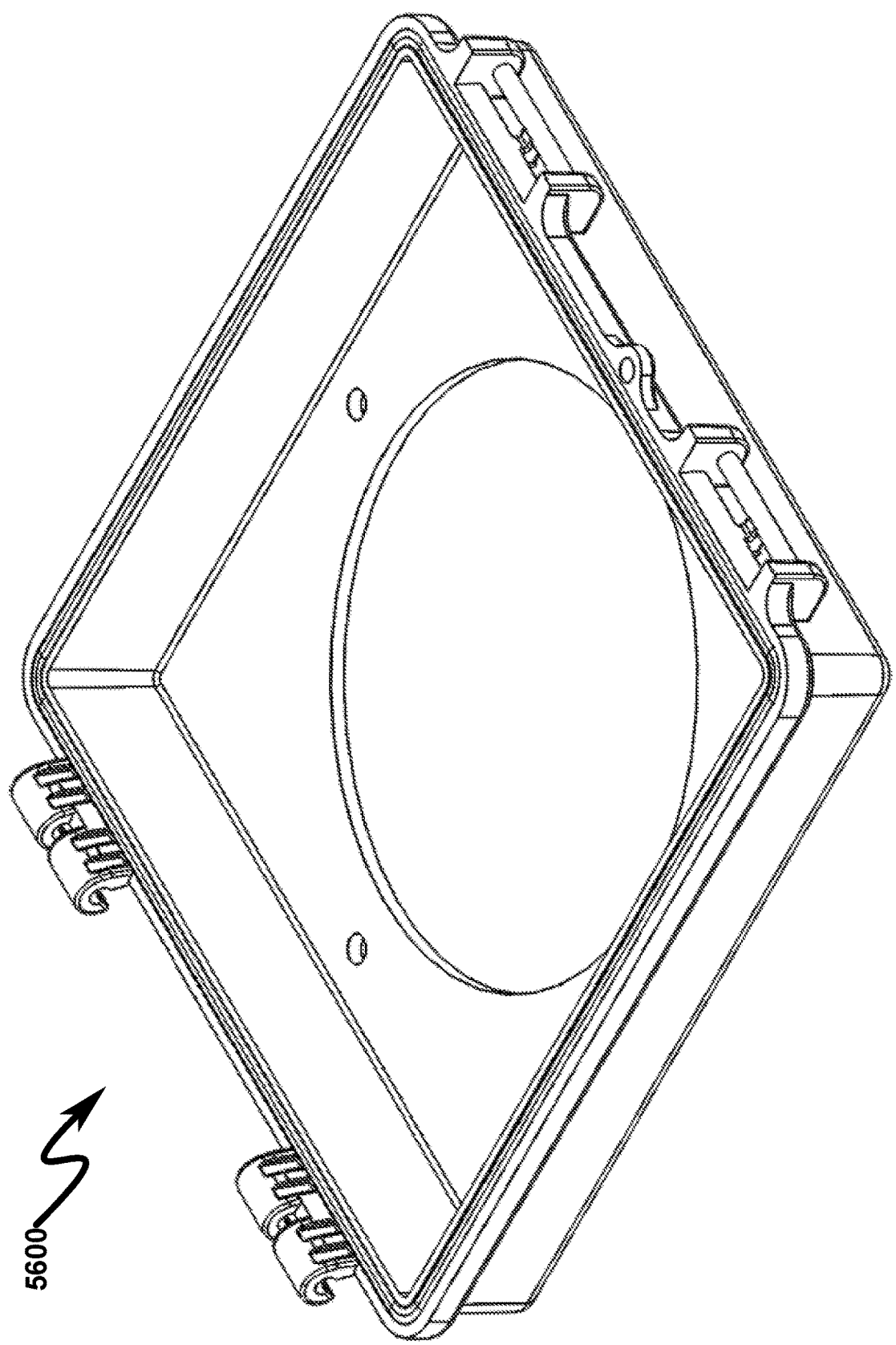
FIG. 56 illustrates a bottom left front perspective view of alternative modular audio module (MAM) enclosure top shell cover incorporating water-tight seals.

An alternative MAM enclosure incorporating water-tight seals is generally depicted in FIG. 49 (4900)-FIG. 56 (5600).

Here the enclosure openings can be fitted to an audio speaker and/or other PED detectors as required in the particular application context.

Figure 57:
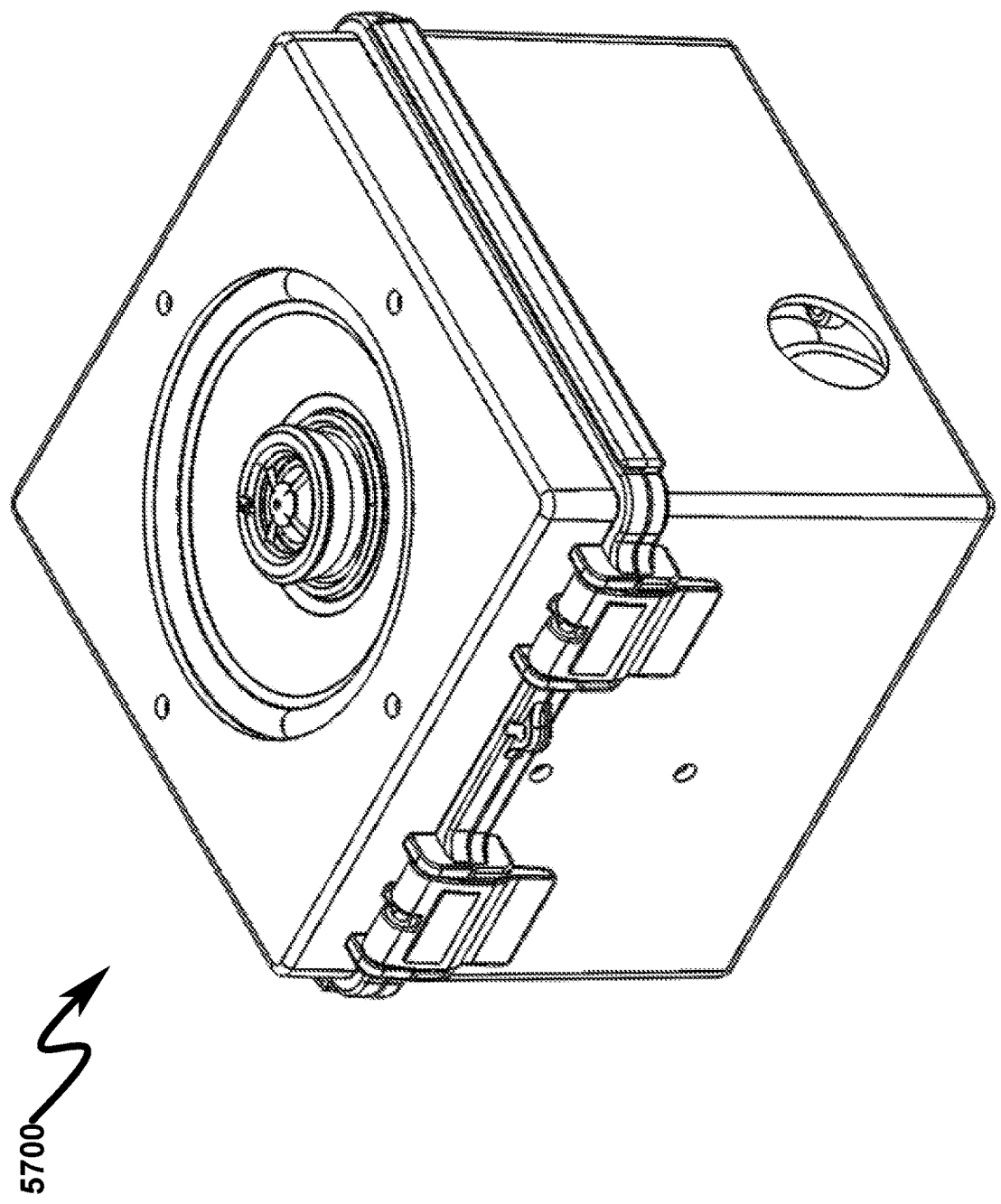
FIG. 57 illustrates a top right front perspective view of alternative modular audio module (MAM) assembly incorporating water-tight seals.
Figure 58:
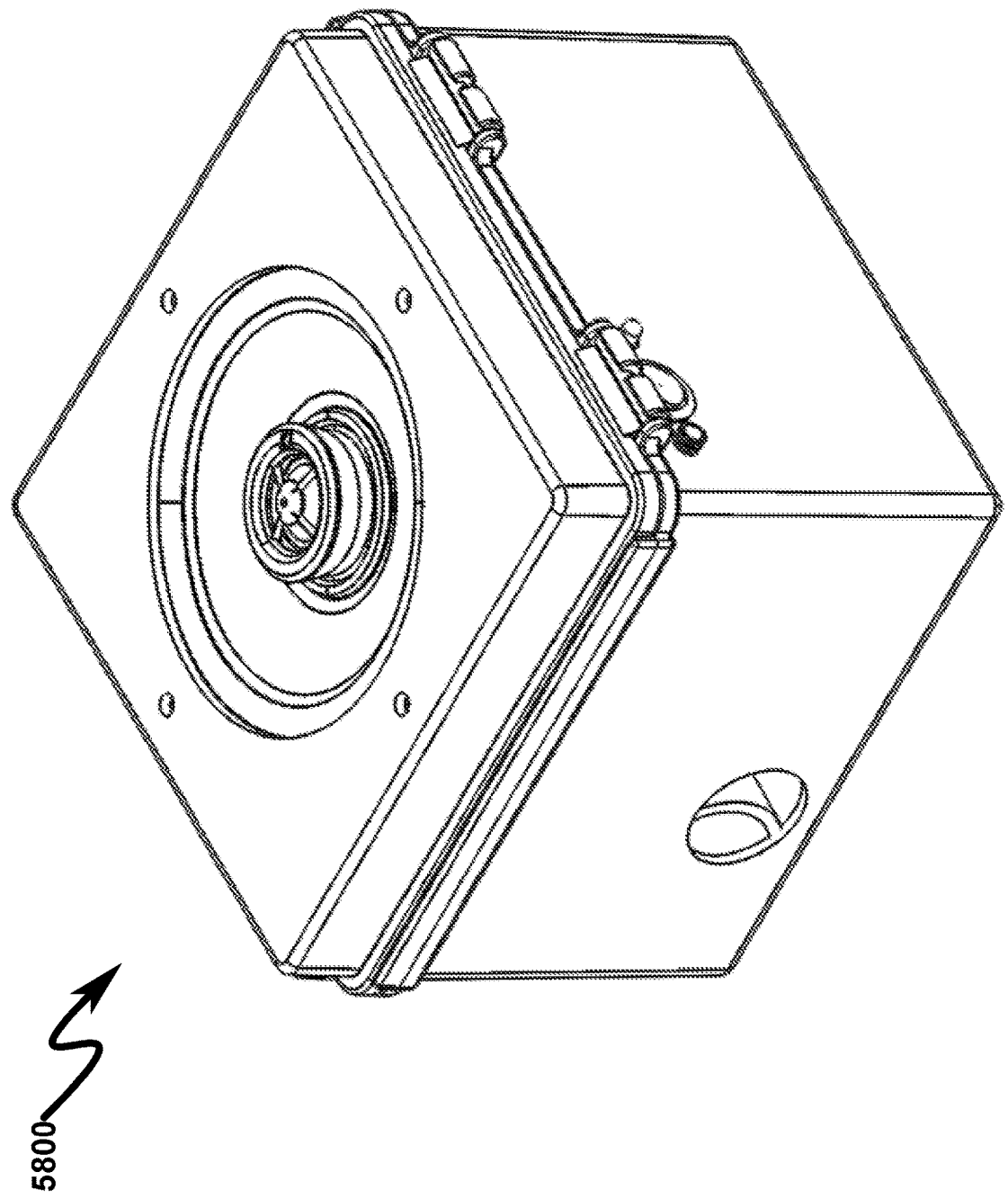
FIG. 58 illustrates a top right rear perspective view of alternative modular audio module (MAM) assembly incorporating water-tight seals.
Figure 59:
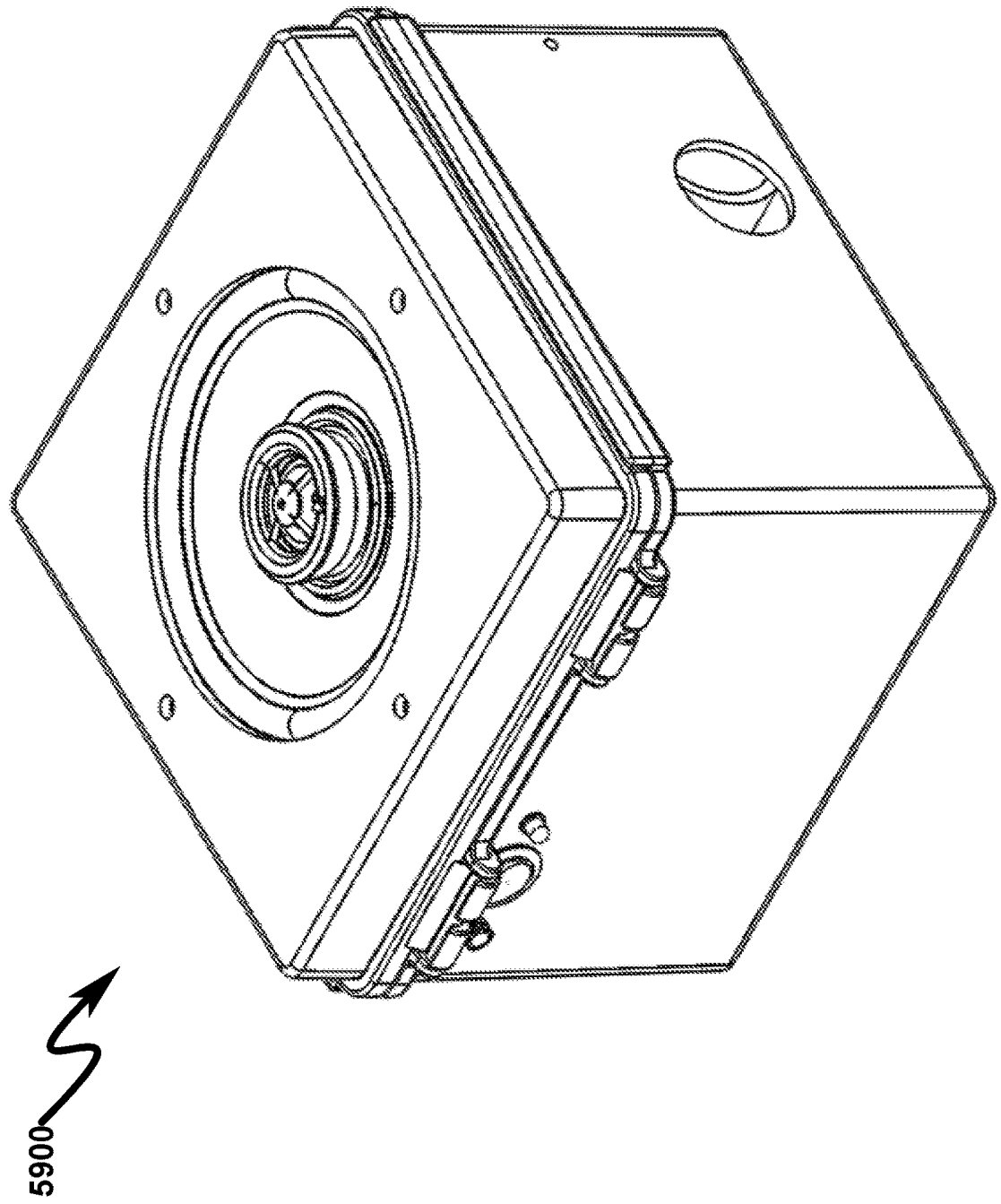
FIG. 59 illustrates a top left rear perspective view of alternative modular audio module (MAM) assembly incorporating water-tight seals.
Figure 60:
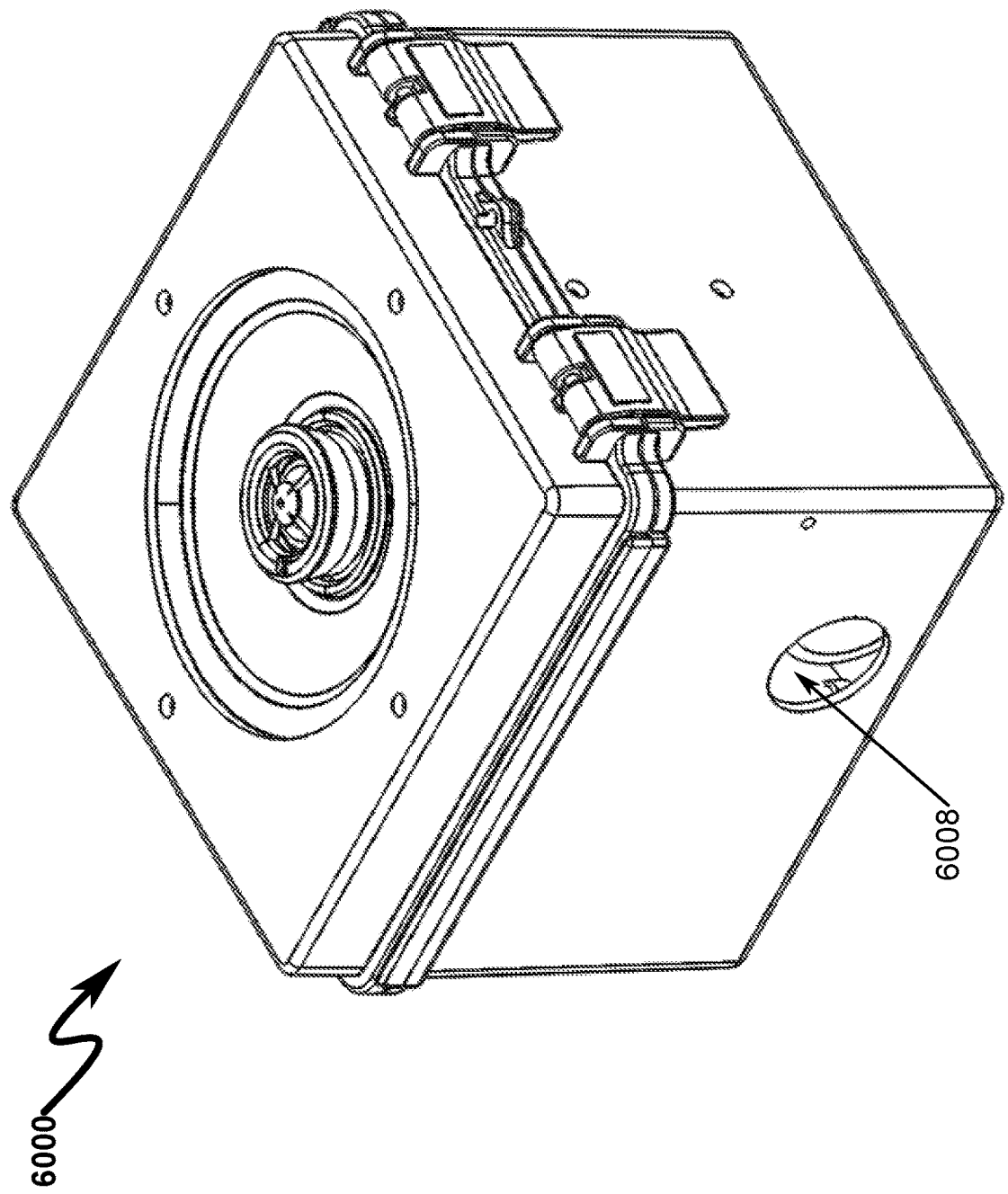
FIG. 60 illustrates a top left front perspective view of alternative modular audio module (MAM) assembly incorporating water-tight seals.
Figure 61:
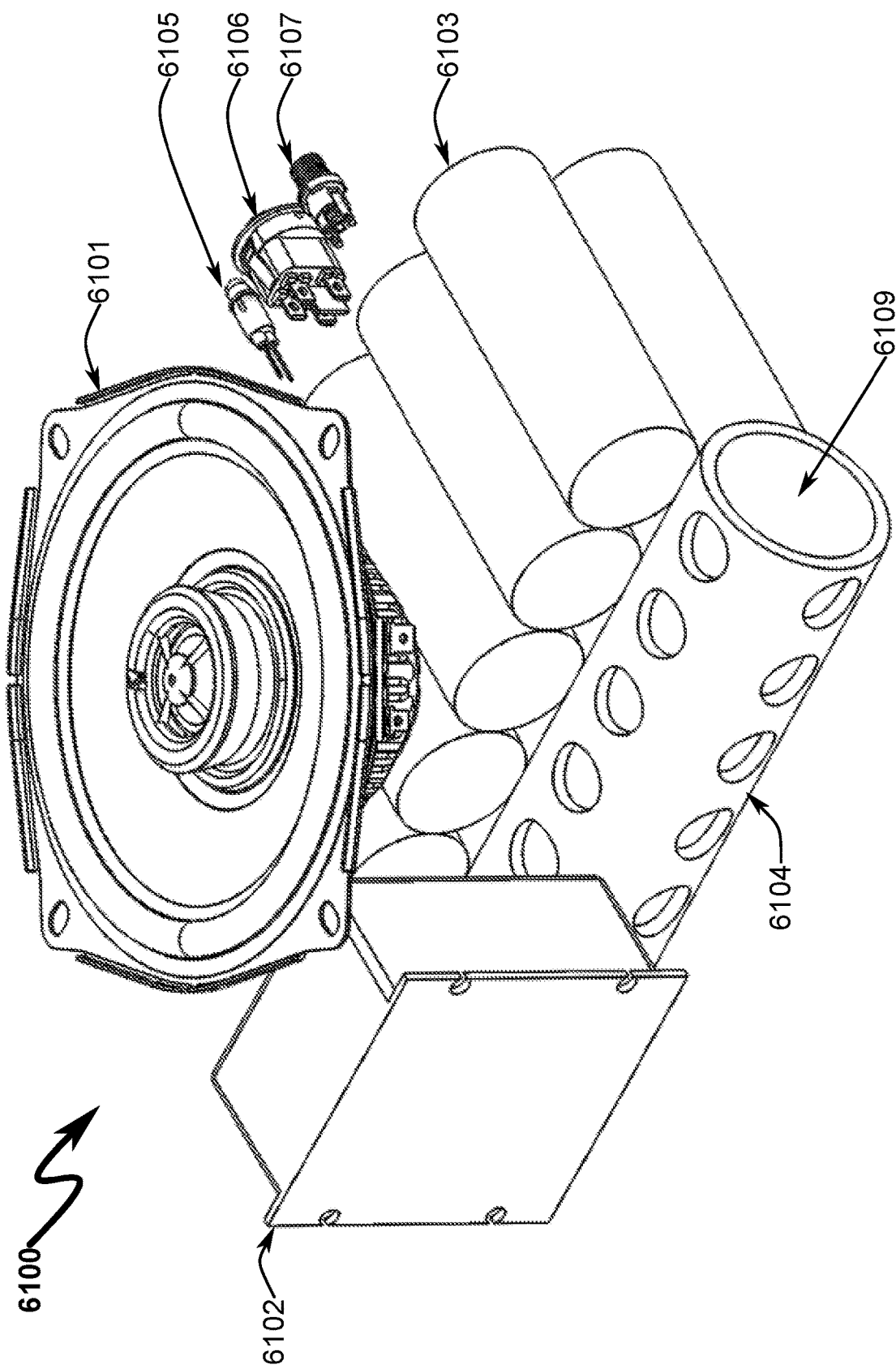
FIG. 61 illustrates a top right front perspective view of alternative modular audio module (MAM) internal assembly view of major components (without water-tight sealing enclosure)
Figure 62:
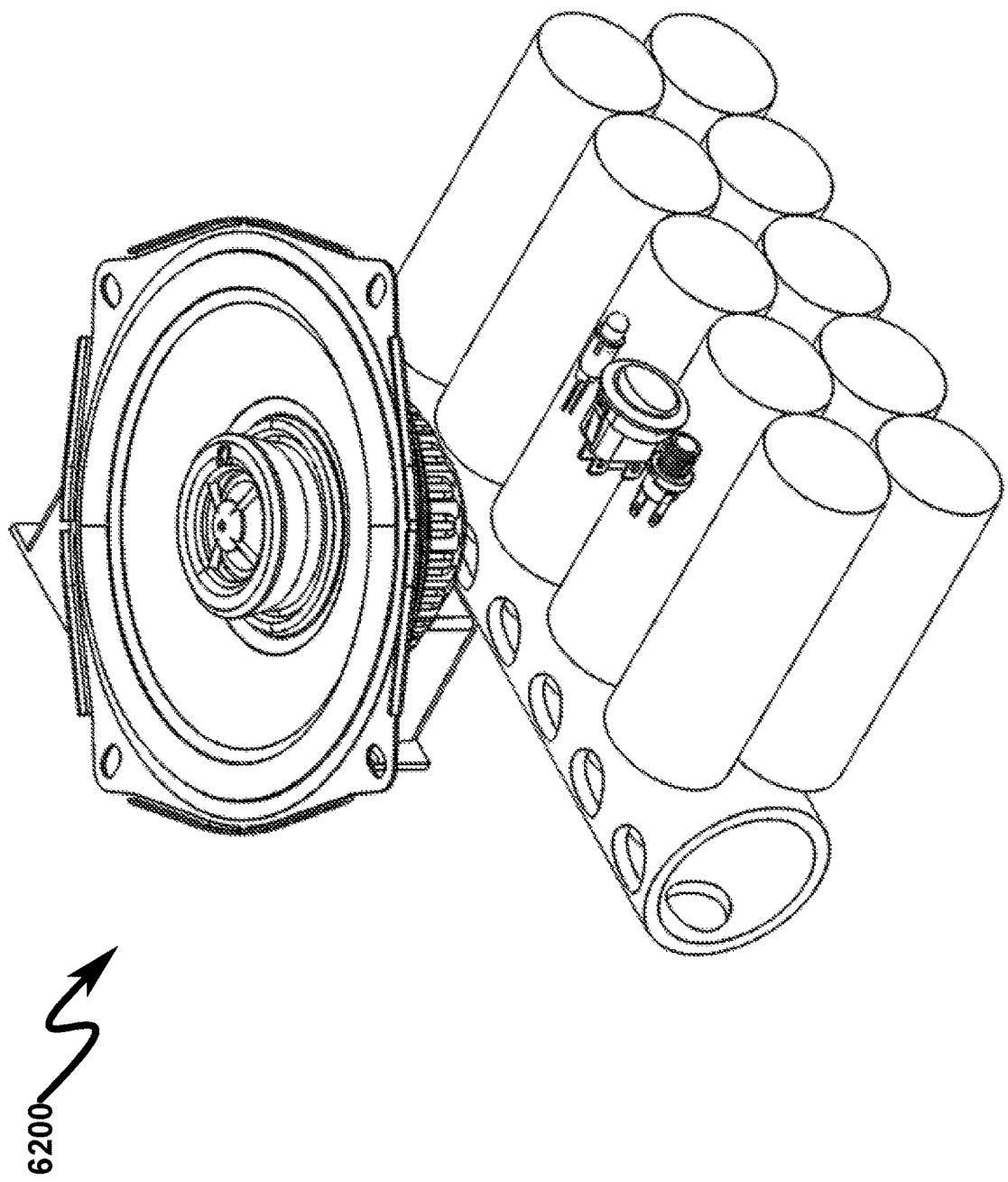
FIG. 62 illustrates a top right rear perspective view of alternative modular audio module (MAM) internal assembly view of major components (without water-tight sealing enclosure)
Figure 63:
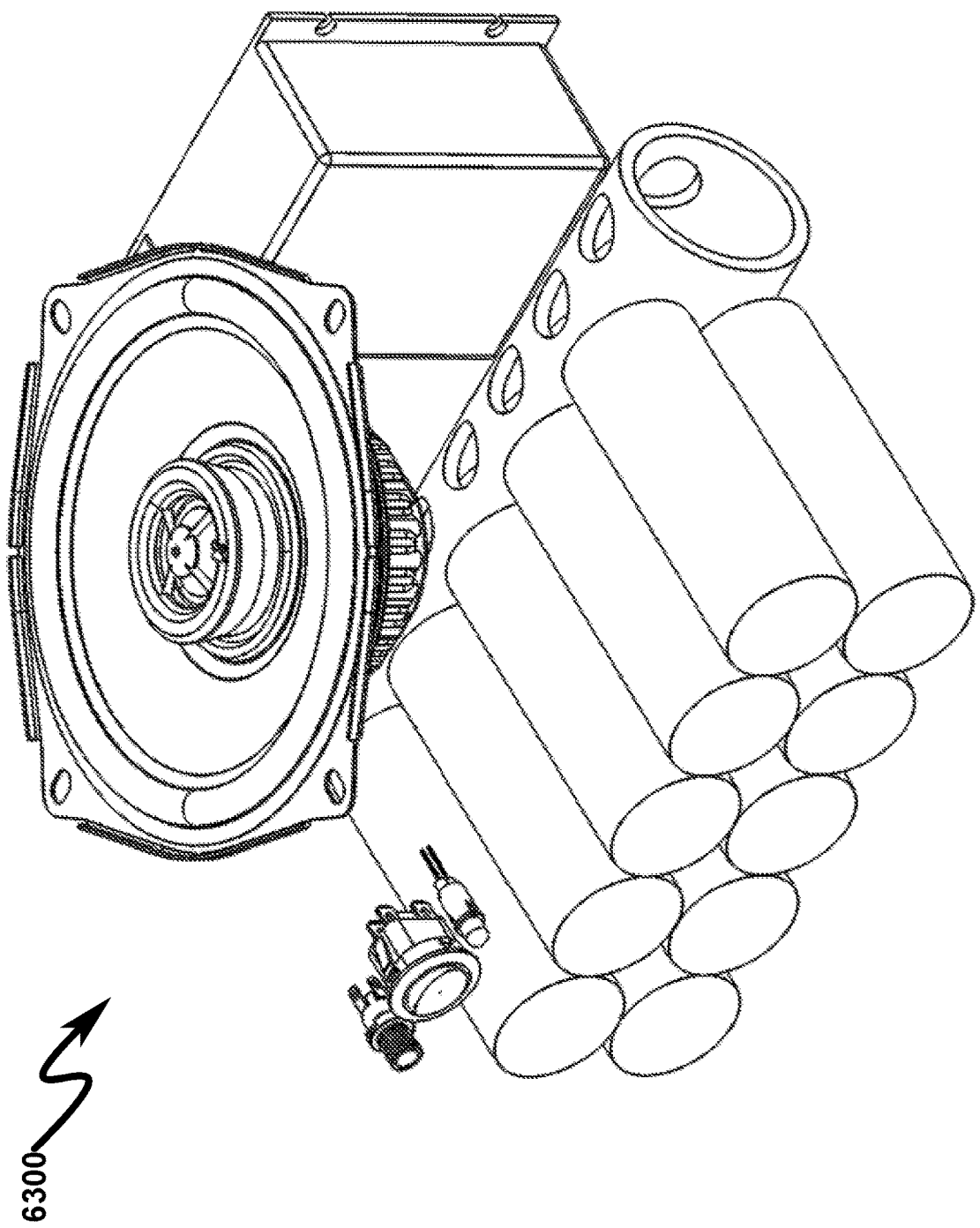
FIG. 63 illustrates a top left rear perspective view of alternative modular audio module (MAM) internal assembly view of major components (without water-tight sealing enclosure)
Figure 64:
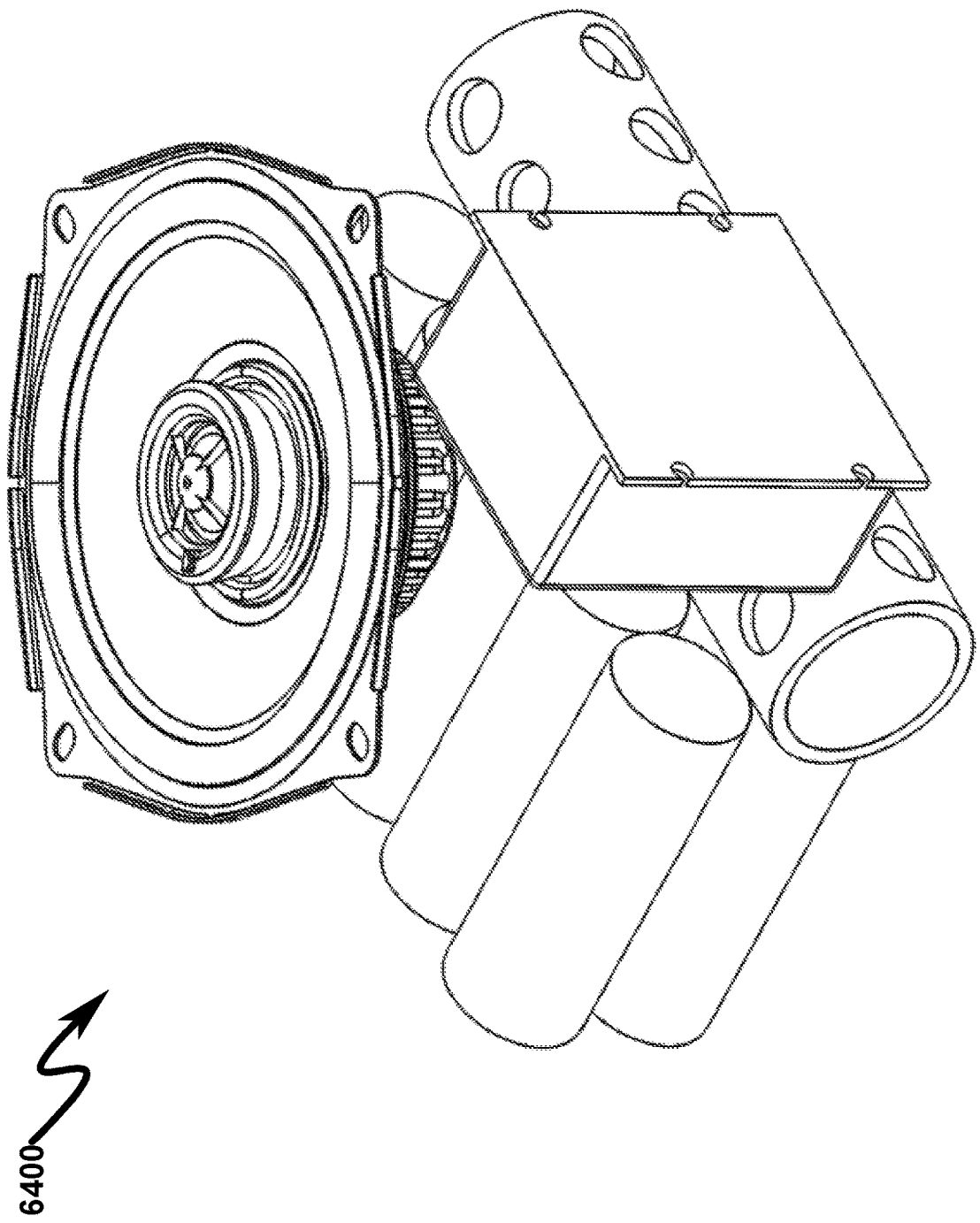
FIG. 64 illustrates a top left front perspective view of alternative modular audio module (MAM) internal assembly view of major components (without water-tight sealing enclosure)

Various external views of this water-tight assembly are depicted in FIG. 57 (5700)-FIG. 60 (6000). Major internal components associated with this assembly are depicted in FIG. 61 (6100)-FIG. 64 (6400) where the water-tight enclosure has been hidden from view. These views generally depict the speaker (top) (6101), amplifier box (6102), battery packs (×10) (6103), perforated acoustic tube (PAT) (6104) (to prevent unwanted case vibrations at high speaker volume levels), LED indicator light (6105), power switch (6106) (having ON/OFF/CHARGE positions), and DC power jack (6107) used to implement and operate the MAM.

Note that the perforated acoustic tube (PAT) (6104) and associated PAT/enclosure port openings (6008, 6109) allow for an enclosure alignment pathway (EAP) within the MAM to be structured for insertion of the stack alignment rod (SAR) and/or stack index rod (SIR) to penetrate through the EAP thus capture and secure the MAM in an aligned MAM stack (AMS).

BCA Mechanical Detail (6500)-(7200)

Figure 65:
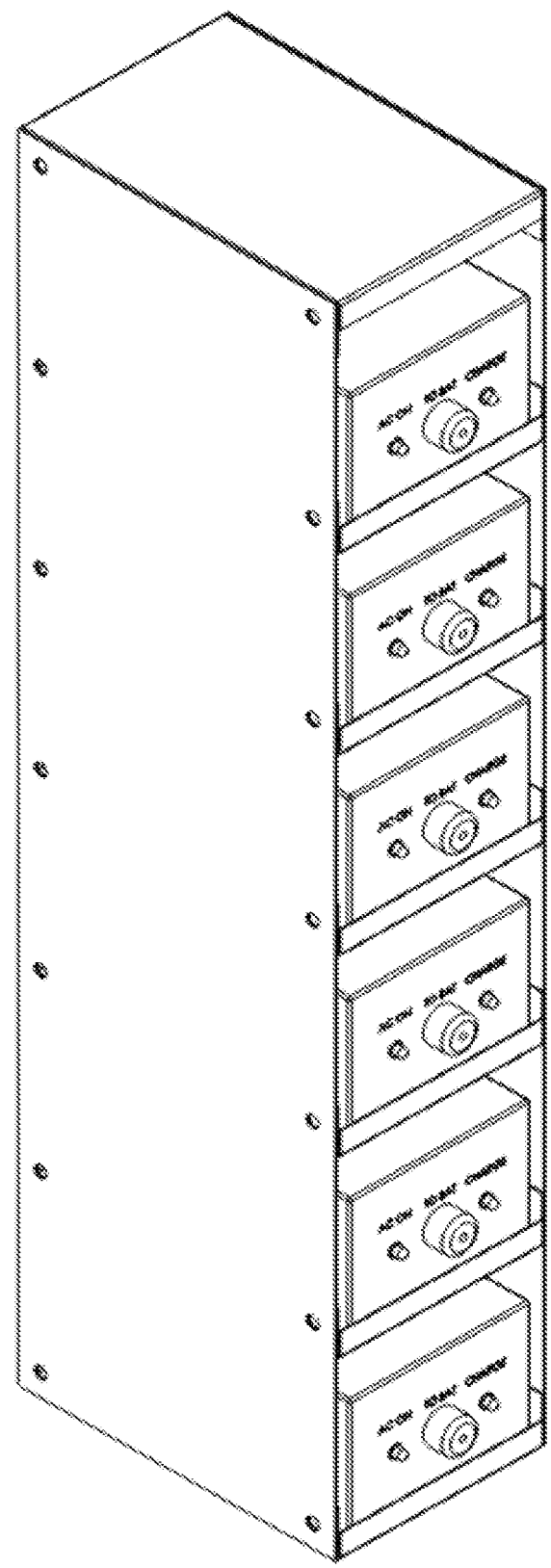
FIG. 65 illustrates a top right front perspective detail view of a preferred exemplary battery charger array (BCA) embodiment useful in some preferred invention embodiments.
Figure 66:
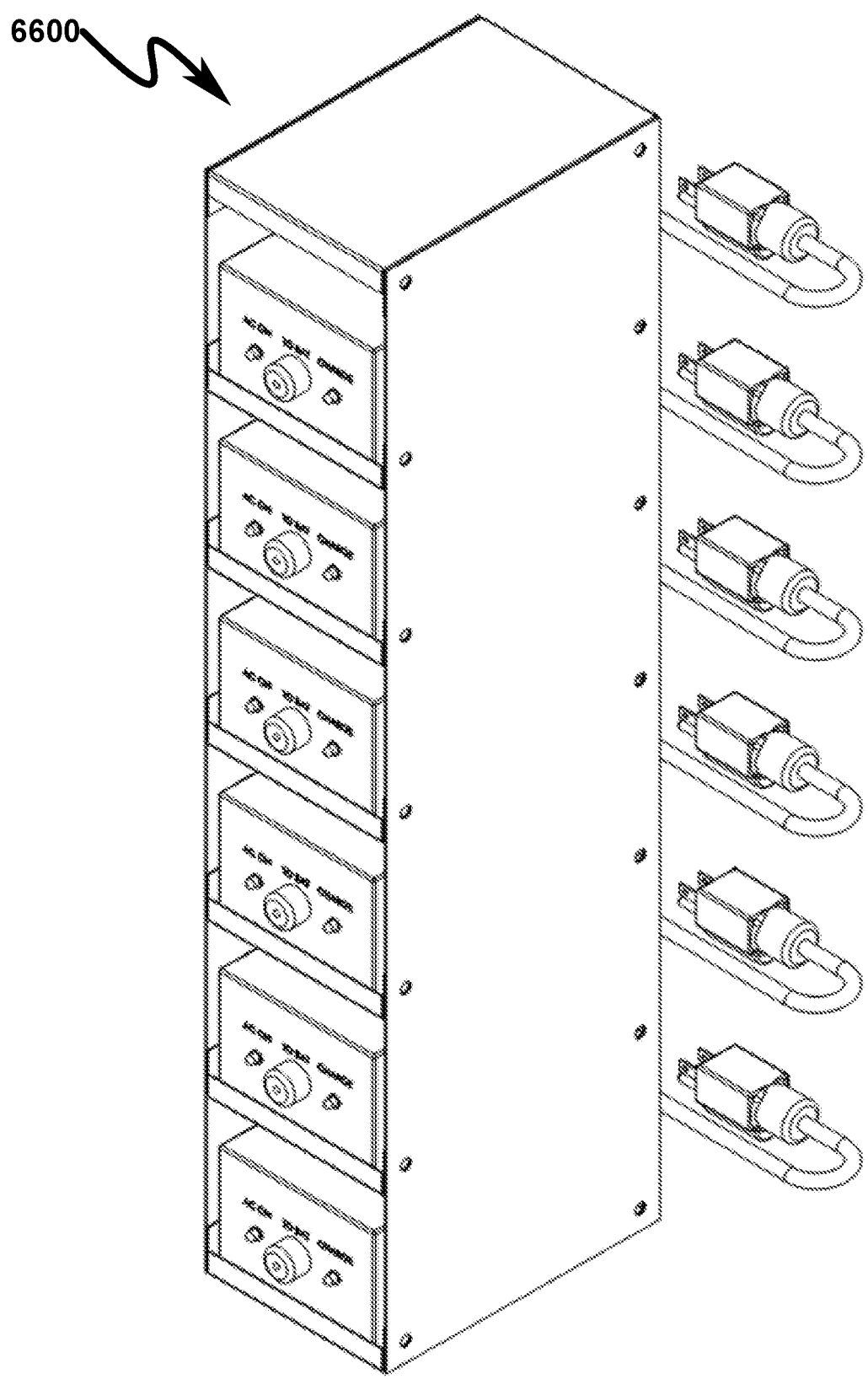
FIG. 66 illustrates a top right rear perspective detail view of a preferred exemplary battery charger array (BCA) embodiment useful in some preferred invention embodiments.
Figure 67:
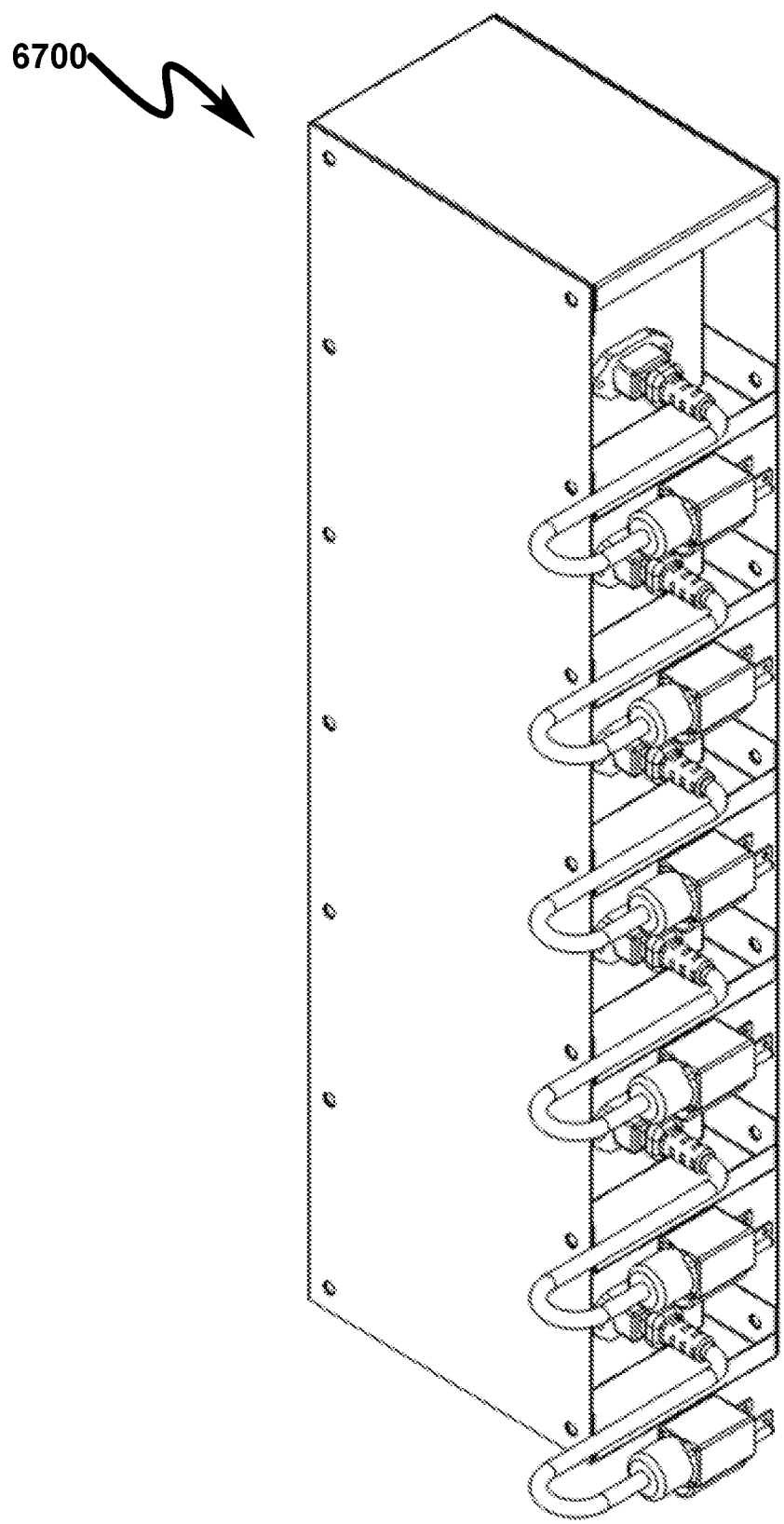
FIG. 67 illustrates a top left rear perspective detail view of a preferred exemplary battery charger array (BCA) embodiment useful in some preferred invention embodiments.
Figure 68:
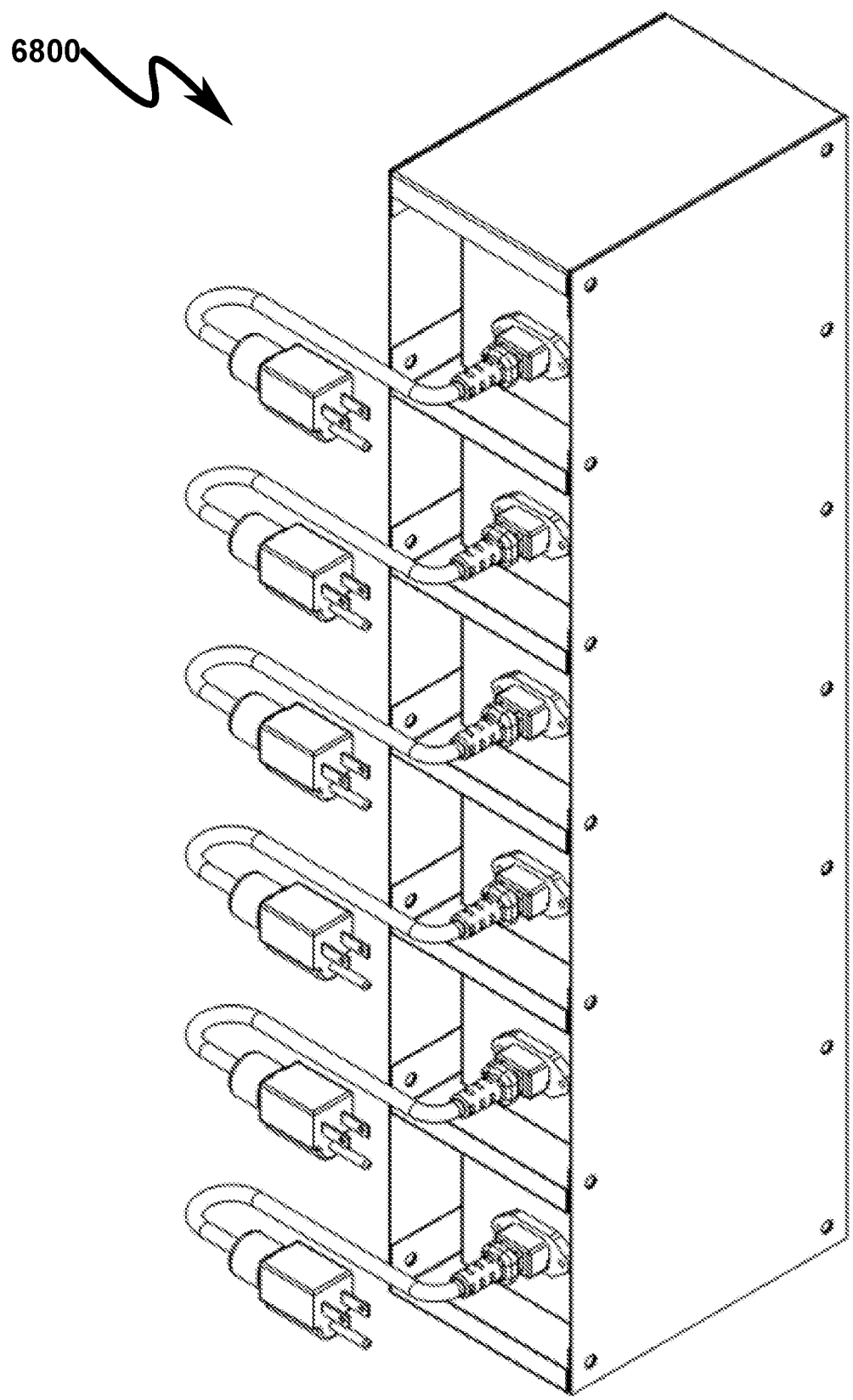
FIG. 68 illustrates a top left front perspective detail view of a preferred exemplary battery charger array (BCA) embodiment useful in some preferred invention embodiments.
Figure 69:
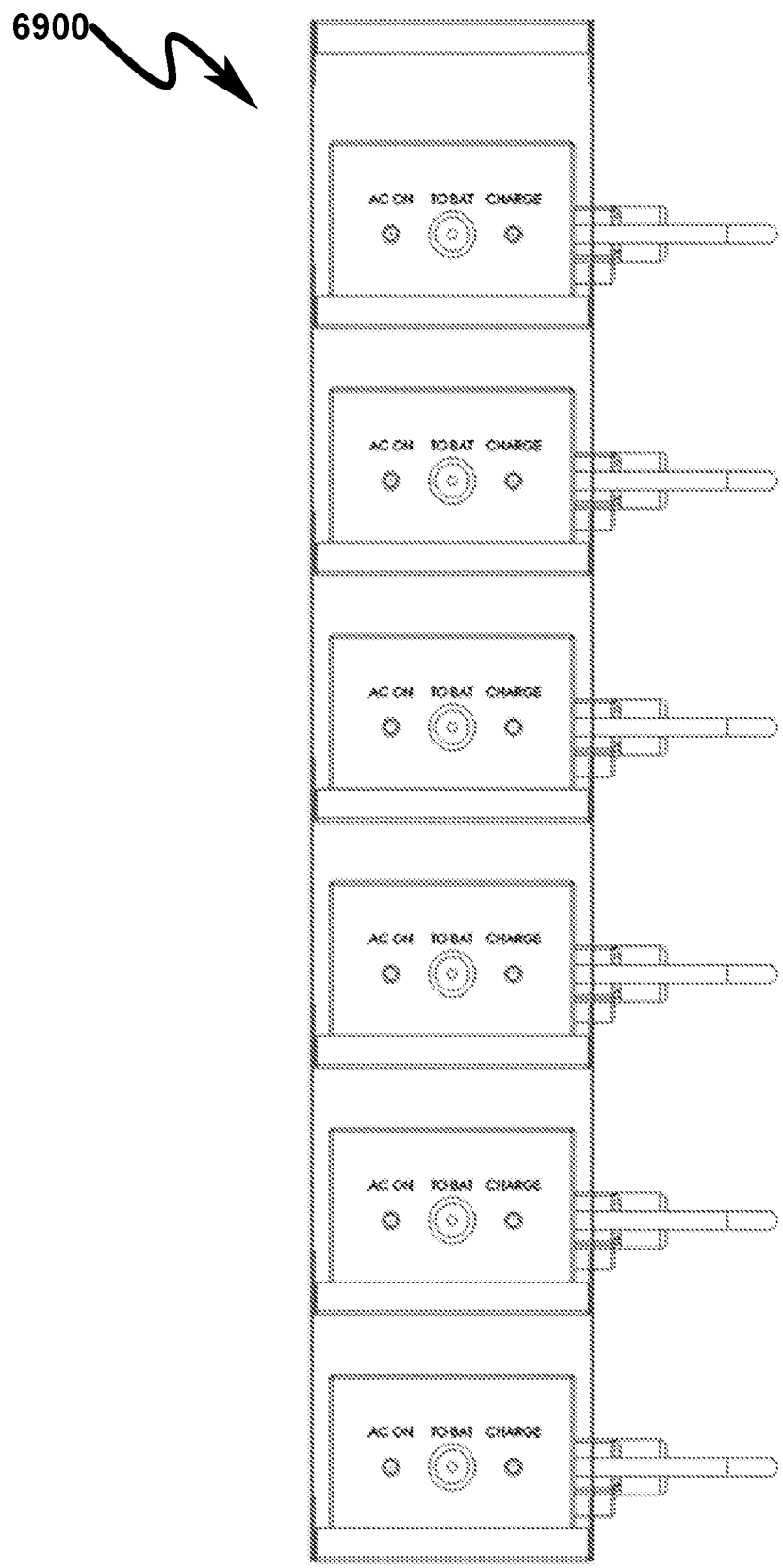
FIG. 69 illustrates a right side view of a preferred exemplary battery charger array (BCA) embodiment useful in some preferred invention embodiments.
Figure 70:
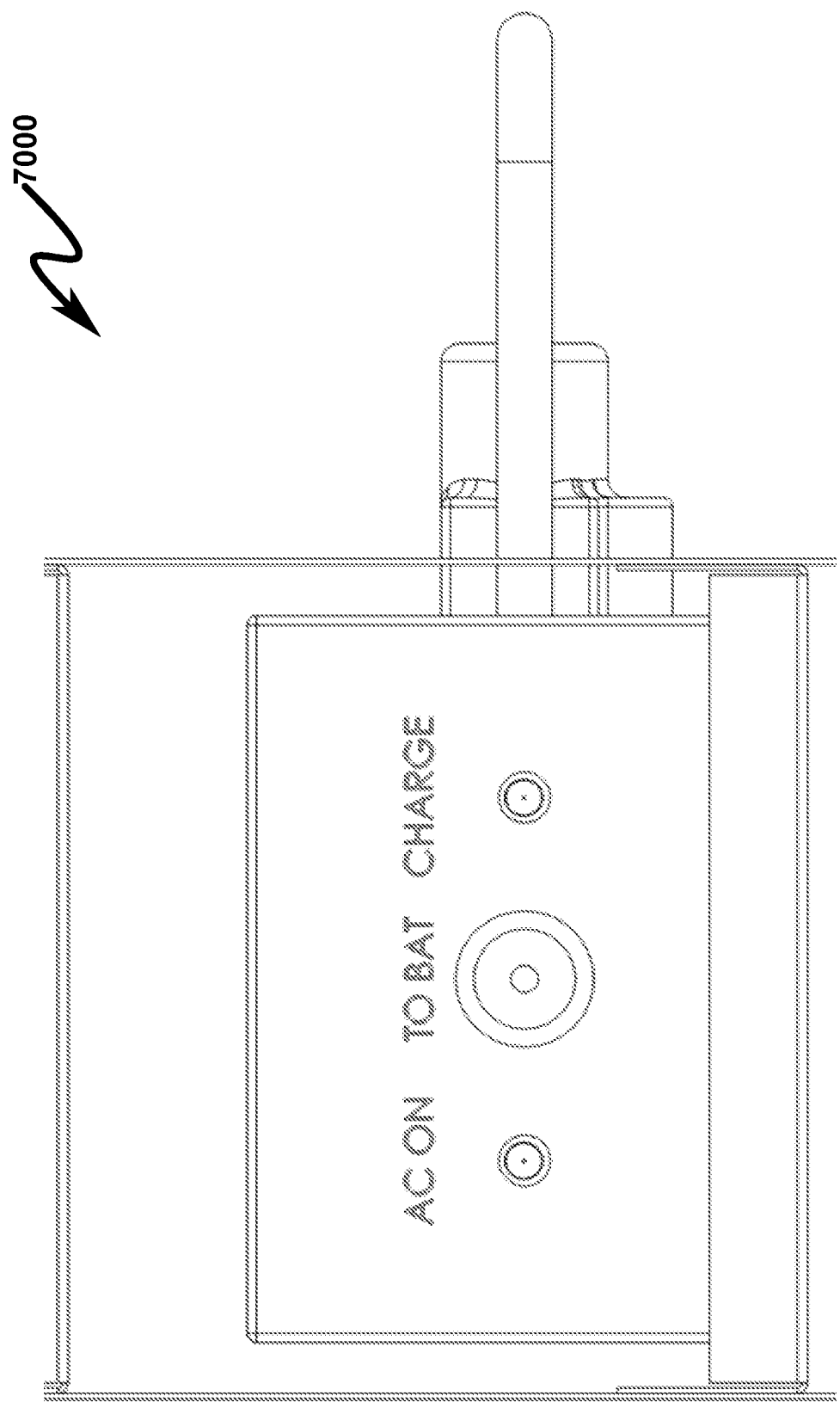
FIG. 70 illustrates a right side PBC detail view of a preferred exemplary battery charger array (BCA) embodiment useful in some preferred invention embodiments.
Figure 71:
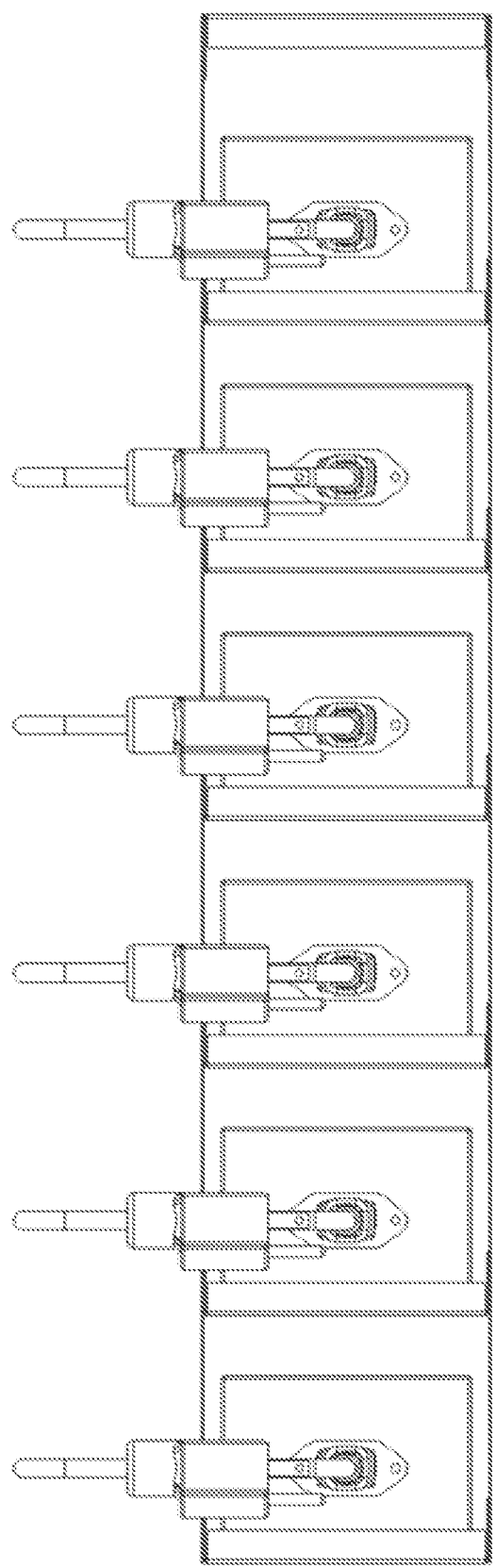
FIG. 71 illustrates a left side view of a preferred exemplary battery charger array (BCA) embodiment useful in some preferred invention embodiments.
Figure 72:
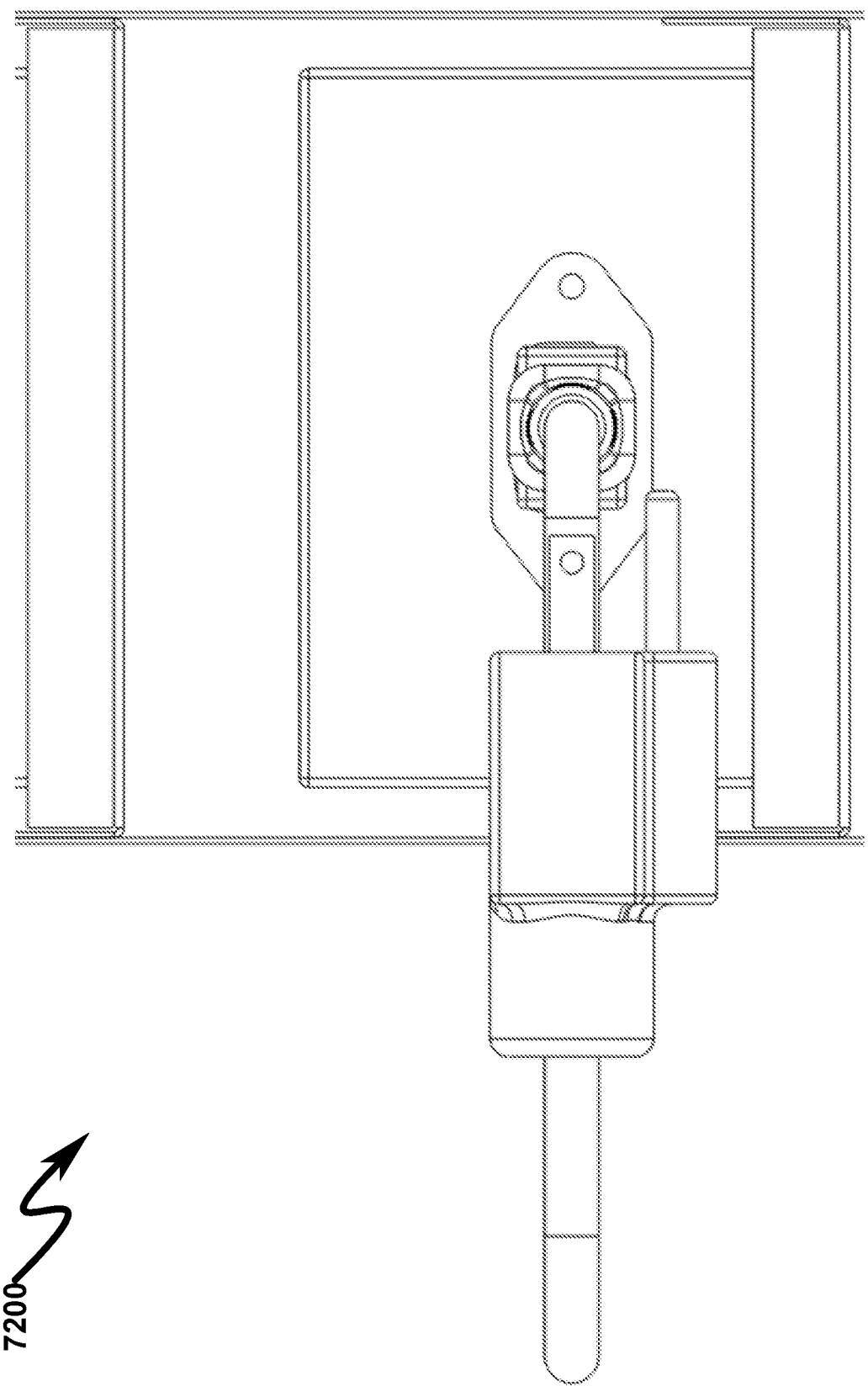
FIG. 72 illustrates a left side PBC detail view of a preferred exemplary battery charger array (BCA) embodiment useful in some preferred invention embodiments.

Additional detail of an exemplary BCA is depicted in FIG. 65 (6500)-FIG. 72 (7200) wherein a bay of six PBCs is depicted in an enclosure that is mounted to the HTF. The depicted enclosure provides secure storage for the BCA PBC elements during transport of the MHT.

HTC Mechanical Detail (7300)-(8000)

Figure 73:
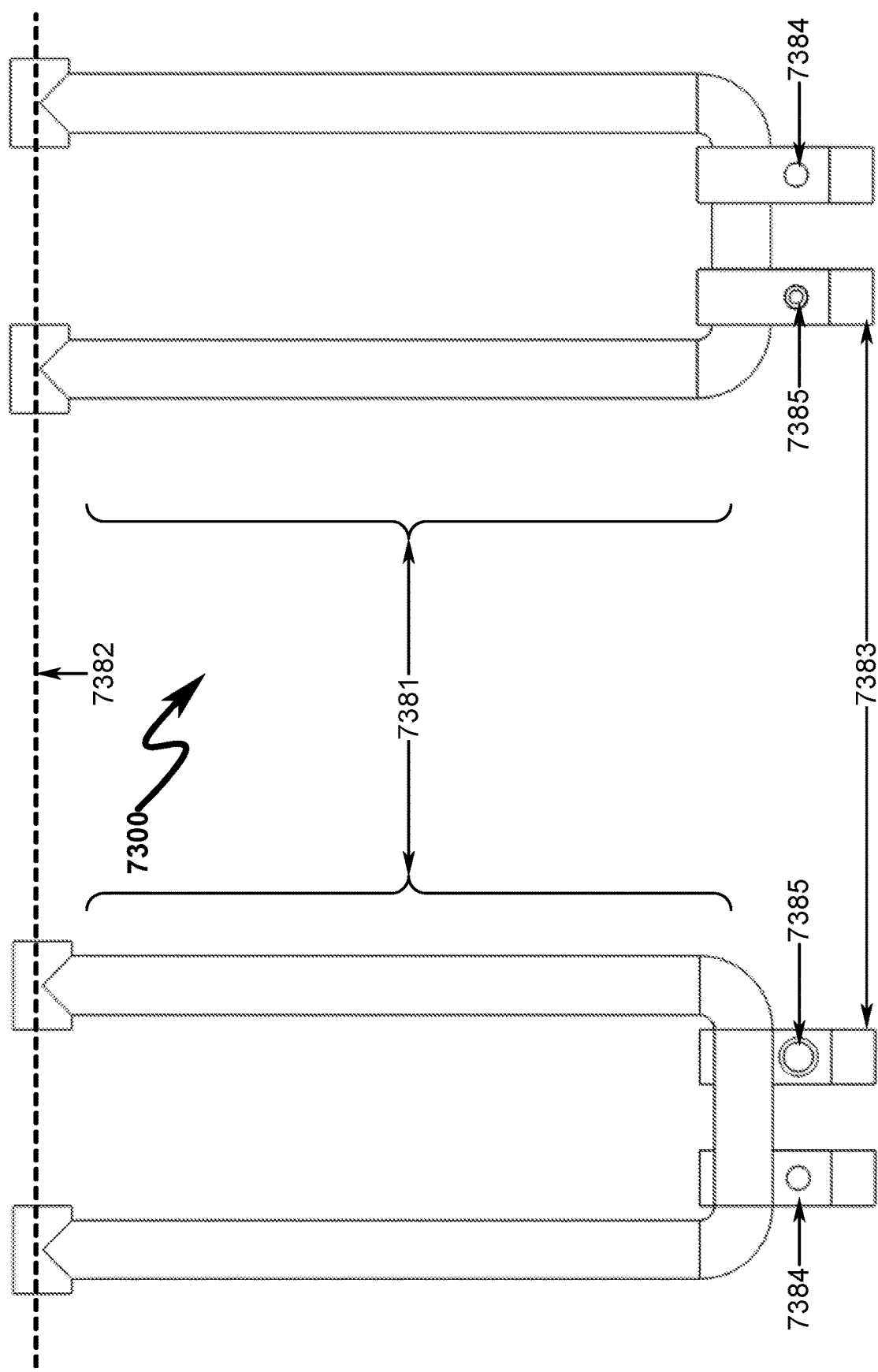
FIG. 73 illustrates top and bottom views of a preferred exemplary hand truck coupler (HTC) embodiment useful in some preferred invention embodiments.
Figure 74:
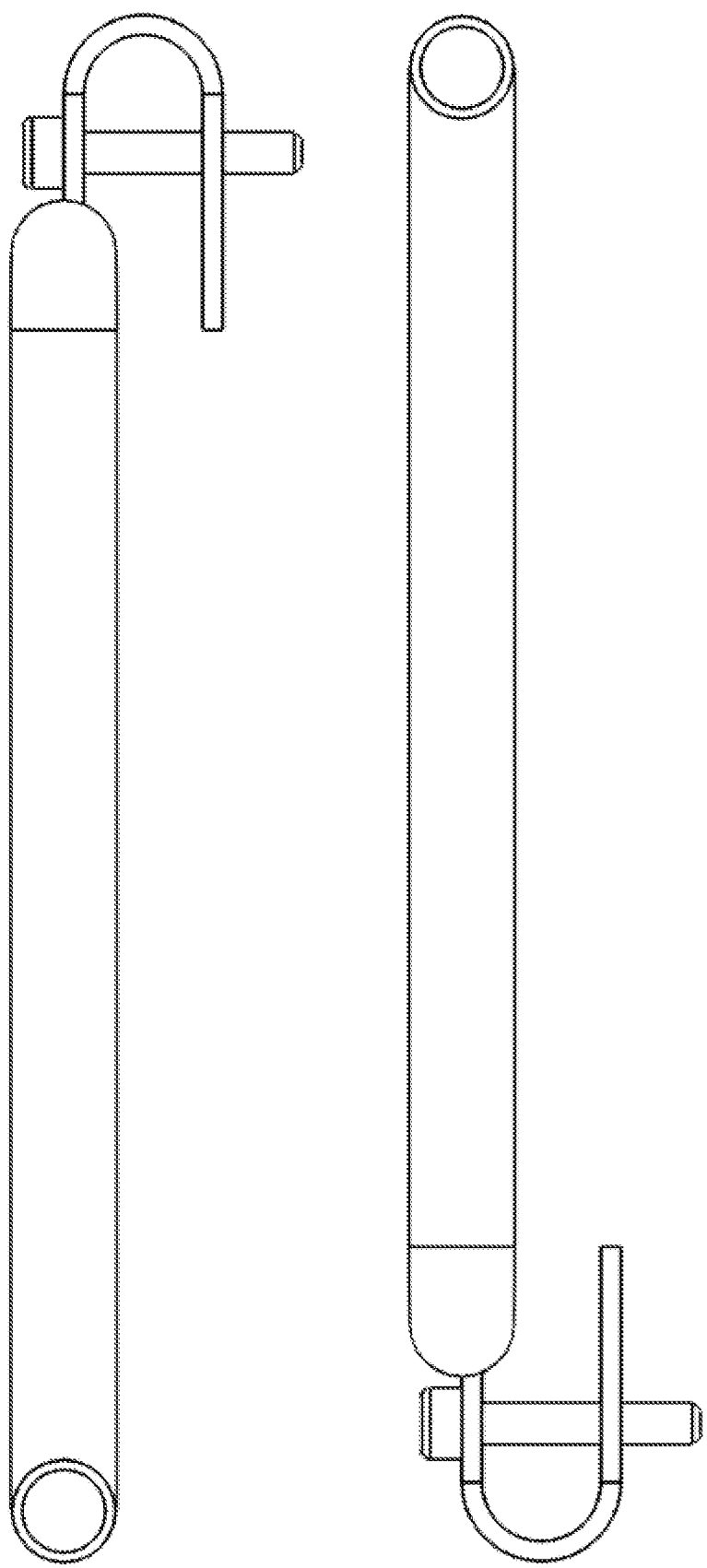
FIG. 74 illustrates left and right side views of a preferred exemplary hand truck coupler (HTC) embodiment useful in some preferred invention embodiments.
Figure 76:
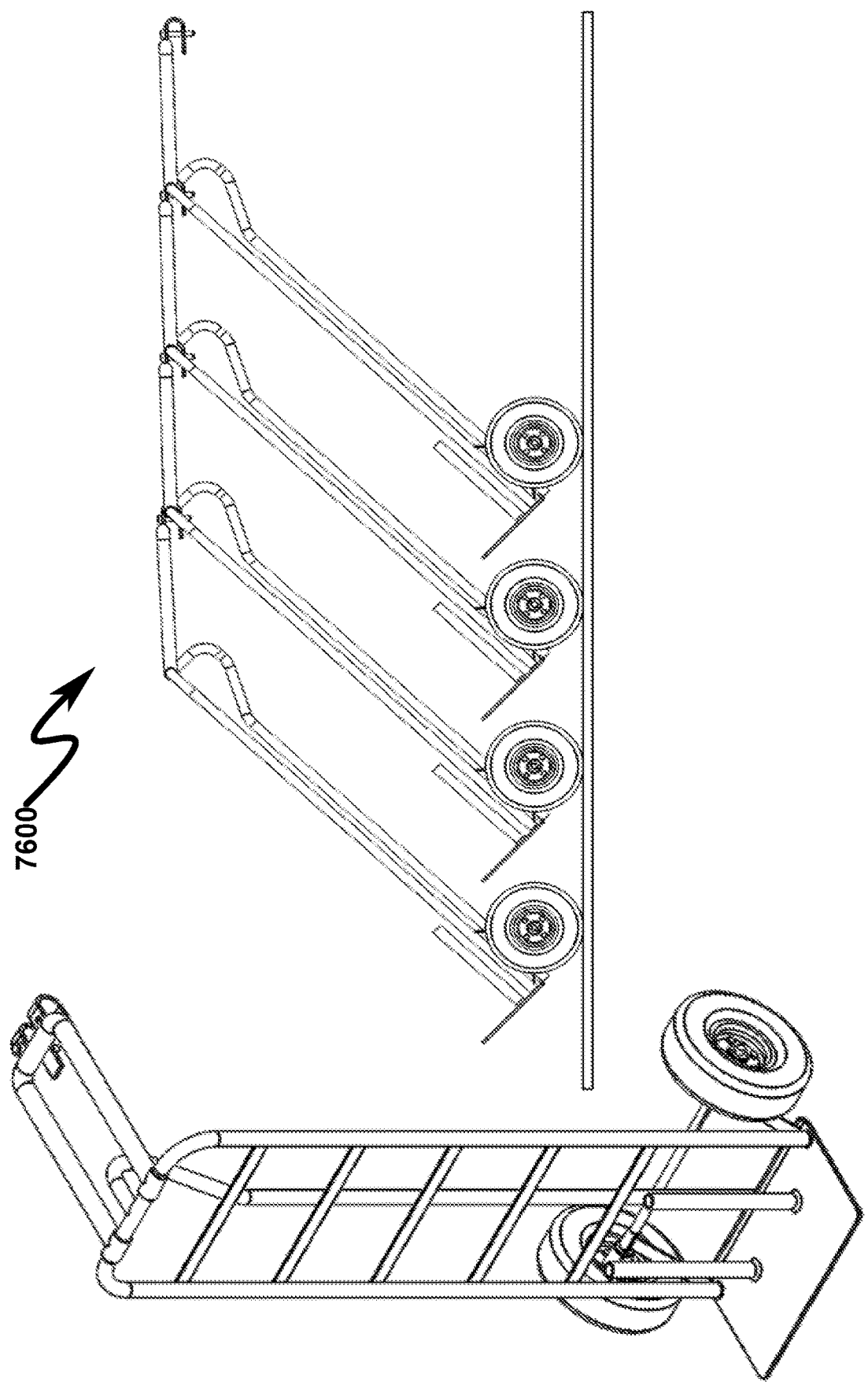
FIG. 76 illustrates various views of a preferred exemplary hand truck coupler (HTC) embodiment coupled to a single MHT and MHT train.
Figure 77:
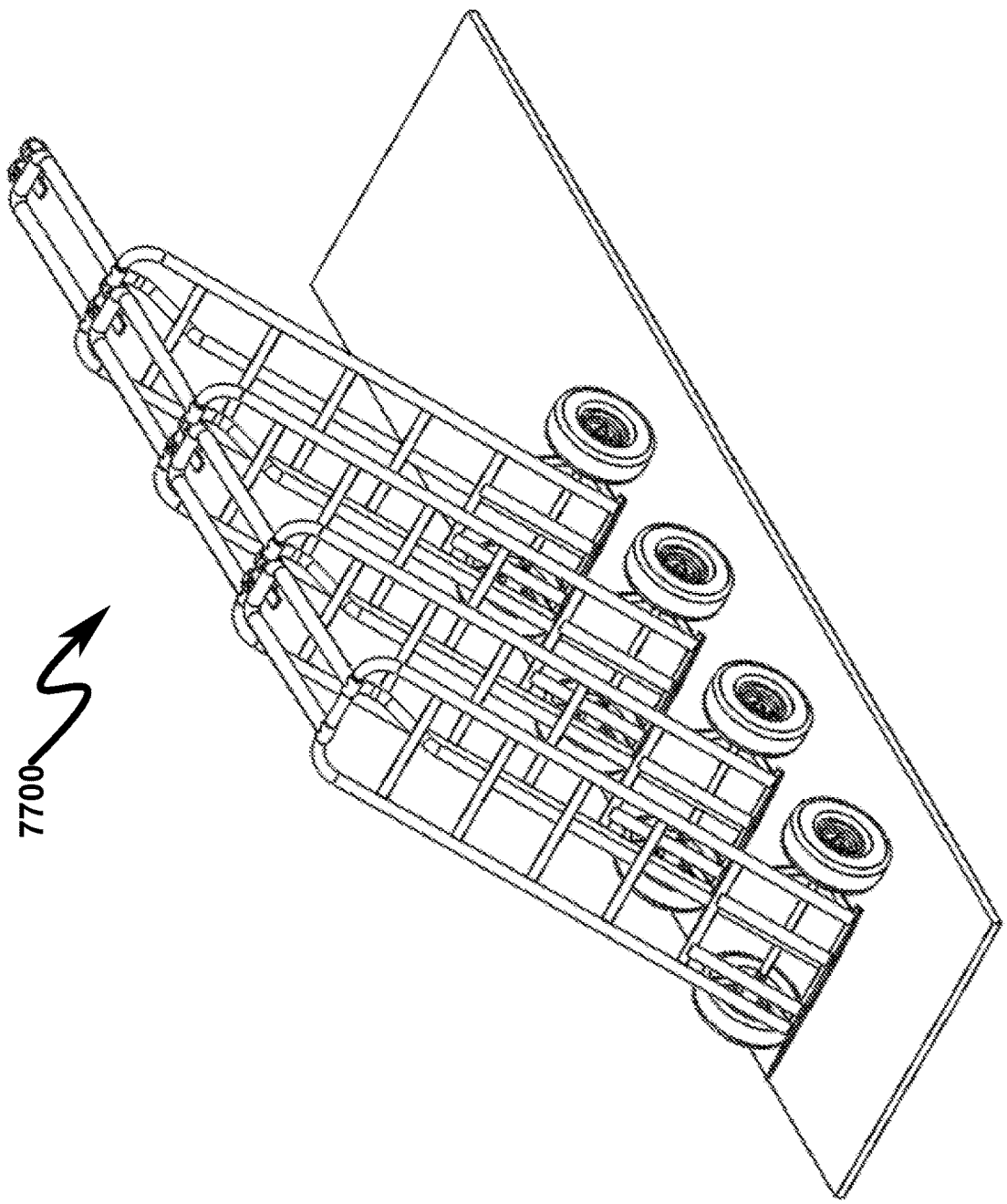
FIG. 77 illustrates a top right front perspective view of a preferred exemplary hand truck coupler (HTC) embodiment utilized to implement an exemplary MHT train.
Figure 78:
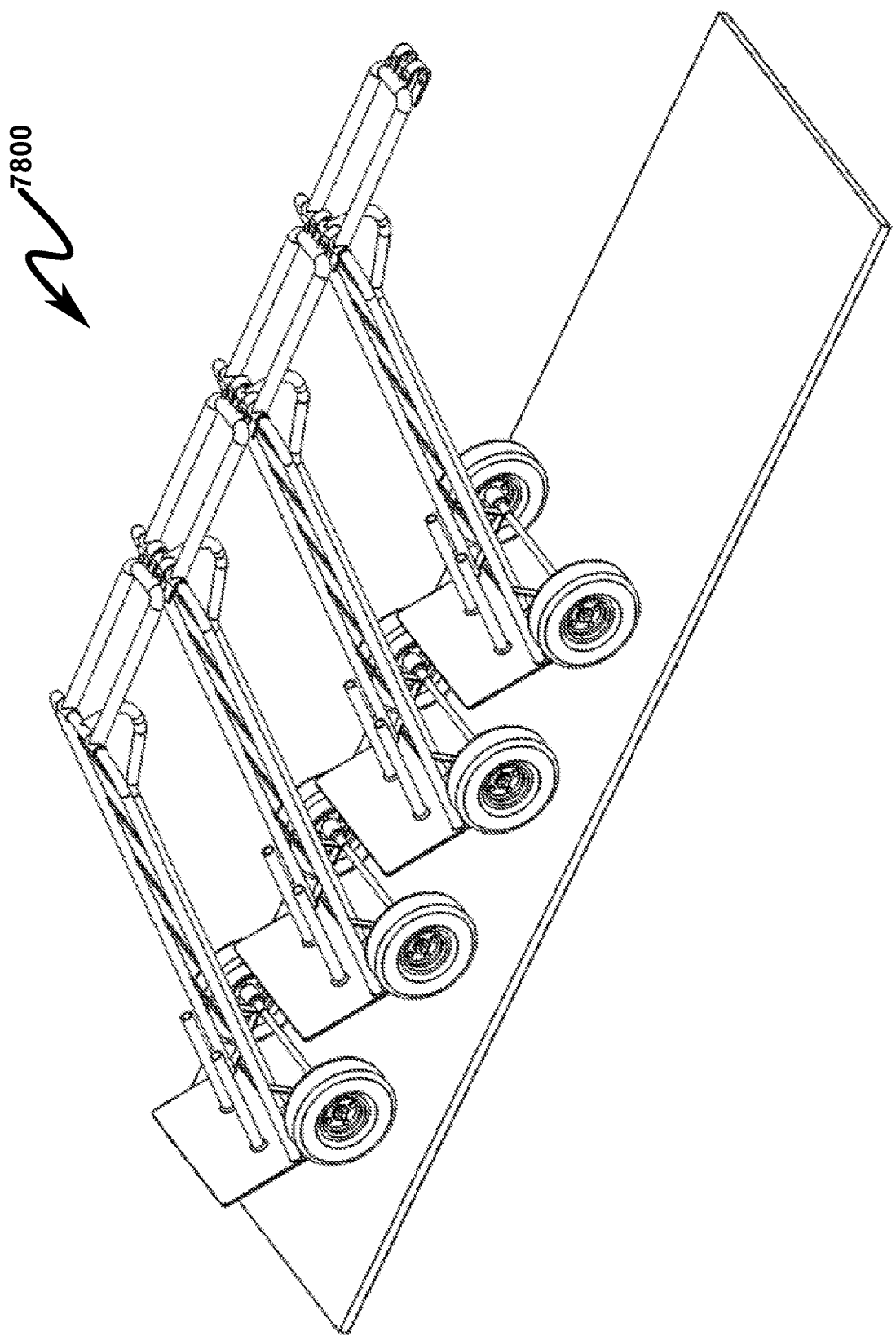
FIG. 78 illustrates a top right rear perspective view of a preferred exemplary hand truck coupler (HTC) embodiment utilized to implement an exemplary MHT train.
Figure 79:
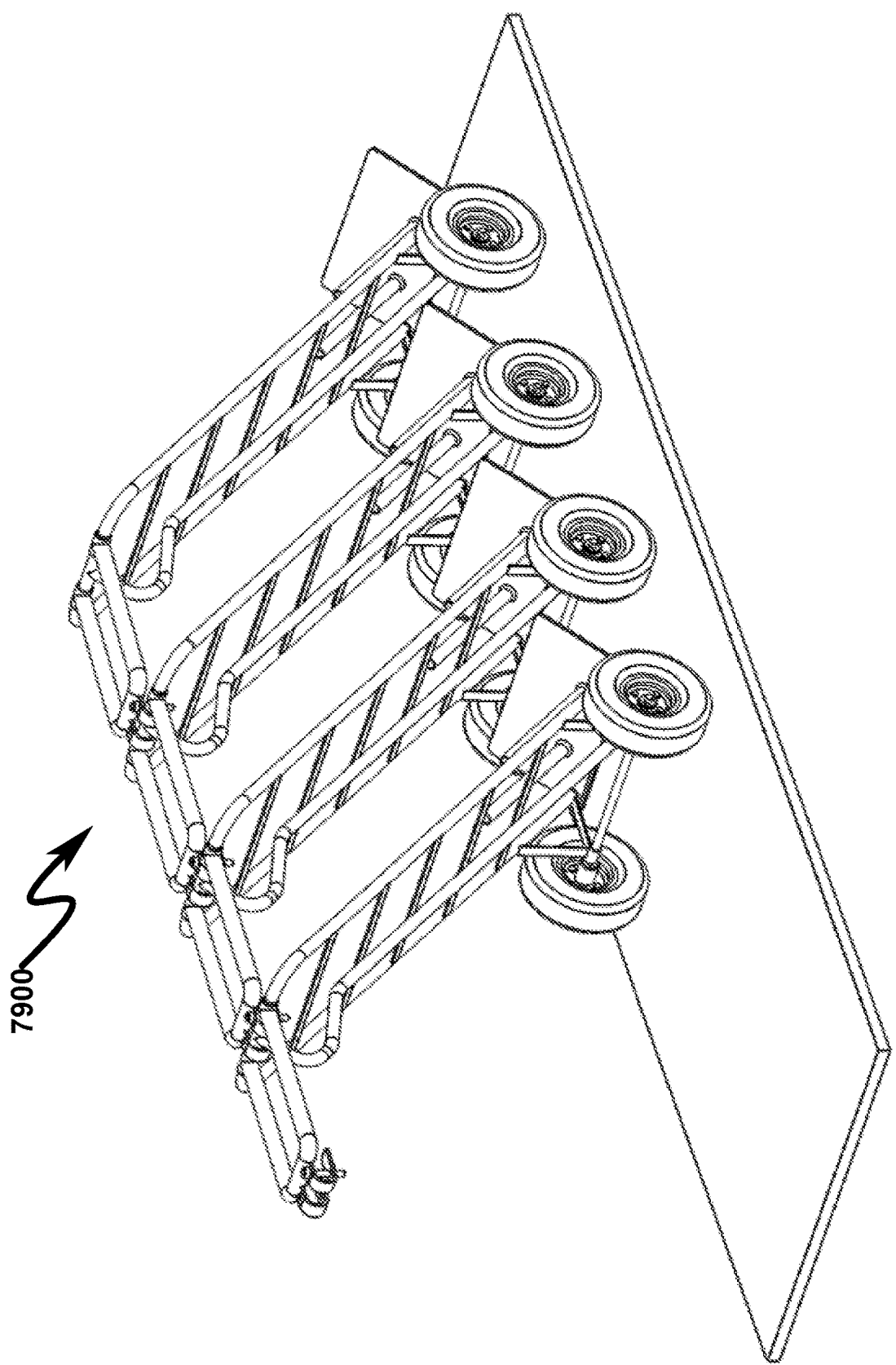
FIG. 79 illustrates a top left rear perspective view of a preferred exemplary hand truck coupler (HTC) embodiment utilized to implement an exemplary MHT train.
Figure 80:
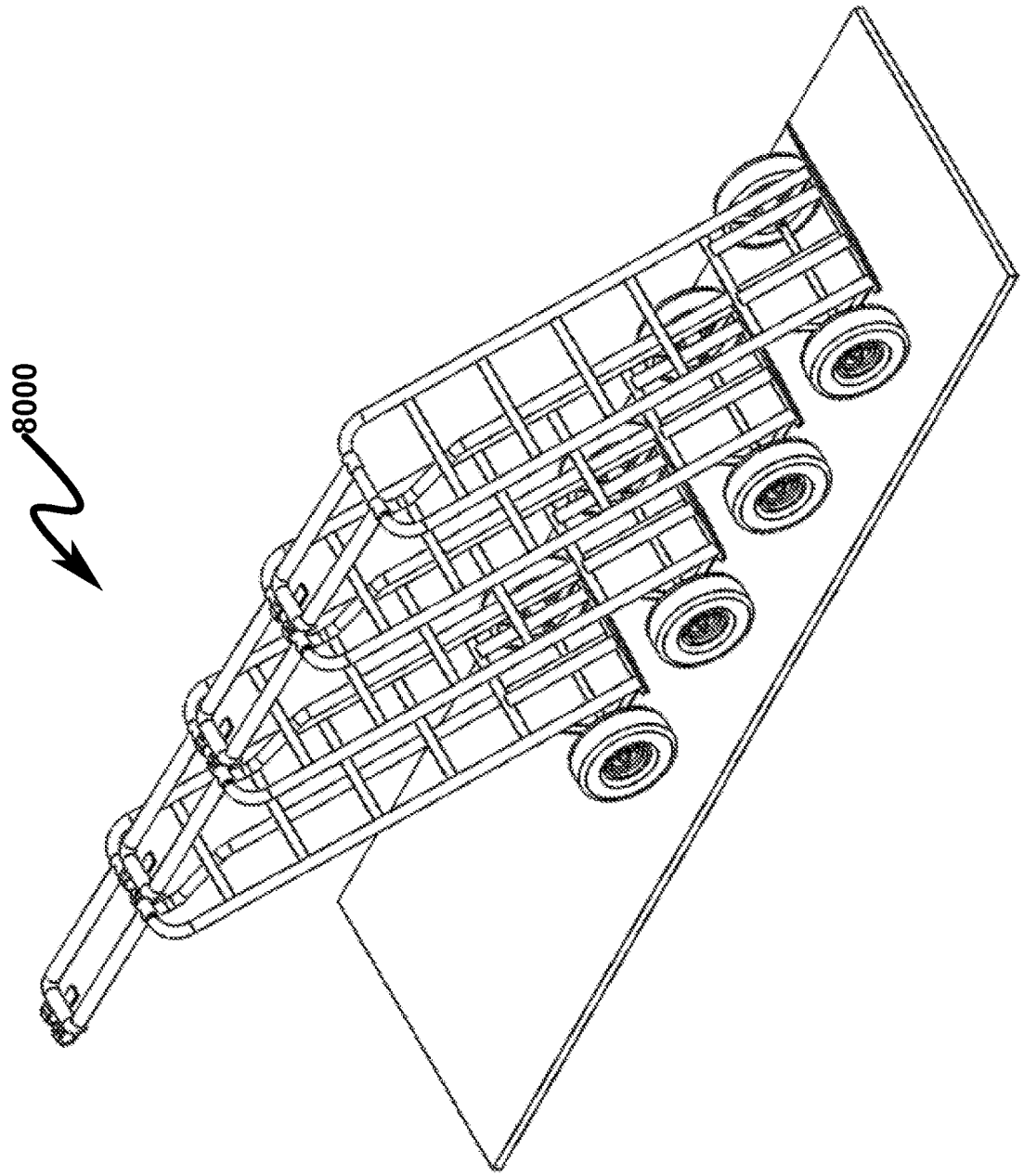
FIG. 80 illustrates a top front left perspective view of a preferred exemplary hand truck coupler (HTC) embodiment utilized to implement an exemplary MHT train.

Additional detail of an exemplary HTC is depicted in FIG. 73 (7300)-FIG. 80 (8000) wherein the exemplary HTC is depicted in isolation in FIG. 73 (7300)-FIG. 75 (7500) and in combination with the HTF in FIG. 76 (7600)-FIG. 80 (8000) to illustrate a train of MHTs that may be loaded with AMS entities for transport.

As generally depicted in FIG. 73 (7300)-FIG. 75 (7500), the HTC (7380) generally provides for a linkage member (7381) with a rotating axis (7382) that engages the MHT HTF and a hook member (7383) that will engage either another MHT HTF or an optional motorized transport devices such as a golf cart, ATV, or the like. The hook member (7383) may incorporate holes (7384) to accommodate one or more pins (7385) or other securing means to ensure that the linkage between MHTs is secure.

FIG. 76 (7600)-FIG. 80 (8000) illustrate how a train of MHTs may be coupled together to transport a large number of MHTs loaded with AMS entities. Not shown in these diagrams is an optional motorized transport vehicle that engages the rightmost HTC to provide the necessary locomotion for the MHT/AMS train.

One skilled in the art will recognize that the HTC depicted is only illustrative of a large number of coupling mechanisms that can be implemented to provide a coupling between the MHTs.

HTL Mechanical Detail (8100)-(9600)

Figure 81:
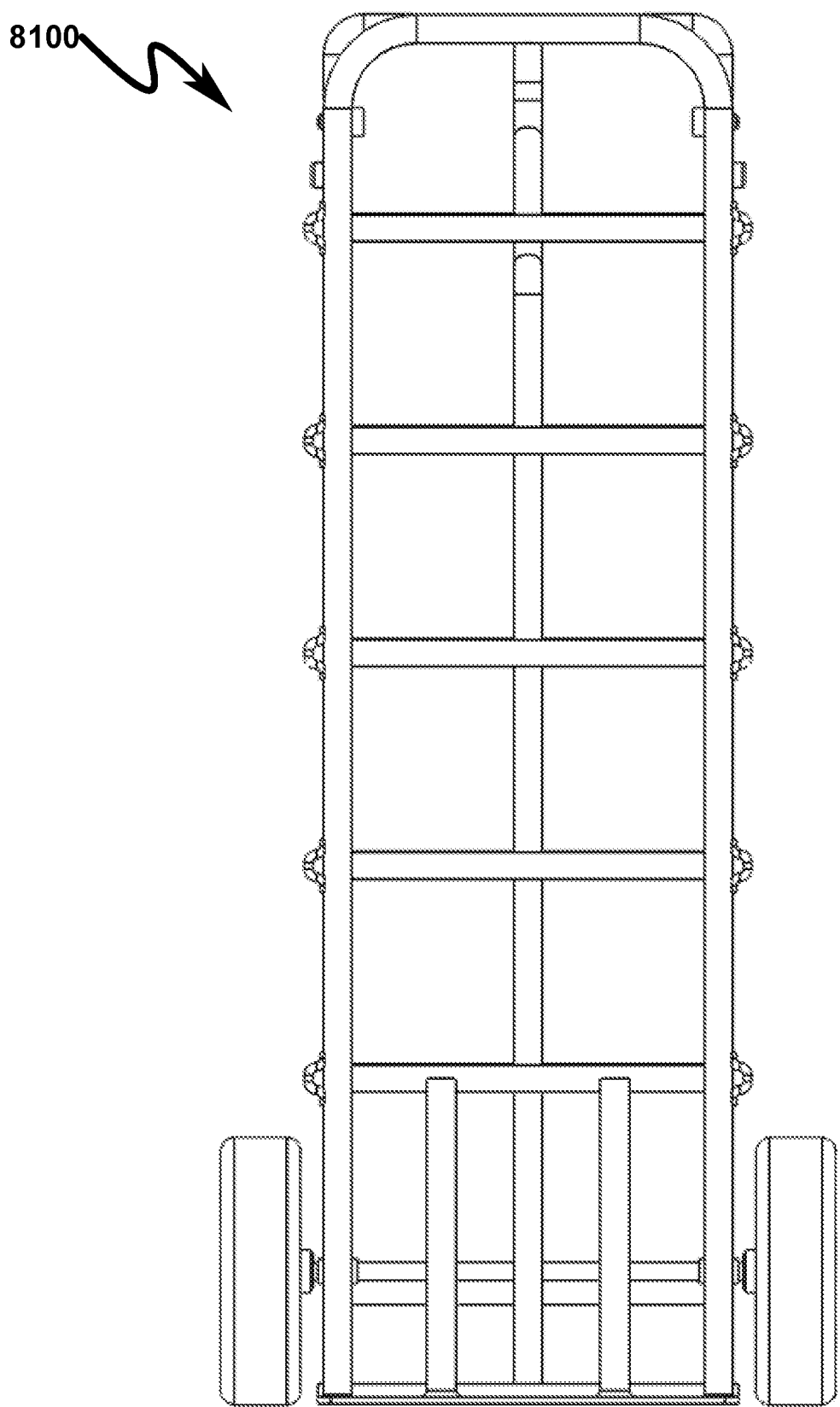
FIG. 81 illustrates a front view of a preferred exemplary hand truck ladder (HTL) embodiment useful in some preferred invention embodiments.
Figure 82:
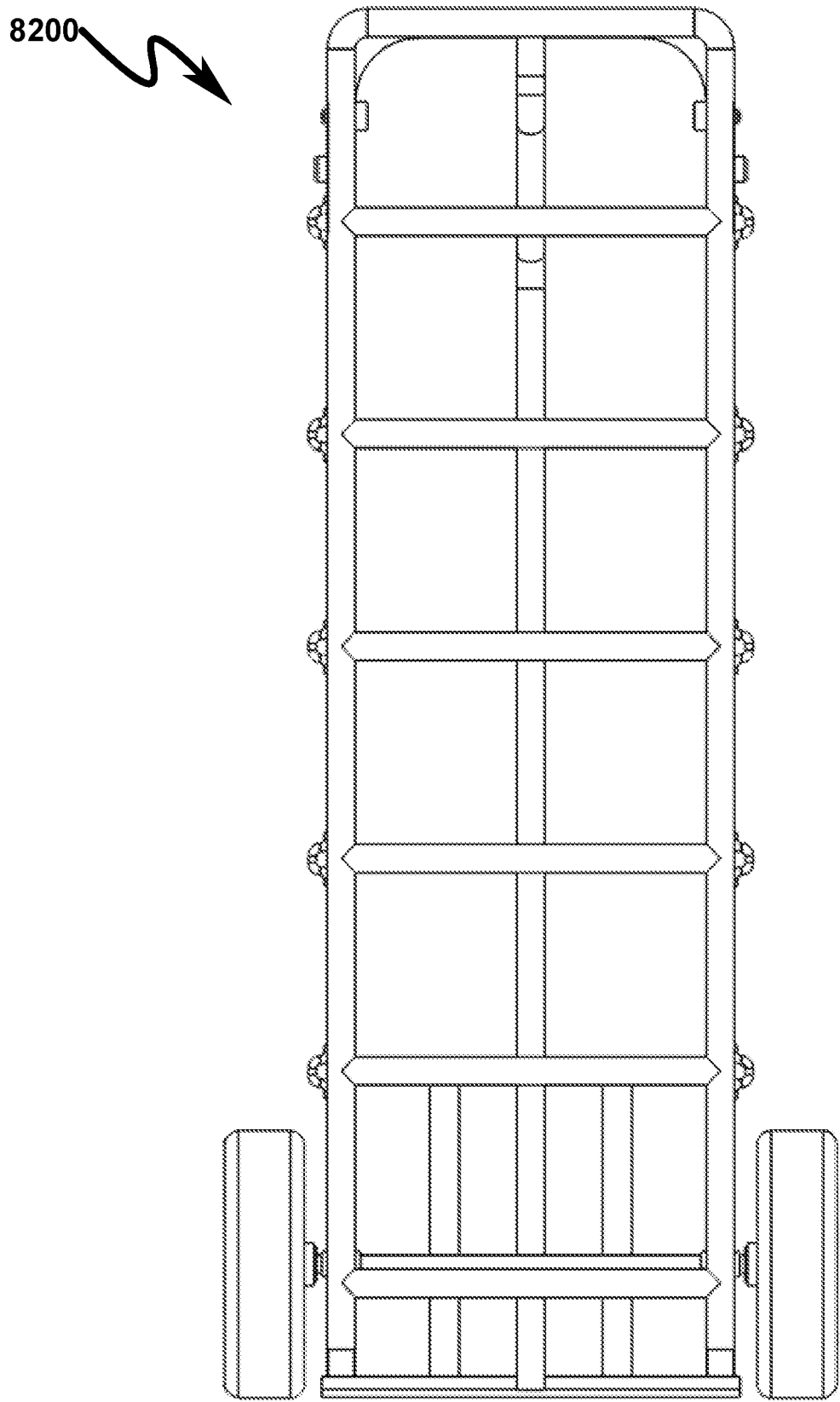
FIG. 82 illustrates a rear view of a preferred exemplary hand truck ladder (HTL) embodiment useful in some preferred invention embodiments.
Figure 83:
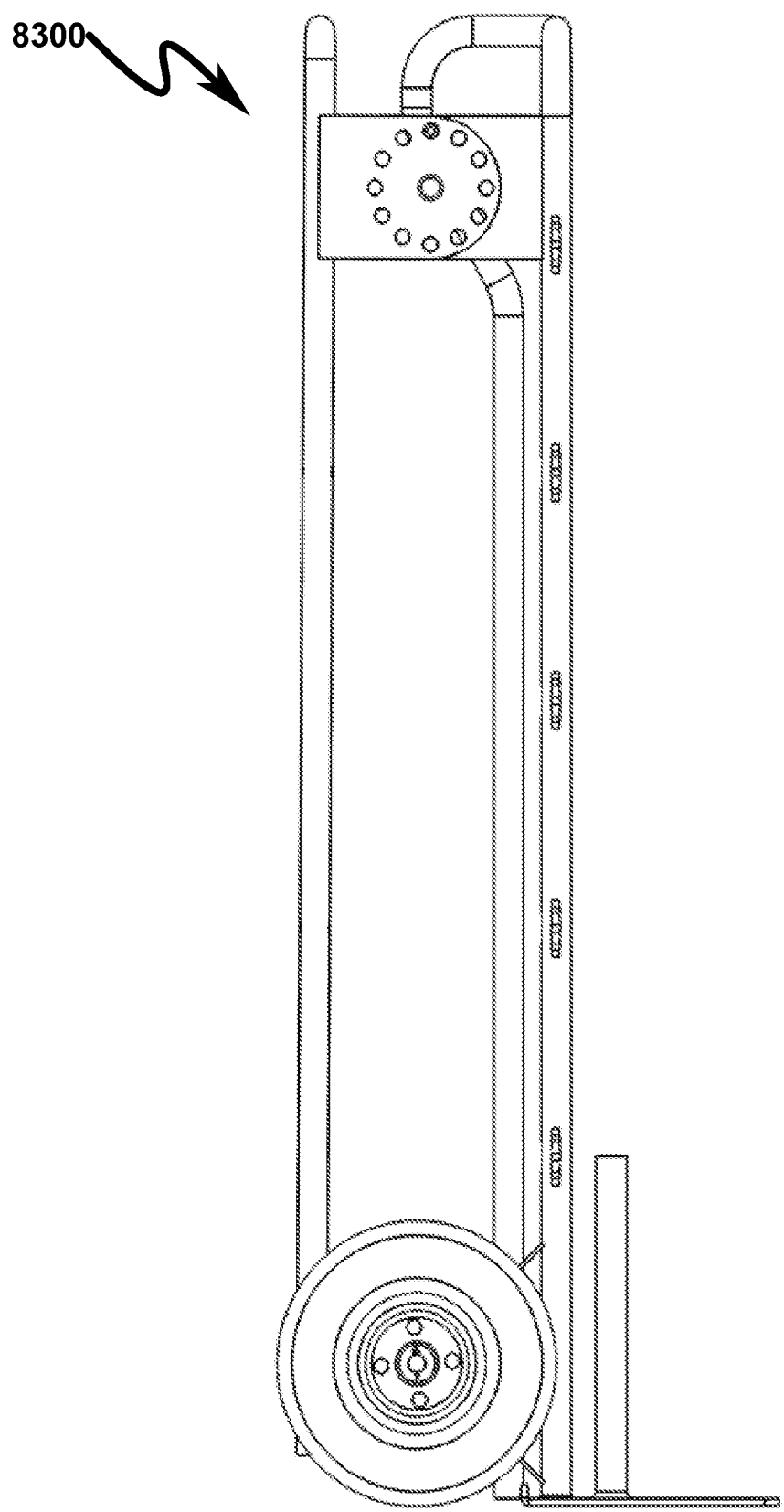
FIG. 83 illustrates a left side view of a preferred exemplary hand truck ladder (HTL) embodiment useful in some preferred invention embodiments.
Figure 84:
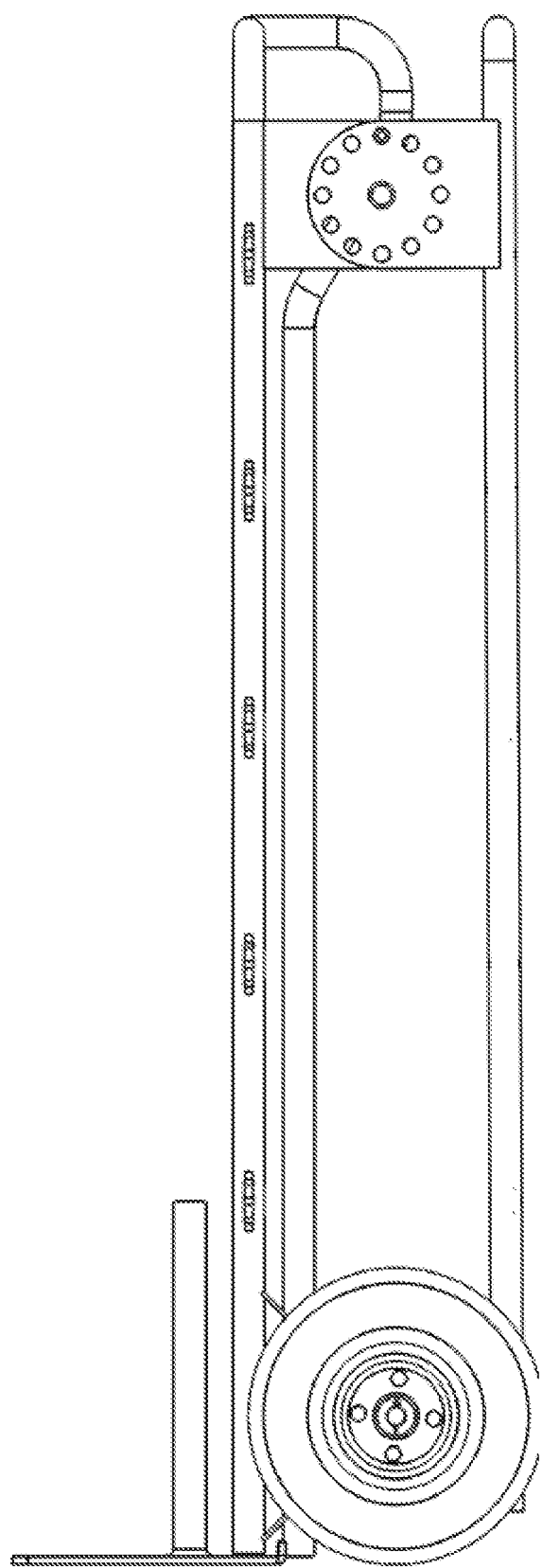
FIG. 84 illustrates a right side view of a preferred exemplary hand truck ladder (HTL) embodiment useful in some preferred invention embodiments.
Figure 85:
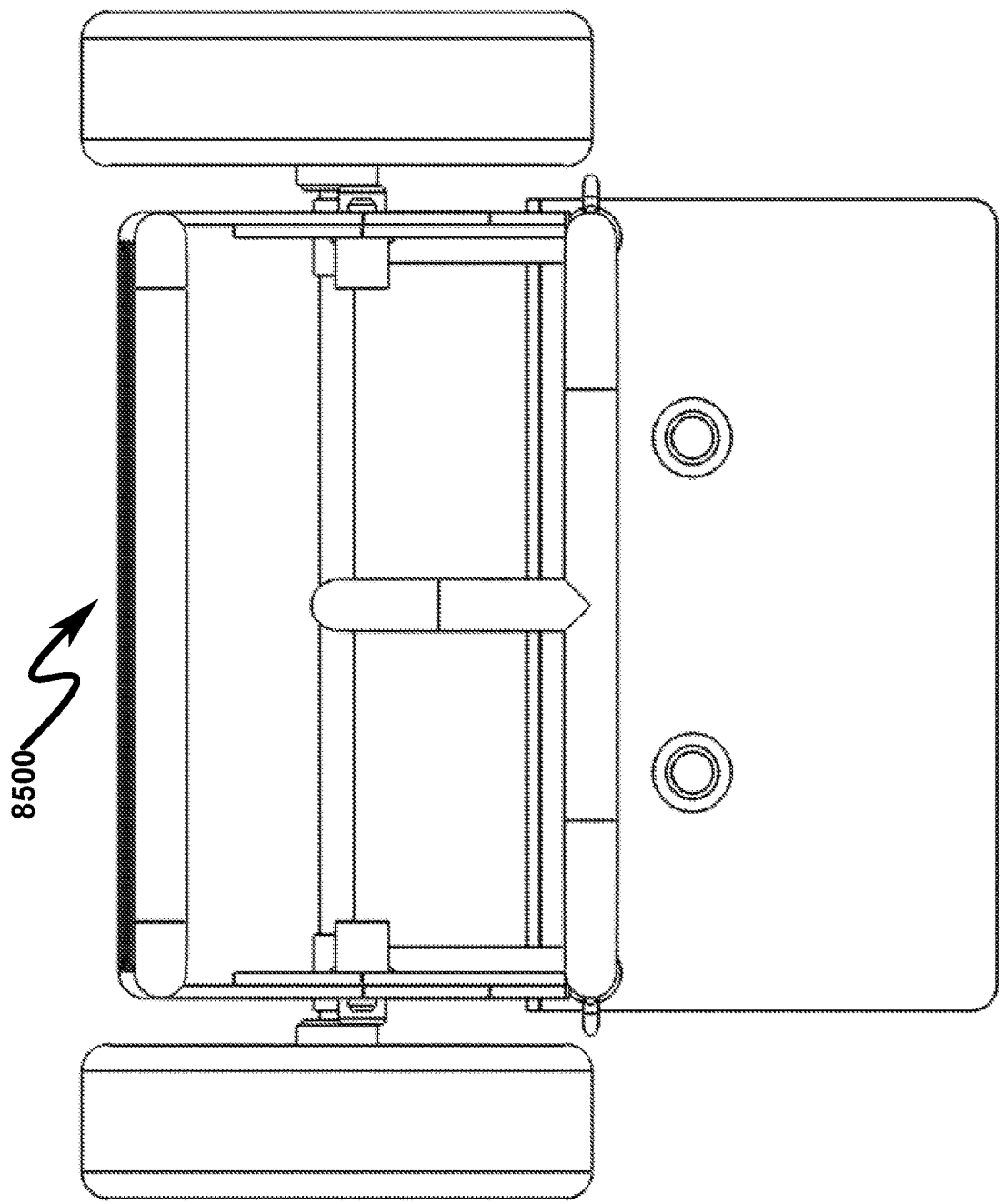
FIG. 85 illustrates a top view of a preferred exemplary hand truck ladder (HTL) embodiment useful in some preferred invention embodiments.
Figure 86:
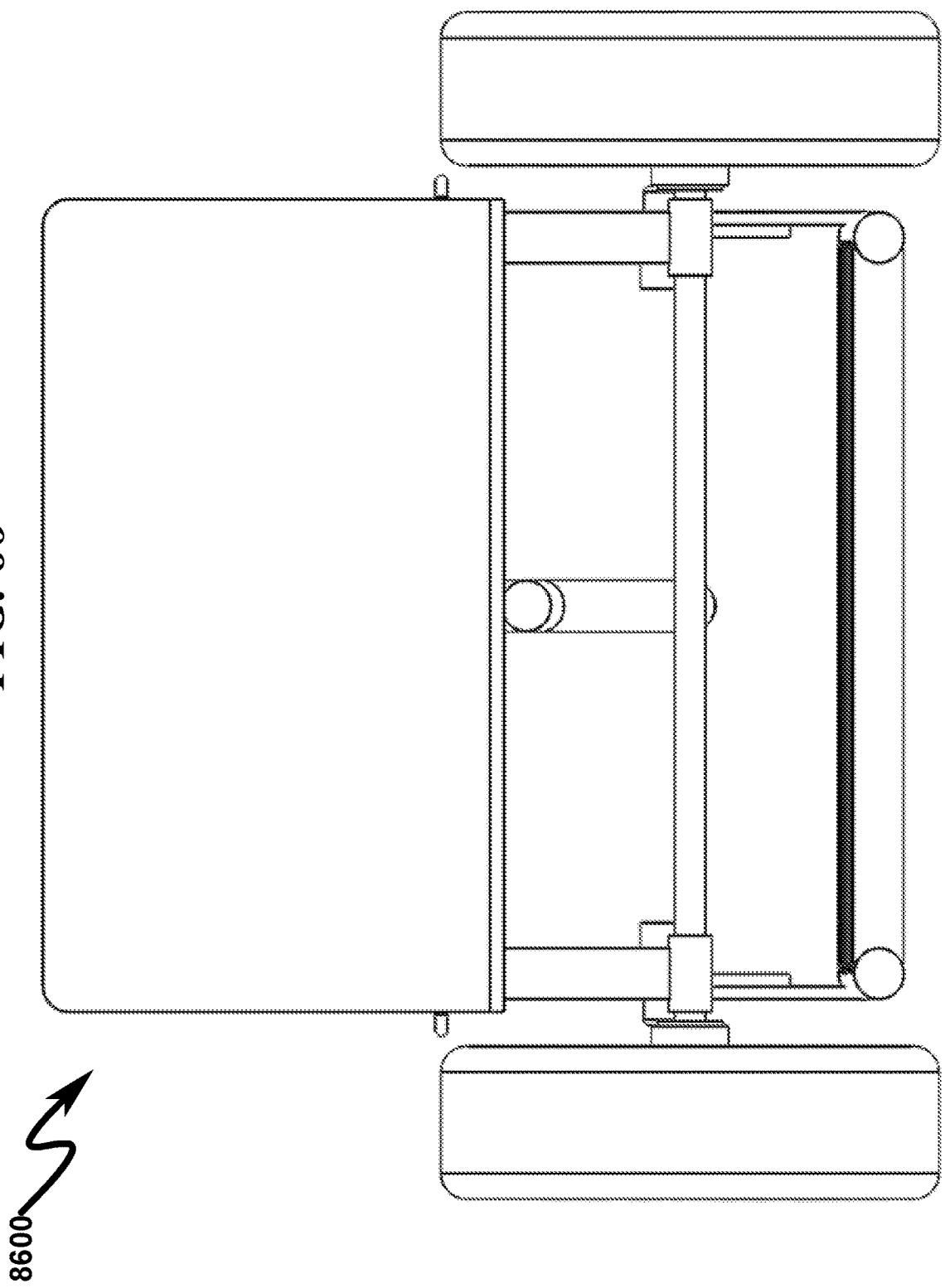
FIG. 86 illustrates a bottom view of a preferred exemplary hand truck ladder (HTL) embodiment useful in some preferred invention embodiments.
Figure 87:
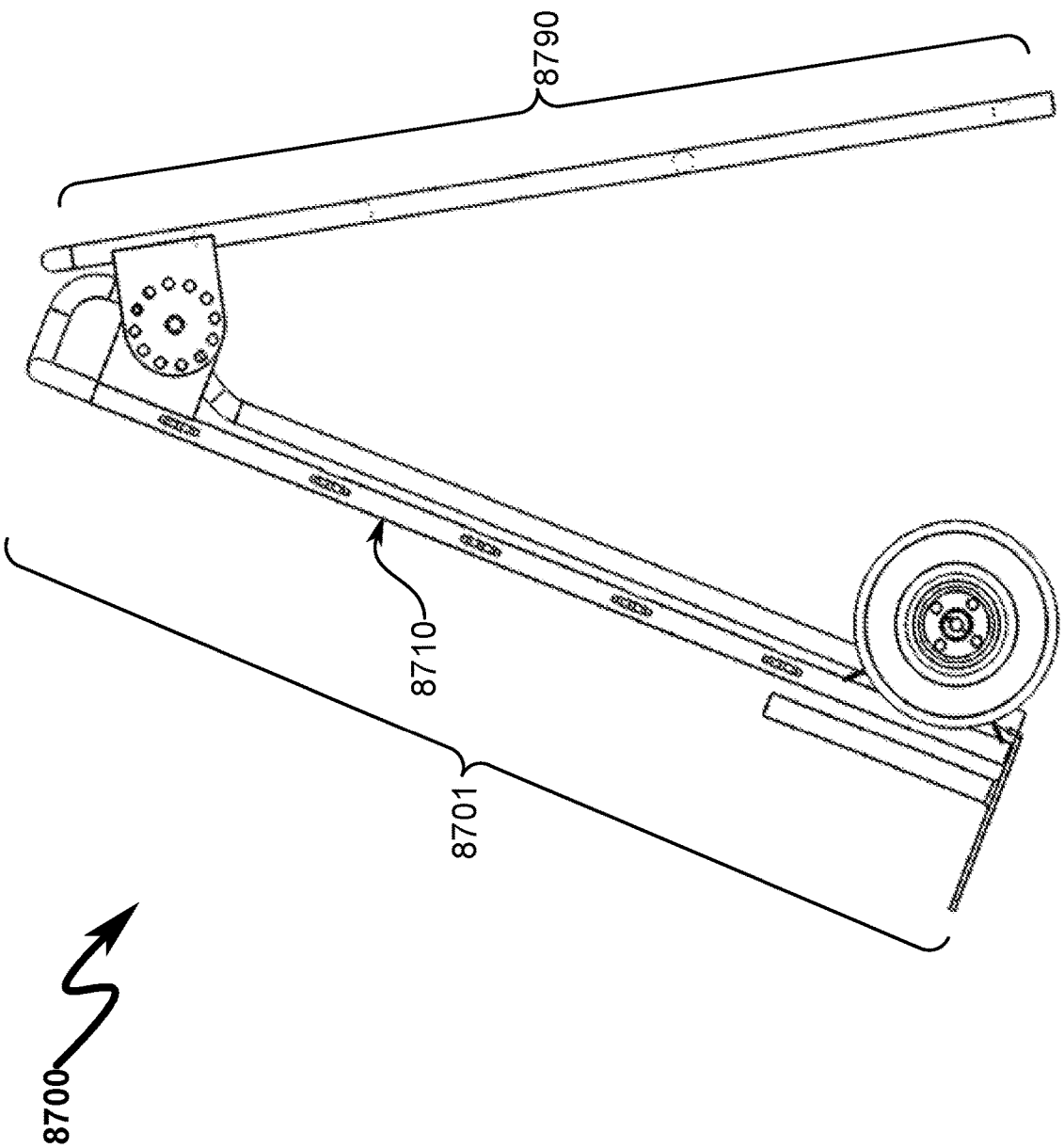
FIG. 87 illustrates a right side view of a preferred exemplary hand truck ladder (HTL) embodiment that has been unfolded for use.
Figure 96:
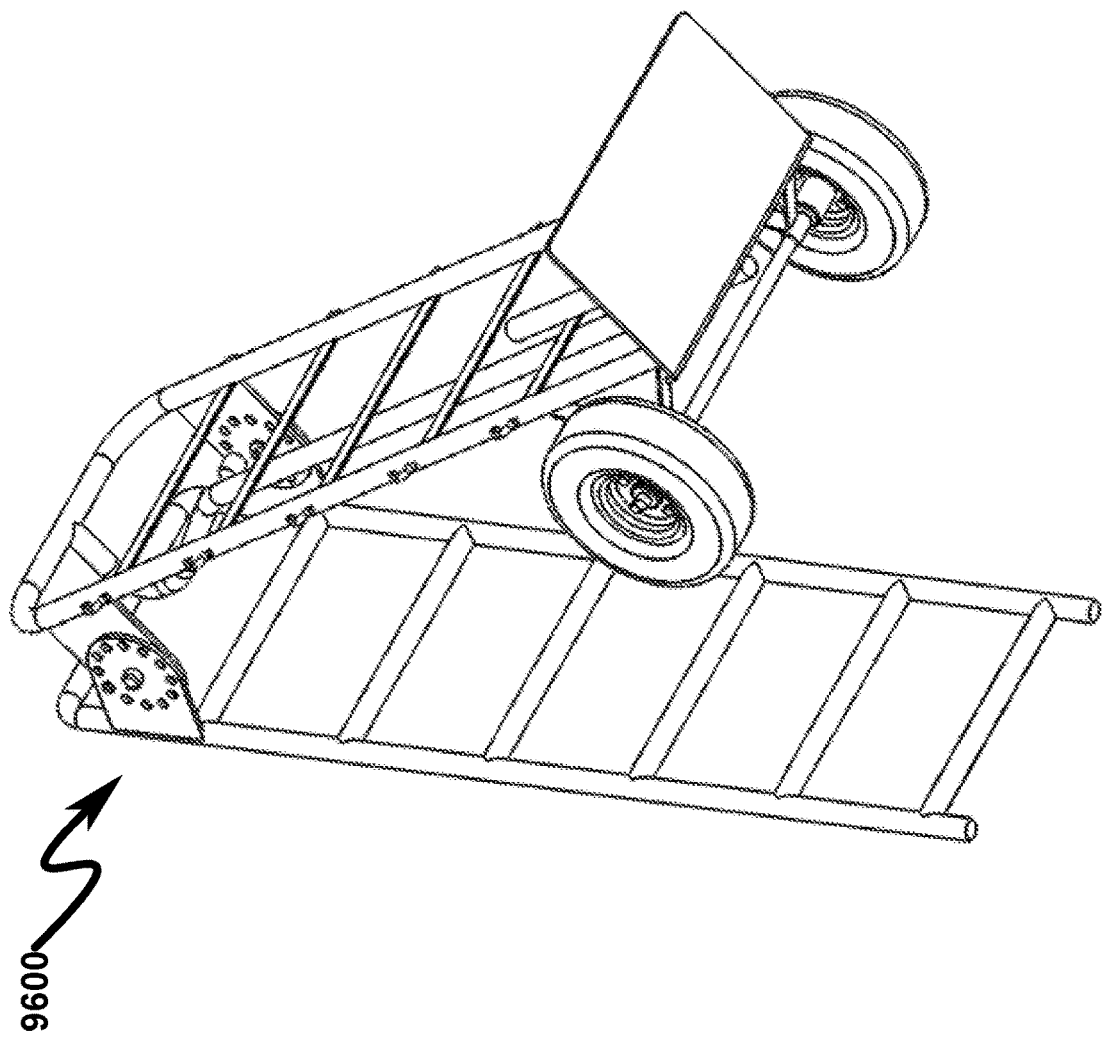
FIG. 96 illustrates a bottom left front perspective view of a preferred exemplary hand truck ladder (HTL) embodiment that has been unfolded for use.

Additional detail of an exemplary HTL is depicted in FIG. 81 (8100)-FIG. 96 (9600) wherein the exemplary HTL is depicted in a folded state in FIG. 81 (8100)-FIG. 86 (8600) and in an unfolded state for use as a conventional ladder in FIG. 87 (8700)-FIG. 96 (9600).

The drawings illustrate a MHT embodiment wherein the MHT (8701) further comprises a hand truck ladder (HTL) (8790, 8890) that articulates from the HTF (8710, 8810) and is configured to provide an A-shaped ladder structure that may be configured in a folded position for transportation or in an extended position for use as a conventional ladder. The A-shaped ladder structure may be held in the folded and the extended positions by a push-button detent (8891) at an axial vertex (8892) of the A-shape that positively locks an angle between the HTF and the HTL. The push-button detent (8891) may be depressed from the outside perimeter of the multi-bolt hole plate (8893) as depicted to select a particular angle for the A-shape ladder to be deployed.

Figure 88:
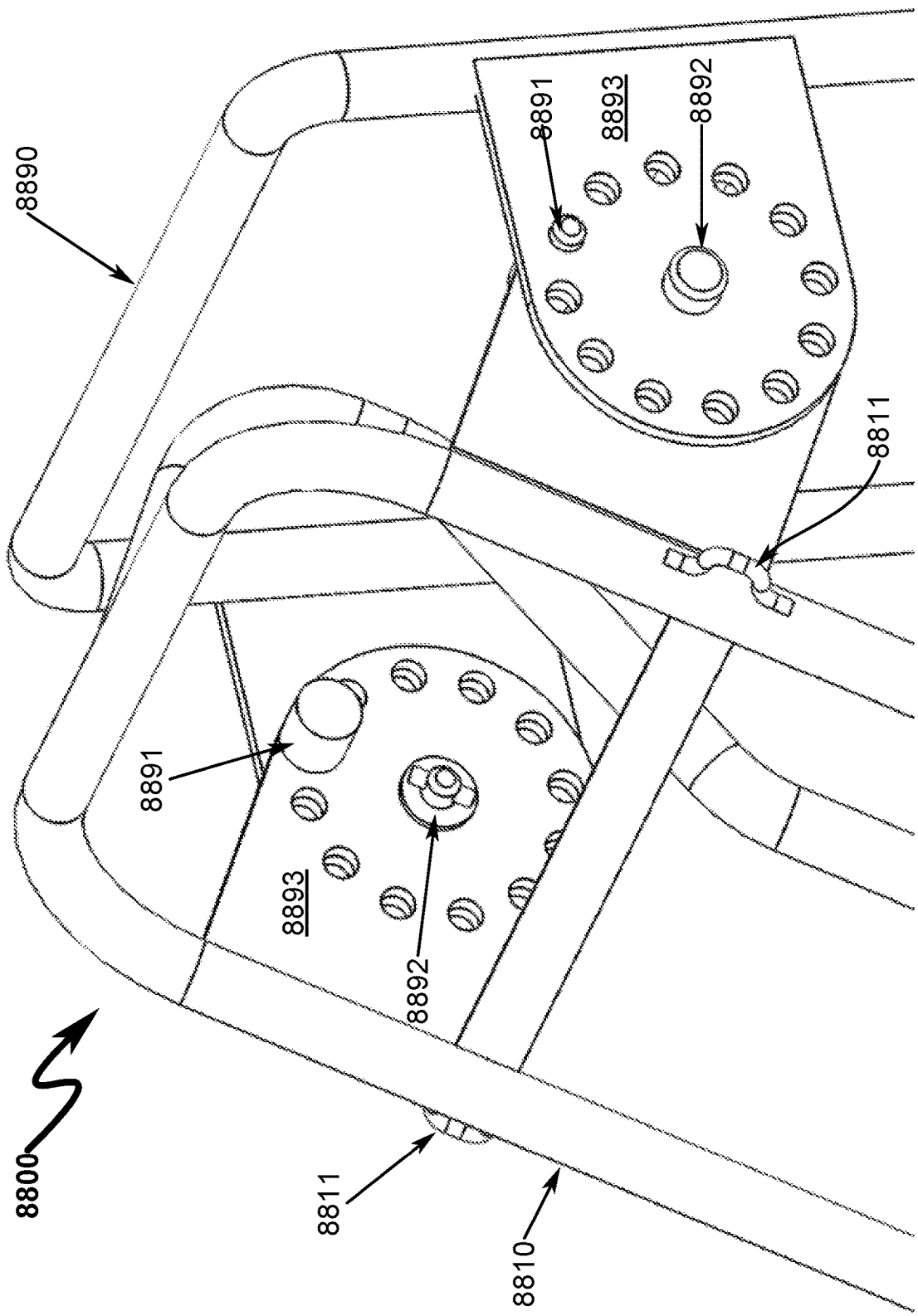
FIG. 88 illustrates a right side perspective latching hinge detail view of a preferred exemplary hand truck ladder (HTL) embodiment that has been unfolded for use.
Figure 89:
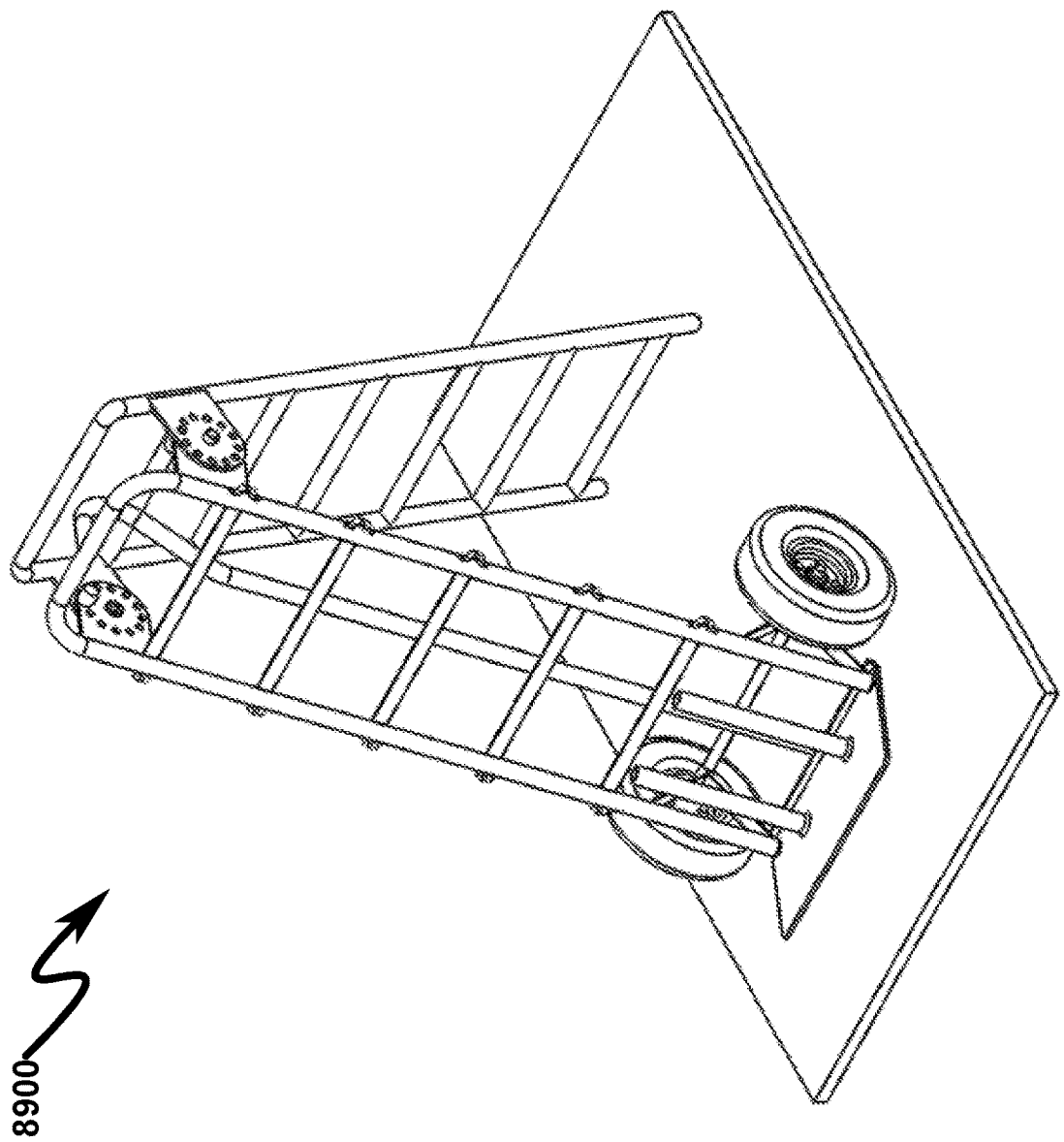
FIG. 89 illustrates a top right front perspective view of a preferred exemplary hand truck ladder (HTL) embodiment that has been unfolded for use.
Figure 90:
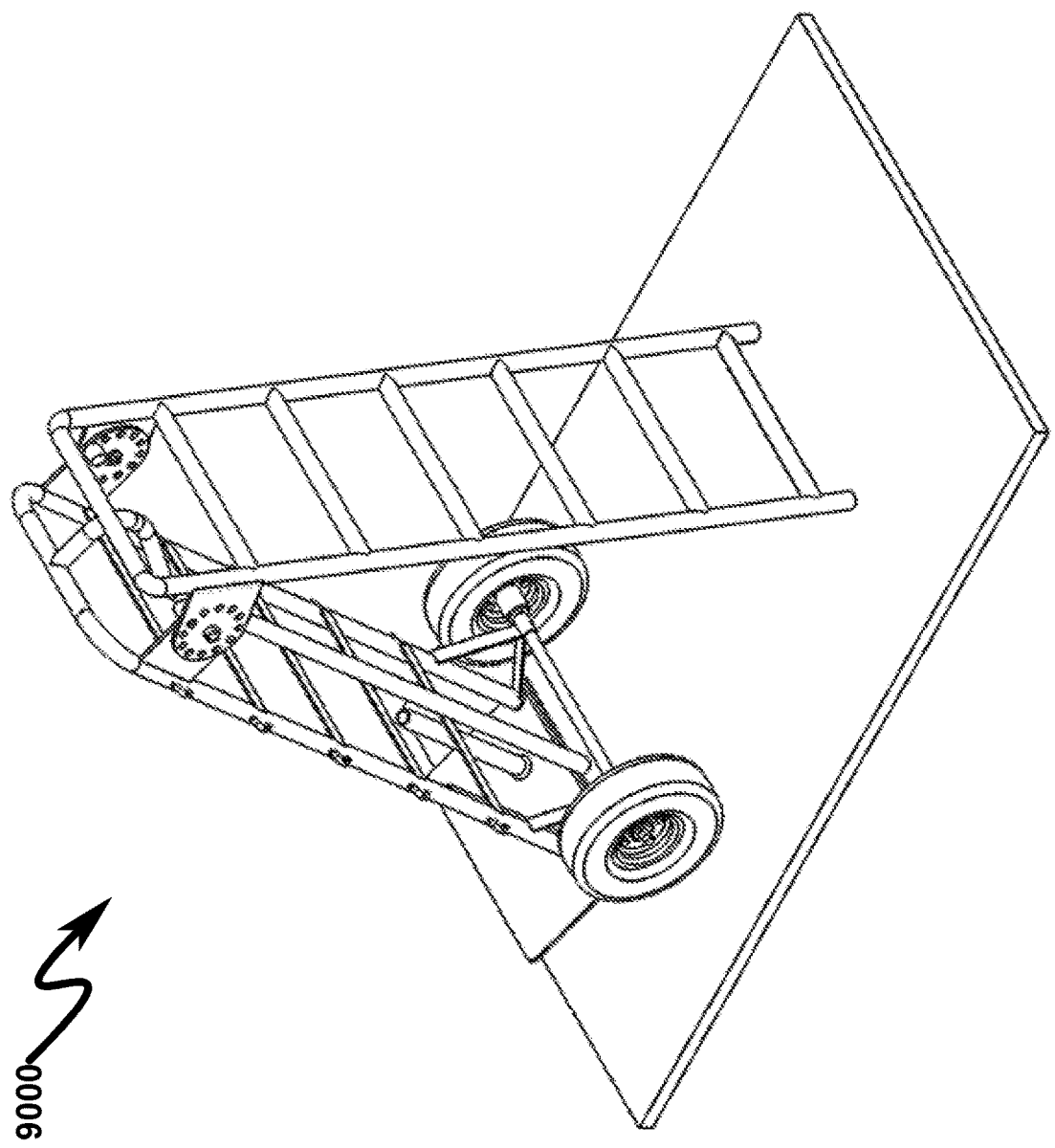
FIG. 90 illustrates a top right rear perspective view of a preferred exemplary hand truck ladder (HTL) embodiment that has been unfolded for use.
Figure 91:
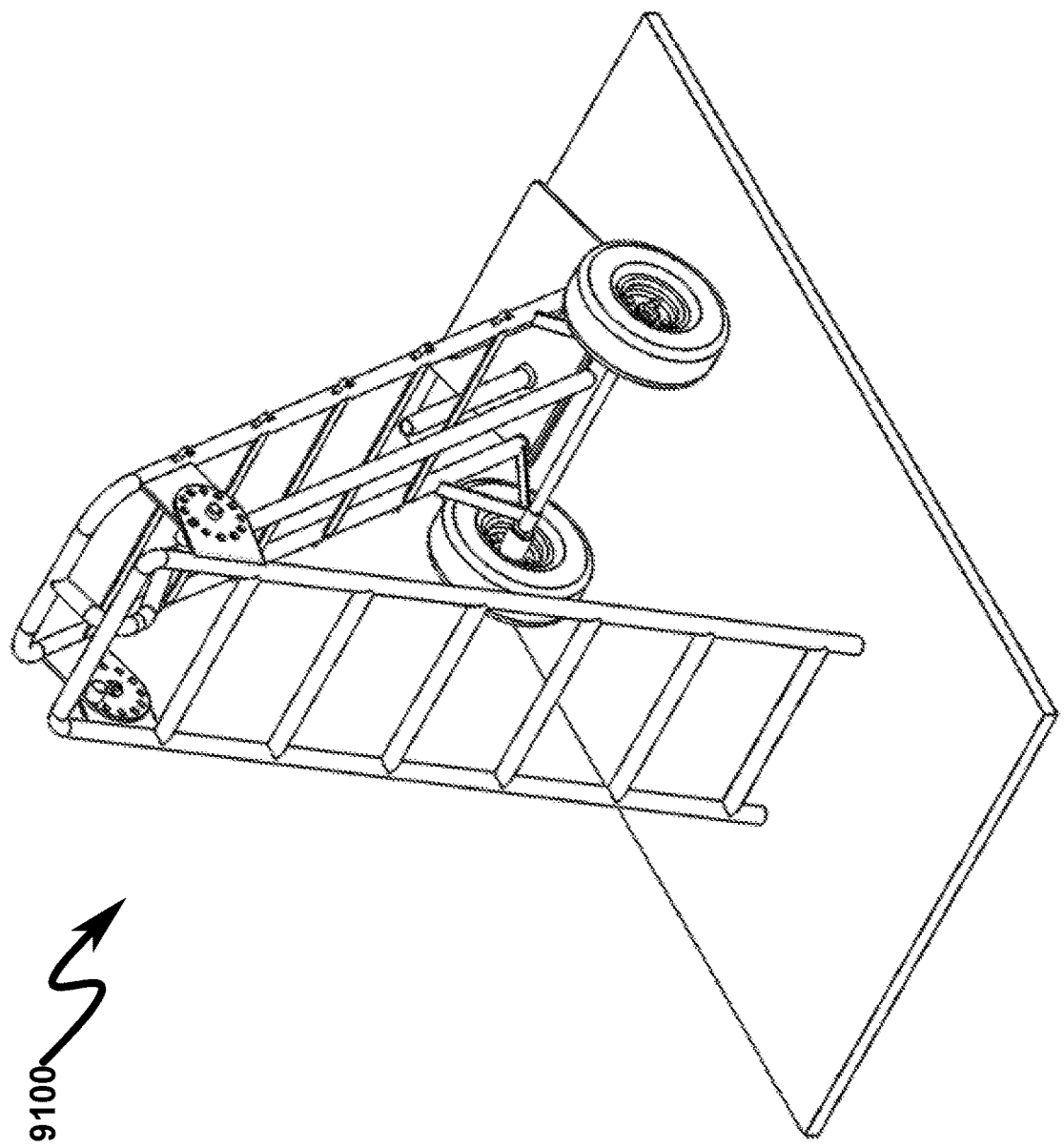
FIG. 91 illustrates a top left rear perspective view of a preferred exemplary hand truck ladder (HTL) embodiment that has been unfolded for use.
Figure 92:
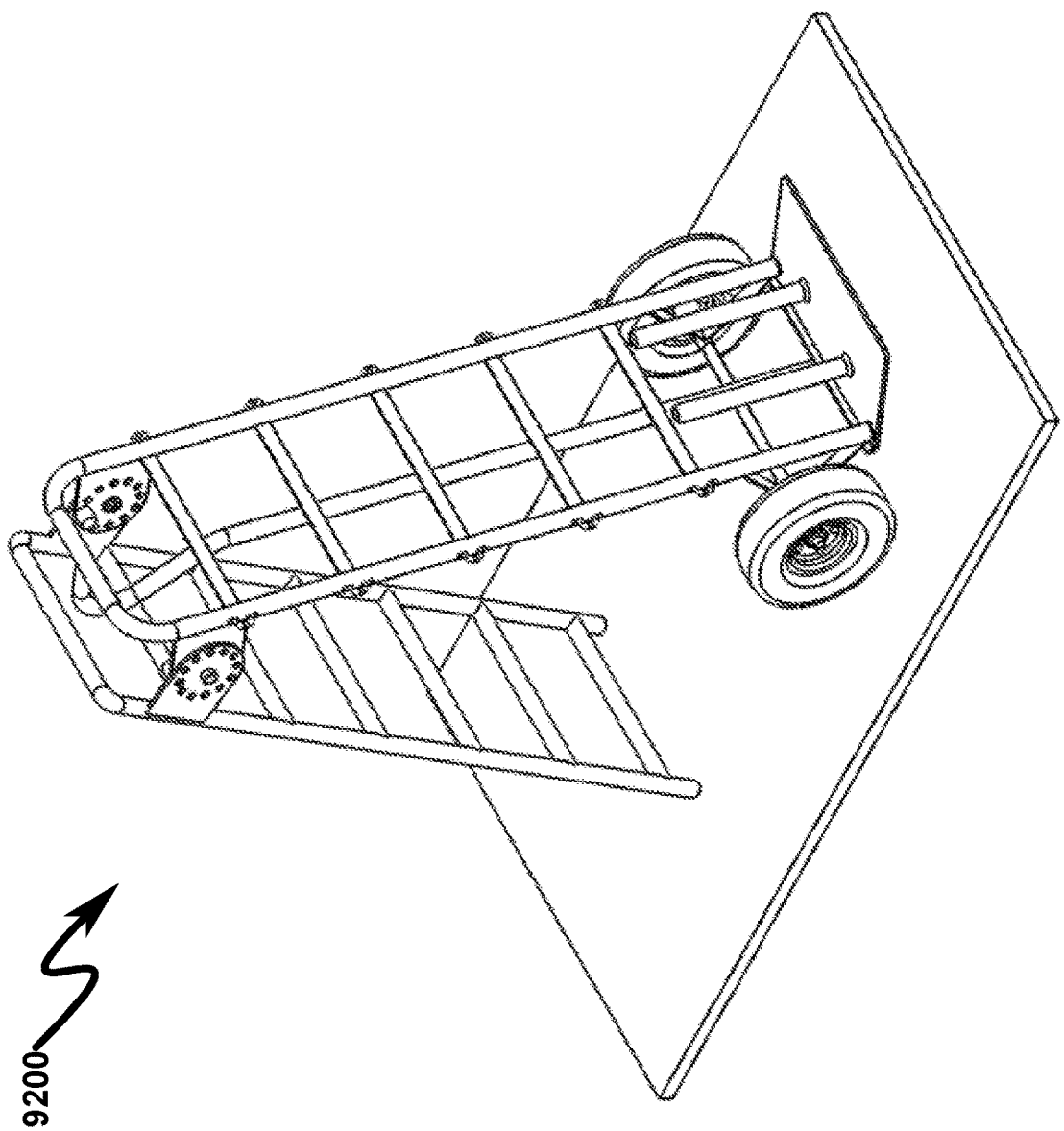
FIG. 92 illustrates a top left front perspective view of a preferred exemplary hand truck ladder (HTL) embodiment that has been unfolded for use.
Figure 93:
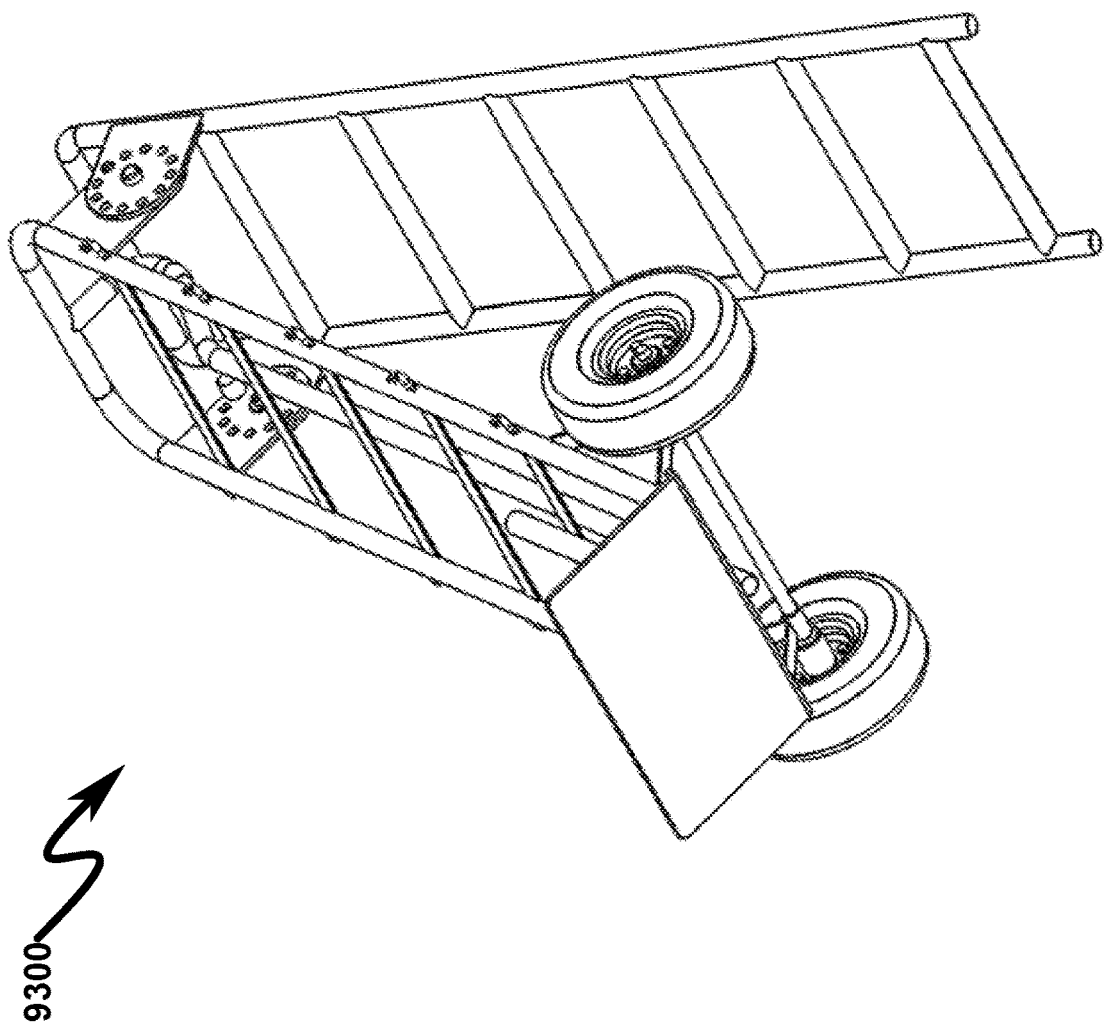
FIG. 93 illustrates a bottom right front perspective view of a preferred exemplary system invention embodiment in which the SAR elements have been removed.
Figure 94:
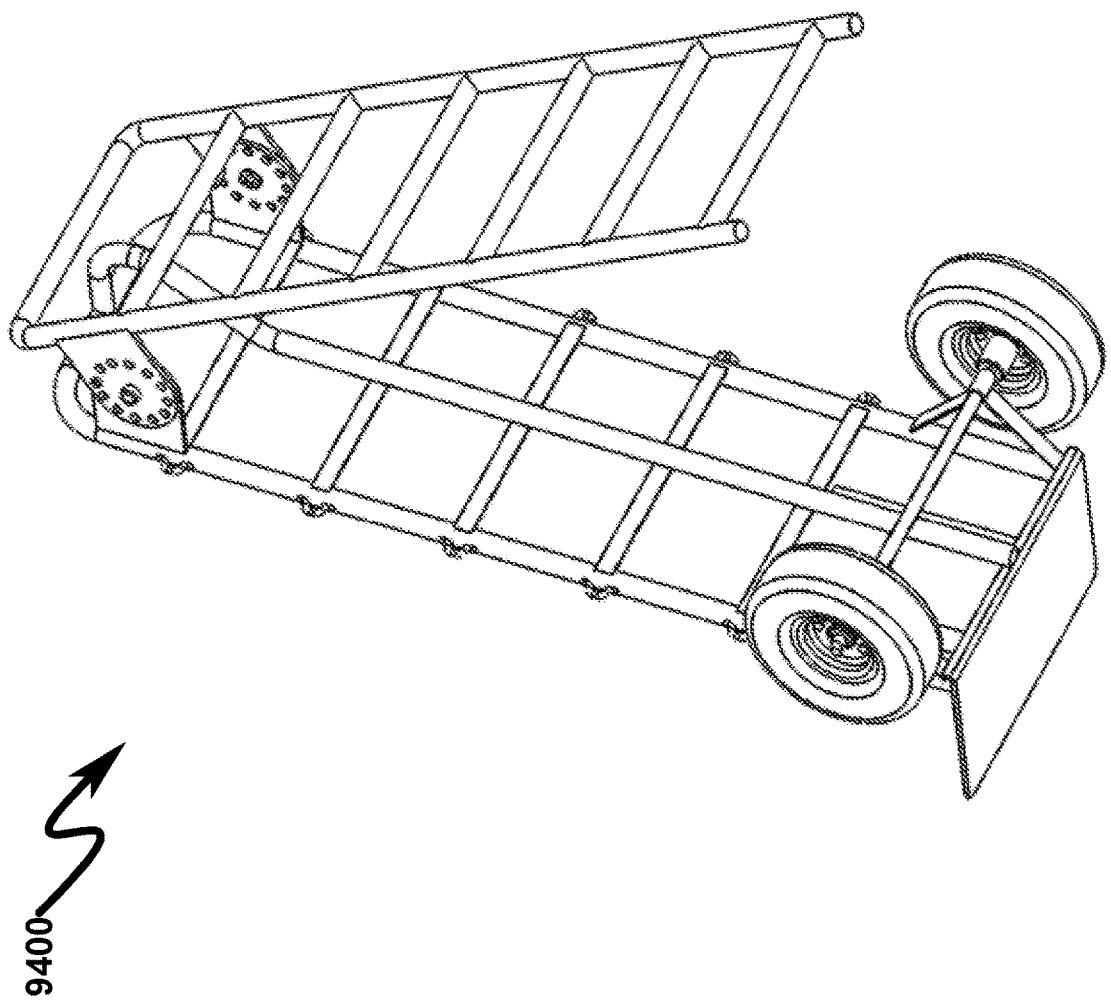
FIG. 94 illustrates a bottom right rear perspective view of a preferred exemplary hand truck ladder (HTL) embodiment that has been unfolded for use.
Figure 95:
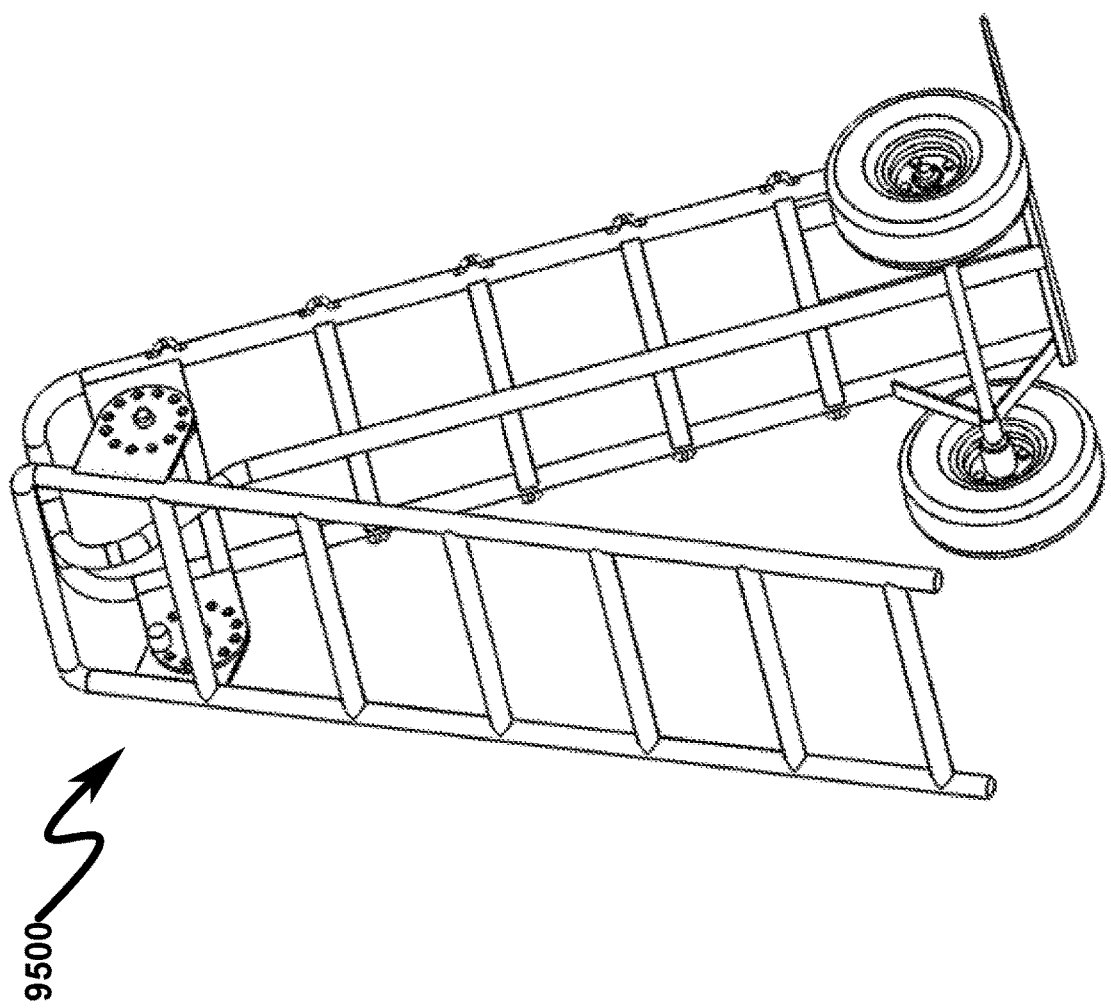
FIG. 95 illustrates a bottom left rear perspective view of a preferred exemplary hand truck ladder (HTL) embodiment that has been unfolded for use.

FIG. 88 (8800) also illustrates that the HTF (8810) may be augmented with strapping loops (8811) to allow straps, bungee cords, or other attachment means to be used to secure the AMS if necessary.

Preferred Embodiment System Summary

The present invention preferred exemplary system embodiment anticipates a wide variety of variations in the basic theme of construction, but can be generalized as a mobile audio transportation (MAT) system comprising:
 (a) mobile hand truck (MHT) (0101); and
 (b) one or more mobile audio modules (MAM) (0102);
 wherein:
 the MHT comprises:
  (1) hand truck frame (HTF) (0110);
  (2) hand truck wheels (HTW) (0120);
  (3) hand truck platform (HTP) (0130);
  (4) stack index rod (SIR) (0140);
  (5) stack alignment rod (SAR) (0150);
  (6) charger power strip (CPS) (0160); and
  (7) battery charger array (BCA) (0170);
 the MAM each comprises:
  (1) mobile speaker enclosure (MSE);
  (2) perforated acoustic tube (PAT);
  (3) battery charging jack (BCJ); and
  (4) battery charging switch (BCS);
 the HTF, the HTW, the HTP, the CPS, and the BCA are mechanically coupled to form a singular unitary entity within the MHT;
 the HTP and the HTF are in perpendicular alignment;
 the SIR is mechanically coupled to the HTP;
 the SAR is configured to engage the SIR in a longitudinal axial sliding fit that allows longitudinal axial but not radial movement of the SAR;
 within each of the MAM, the PAT is positioned within the MSE to permit speaker energy generated by the MAM to be emitted from the MSE;
 within each of the MAM, the PAT is configured with an enclosure alignment pathway (EAP) within the MAM that allows the SAR to penetrate through the PAT and the MAM, capturing and securing the MAM in an aligned MAM stack (AMS);
 the SAR is configured for removal from the SIR to allow stacking or unstacking of the MAM on the HTP;
 the CPS comprises a power distribution cord (PDC) that supplies AC power to a plurality of power distribution receptacles configured to distribute AC power to the BCA;
 the BCA comprises a plurality of primary battery chargers (PBC) that are configured to charge batteries contained within each of the MSE; and
 the PBC are each configured with a battery charging cord (BCC) configured for electrical and mechanical connection to each of the MAM.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a mobile audio transportation (MAT) method, the method operating in conjunction with a mobile audio transportation (MAT) system comprising:
(a) mobile hand truck (MHT) (0101); and
(b) one or more mobile audio modules (MAM) (0102);
wherein:
the MHT comprises:
  (1) hand truck frame (HTF) (0110);
  (2) hand truck wheels (HTW) (0120);
  (3) hand truck platform (HTP) (0130);
  (4) stack index rod (SIR) (0140);
  (5) stack alignment rod (SAR) (0150);
  (6) charger power strip (CPS) (0160); and
  (7) battery charger array (BCA) (0170);
the MAM each comprises:
  (1) mobile speaker enclosure (MSE);
  (2) perforated acoustic tube (PAT);
  (3) battery charging jack (BCJ); and
  (4) battery charging switch (BCS);
the HTF, the HTW, the HTP, the CPS, and the BCA are mechanically coupled to form a singular unitary entity within the MHT;
the HTP and the HTF are in perpendicular alignment;
the SIR is mechanically coupled to the HTP;
the SAR is configured to engage the SIR in a longitudinal axial sliding fit that allows longitudinal axial but not radial movement of the SAR;
within each of the MAM, the PAT is positioned within the MSE to permit speaker energy generated by the MAM to be emitted from the MSE;
within each of the MAM, the PAT is configured with an enclosure alignment pathway (EAP) within the MAM that allows the SAR to penetrate through the PAT and the MAM, capturing and securing the MAM in an aligned MAM stack (AMS);
the SAR is configured for removal from the SIR to allow stacking or unstacking of the MAM on the HTP;
the CPS comprises a power distribution cord (PDC) that supplies AC power to a plurality of power distribution receptacles configured to distribute AC power to the BCA;
the BCA comprises a plurality of primary battery chargers (PBC) that are configured to charge batteries contained within each of the MSE; and
the PBC are each configured with a battery charging cord (BCC) configured for electrical and mechanical connection to each of the MAM;
wherein the method comprises the steps of:
(1) stacking the MAMs on the HTP, aligning each the EAP with the SIR on the MHT HTP (0201);
(2) inserting the SAR through each of the EAP and inserting the SAR into the SIR to form the AMS on the MHT to secure the MAMs to the MHT (0202)
(3) optionally attaching the CPS to an AC power source, the CPS to the BCA, the BCA PBCs to the MAMs, and charging batteries in the MAM (0203);
(4) inclining the MHT and rolling the MHT and the AMS assembly to a desired location (0204);
(5) removing the SAR from the AMS and the SIR (0205); and
(6) unstacking the MAMs from the HTP and deploying the MAMs to desired positions and then proceeding to step (1) (0206).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the MHT further comprises a hand truck coupler (HTC) (0180) configured to permit mechanical coupling of one MHT to another MHT for the purposes of generating a train of MHTs that may be transported as a unitary entity.

An embodiment wherein the MHT further comprises a hand truck coupler (HTC) (0180) configured to permit mechanical coupling of one MHT to a powered mobile transportation unit (MTU) for the purposes of transporting one or more of the MHT using the MTU.

An embodiment wherein the MHT further comprises a hand truck ladder (HTL) (0190) that articulates from the HTF and is configured to provide an A-shaped ladder structure that may be configured in a folded position for transportation or in an extended position for use as a conventional ladder.

An embodiment wherein the MHT further comprises a hand truck ladder (HTL) (0190) that articulates from the HTF and is configured to provide an A-shaped ladder structure that may be configured in a folded position for transportation or in an extended position for use as a conventional ladder, the A-shaped ladder structure held in the folded and the extended positions by a push-button detent at a vertex of the A-shape that positively locks an angle between the HTF and the HTL.

An embodiment wherein the MHT further comprises a hand truck handle (HTH) affixed to the HTF.

An embodiment wherein the MHT comprises two of the SIRs attached to the HTP and two of the SARs in alignment with the two of the SIRs.

An embodiment wherein the BCA comprises a plurality of bins, each of the bins configured to store and/or mechanically couple one of the PBCs within the BCA.

Figure 5:
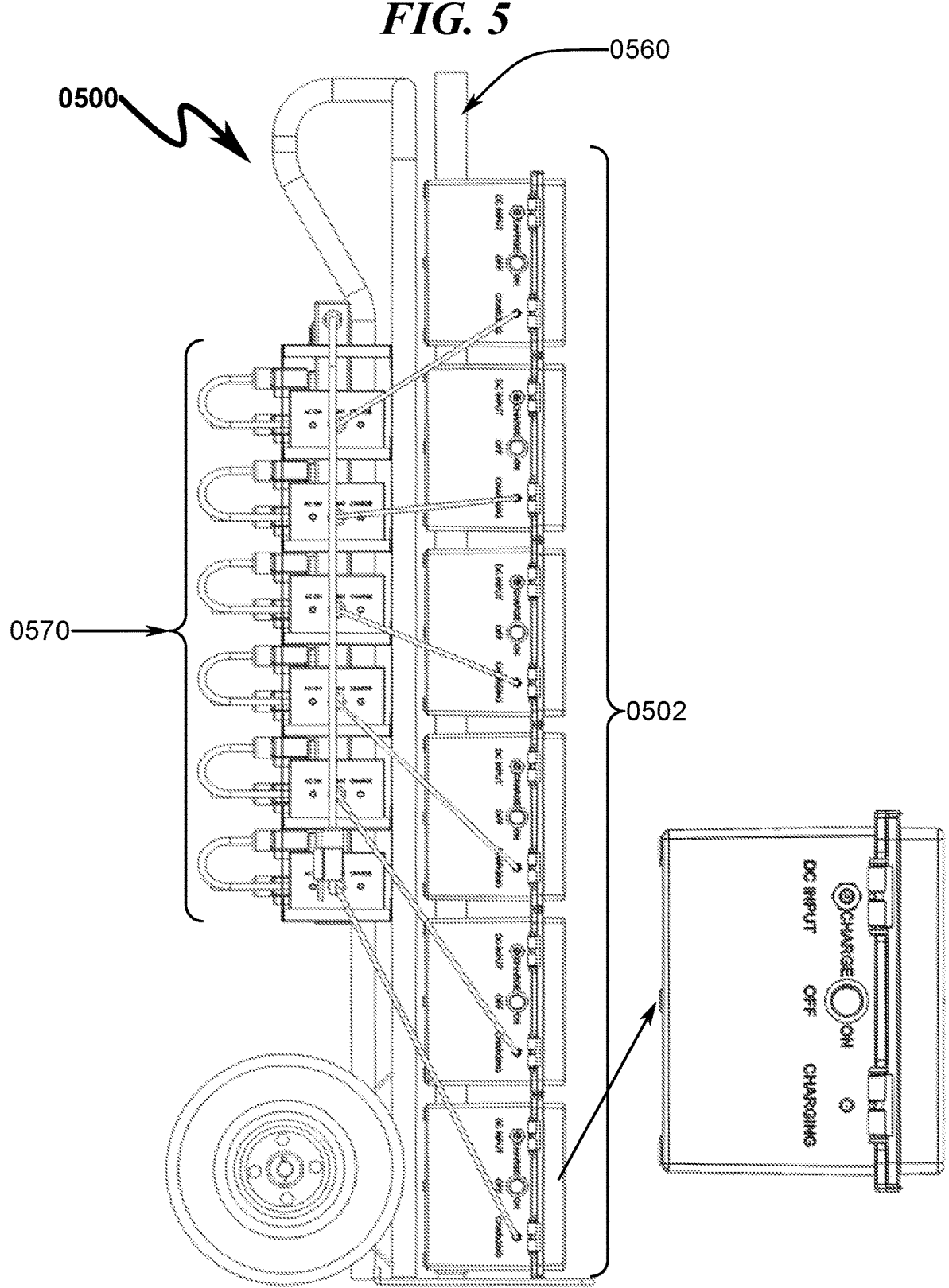
FIG. 5 illustrates a left side view of a preferred exemplary system invention embodiment in which the MHT is loaded with a plurality of MAMs aligned in two MAS stacks.
Figure 6:
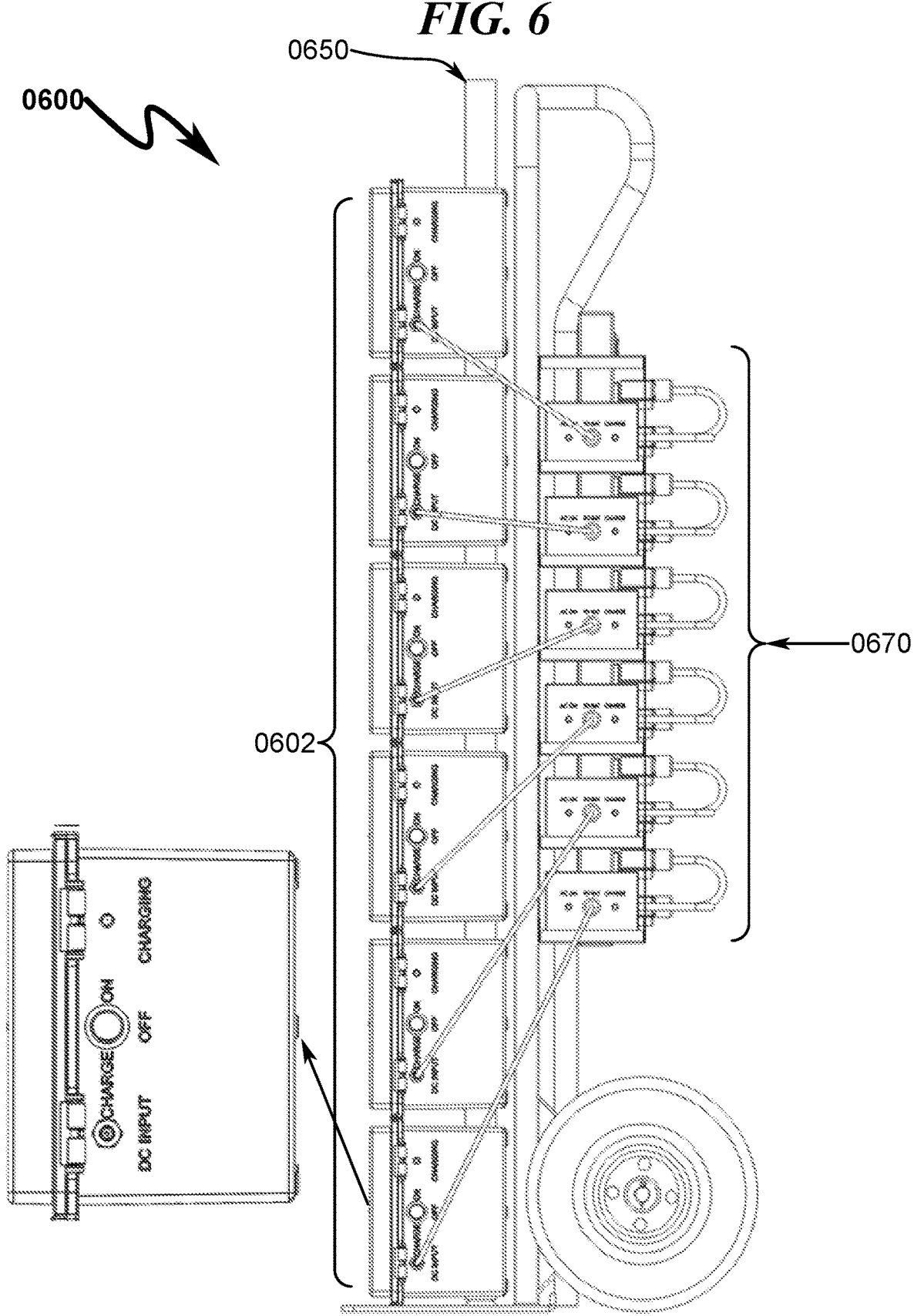
FIG. 6 illustrates a right side view of a preferred exemplary system invention embodiment in which the MHT is loaded with a plurality of MAMs aligned in two MAS stacks.
Figure 7:
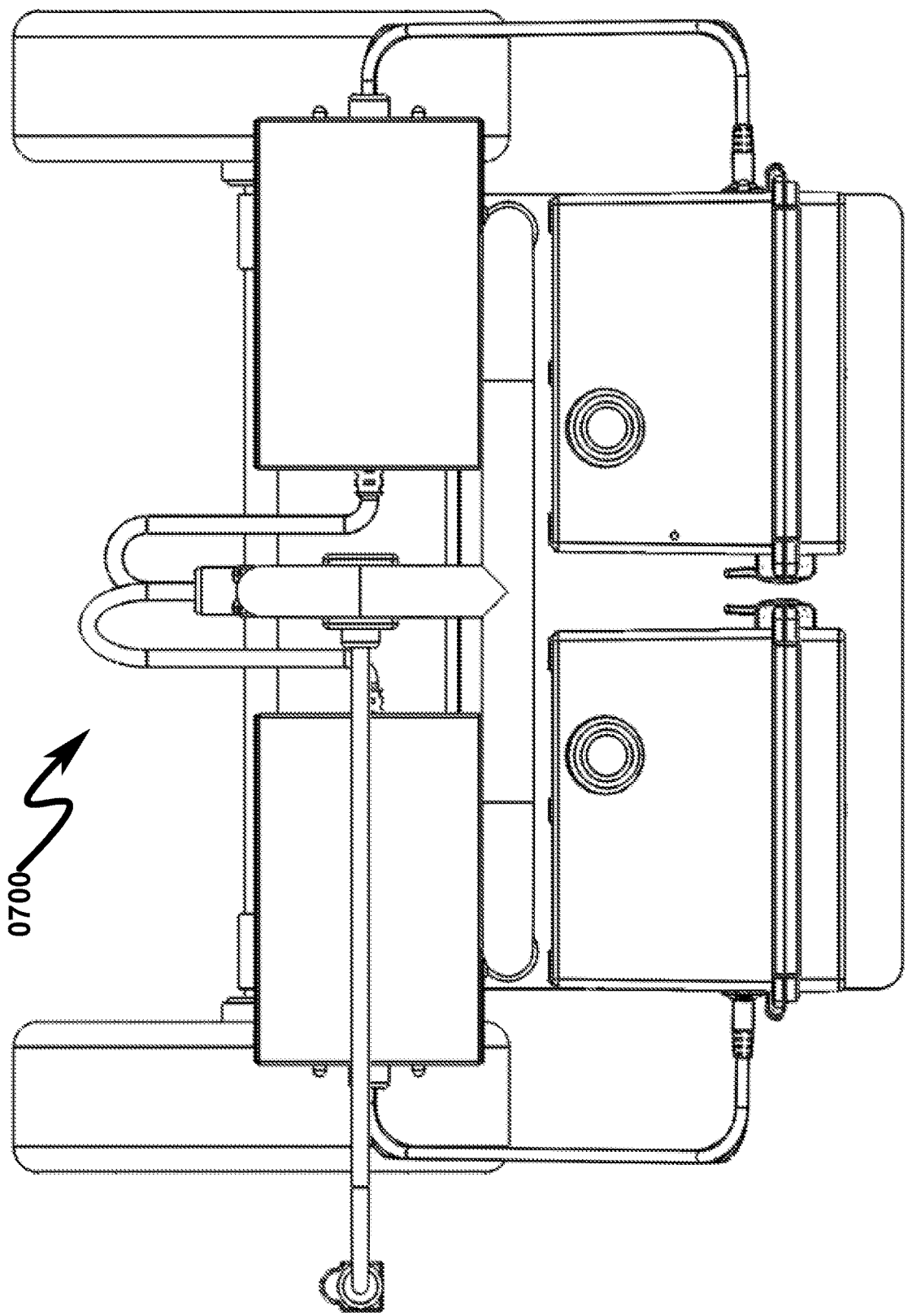
FIG. 7 illustrates a top view of a preferred exemplary system invention embodiment in which the MHT is loaded with a plurality of MAMs aligned in two MAS stacks.

An embodiment wherein each of the MAMs comprises a power switch allowing for MAM OFF operation, MAM ON operation, and MAM charging operation (see FIG. 5 (0500)-FIG. 6 (0600)).

An embodiment wherein each of the MAMs comprises a DC power jack configured to accept charging power from one of the PBCs and a visual indicator that displays MAM ON/OFF and CHARGING states (see FIG. 5 (0500)-FIG. 6 (0600)).

One skilled in the art will recognize that other embodiments are possible based on combinations of the embodiments listed above and/or elements taught within the above invention description.

CONCLUSION

A mobile audio transportation (MAT) system/method allowing transportation of mobile audio modules (MAMs) has been disclosed. The system/method incorporates a perforated acoustic tube (PAT) in the MAM allowing speaker energy to be efficiently emitted from the mobile speaker enclosure (MSE). The PAT is configured with an enclosure alignment pathway (EAP) within the MAM allowing a stack alignment rod (SAR) to penetrate through the PAT/EAP thus capturing and securing the MAM in an aligned MAM stack (AMS). Alignment and insertion of the SAR with a stack index rod (SIR) affixed to a mobile hand truck (MHT) allows the AMS to be coupled with the MHT for transportation of the AMS. The MHT incorporates a hand truck frame (HTF), hand truck wheels (HTW), hand truck platform (HTP) and SIR, hand truck handle (HTH), charger power strip (CPS), battery charger array (BCA), and optional hand truck coupler (HTC) to facilitate AMS transportation.

CLAIMS INTERPRETATION

The following rules apply when interpreting the CLAIMS of the present invention:
  The CLAIM PREAMBLE should be considered as limiting the scope of the claimed invention.
  "WHEREIN" clauses should be considered as limiting the scope of the claimed invention.
  "WHEREBY" clauses should be considered as limiting the scope of the claimed invention.
  "ADAPTED TO" clauses should be considered as limiting the scope of the claimed invention.
  "ADAPTED FOR" clauses should be considered as limiting the scope of the claimed invention.
  The term "MEANS" specifically invokes the means-plus-function claims limitation recited in 35 U.S.C. § 112(f) and such claim shall be construed to cover the corresponding structure, material, or acts described in the specification and equivalents thereof.
  The phrase "MEANS FOR" specifically invokes the means-plus-function claims limitation recited in 35 U.S.C. § 112(f) and such claim shall be construed to cover the corresponding structure, material, or acts described in the specification and equivalents thereof.
  The phrase "STEP FOR" specifically invokes the step-plus-function claims limitation recited in 35 U.S.C. § 112(f) and such claim shall be construed to cover the corresponding structure, material, or acts described in the specification and equivalents thereof.
  The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".
  The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
  The claims presented herein are to be interpreted in light of the specification and drawings presented herein with sufficiently narrow scope such as to not preempt any abstract idea.
  The claims presented herein are to be interpreted in light of the specification and drawings presented herein with sufficiently narrow scope such as to not preclude every application of any idea.
  The claims presented herein are to be interpreted in light of the specification and drawings presented herein with sufficiently narrow scope such as to preclude any basic mental process that could be performed entirely in the human mind.
  The claims presented herein are to be interpreted in light of the specification and drawings presented herein with sufficiently narrow scope such as to preclude any process that could be performed entirely by human manual effort.

What is claimed is:
1. A mobile audio transportation (MAT) system comprising:
  (a) mobile hand truck (MHT) (0101); and
  (b) one or more mobile audio modules (MAM) (0102);
  wherein:
  said MHT comprises:
    (1) hand truck frame (HTF) (0110);
    (2) hand truck wheels (HTW) (0120);
    (3) hand truck platform (HTP) (0130);
    (4) stack index rod (SIR) (0140);
    (5) stack alignment rod (SAR) (0150);
    (6) charger power strip (CPS) (0160); and
    (7) battery charger array (BCA) (0170);
  said MAM each comprises:
    (1) mobile speaker enclosure (MSE);
    (2) perforated acoustic tube (PAT);
    (3) battery charging jack (BCJ); and
    (4) battery charging switch (BCS);
  said HTF, said HTW, said HTP, said CPS, and said BCA are mechanically coupled to form a singular unitary entity within said MHT;
  said HTP and said HTF are in perpendicular alignment;
  said SIR is mechanically coupled to said HTP;
  said SAR is configured to engage said SIR in a longitudinal axial sliding fit that allows longitudinal axial but not radial movement of said SAR;
  within each of said MAM, said PAT is positioned within said MSE to permit speaker energy generated by said MAM to be emitted from said MSE;
  within each of said MAM, said PAT is configured with an enclosure alignment pathway (EAP) within the MAM that allows said SAR to penetrate through said PAT and said MAM, capturing and securing said MAM in an aligned MAM stack (AMS);
  said SAR is configured for removal from said SIR to allow stacking or unstacking of said MAM on said HTP;
  said CPS comprises a power distribution cord (PDC) that supplies AC power to a plurality of power distribution receptacles configured to distribute AC power to said BCA;
  said BCA comprises a plurality of primary battery chargers (PBC) that are configured to charge batteries contained within each of said MSE; and
  said PBC are each configured with a battery charging cord (BCC) configured for electrical and mechanical connection to each of said MAM.

2. The mobile audio transportation system of claim 1 wherein said MHT further comprises a hand truck coupler (HTC) (0180) configured to permit mechanical coupling of one MHT to another MHT for the purposes of generating a train of MHTs that may be transported as a unitary entity.

3. The mobile audio transportation system of claim 1 wherein said MHT further comprises a hand truck coupler (HTC) (0180) configured to permit mechanical coupling of one MHT to a powered mobile transportation unit (MTU) for the purposes of transporting one or more of said MHT using said MTU.

4. The mobile audio transportation system of claim 1 wherein said MHT further comprises a hand truck ladder (HTL) (0190) that articulates from said HTF and is configured to provide an A-shaped ladder structure that may be configured in a folded position for transportation or in an extended position for use as a conventional ladder.

5. The mobile audio transportation system of claim 1 wherein said MHT further comprises a hand truck ladder (HTL) (0190) that articulates from said HTF and is configured to provide an A-shaped ladder structure that may be configured in a folded position for transportation or in an extended position for use as a conventional ladder, said A-shaped ladder structure held in said folded and said extended positions by a push-button detent at a vertex of said A-shape that positively locks an angle between said HTF and said HTL.

6. The mobile audio transportation system of claim 1 wherein said MHT further comprises a hand truck handle (HTH) affixed to said HTF.

7. The mobile audio transportation system of claim 1 wherein said MHT comprises two of said SIRs attached to said HTP and two of said SARs in alignment with said two of said SIRs.

8. The mobile audio transportation system of claim 1 wherein said BCA comprises a plurality of bins, each of said bins configured to store and/or mechanically couple one of said PBCs within said BCA.

9. The mobile audio transportation system of claim 1 wherein each of said MAMs comprises a power switch allowing for MAM OFF operation, MAM ON operation, and MAM charging operation.

10. The mobile audio transportation system of claim 1 wherein each of said MAMs comprises a DC power jack configured to accept charging power from one of said PBCs and a visual indicator that displays MAM ON/OFF and CHARGING states.

11. A mobile audio transportation (MAT) method, said method operating in conjunction with a mobile audio transportation (MAT) system, said system comprising:
    (a) mobile hand truck (MHT) (0101); and
    (b) one or more mobile audio modules (MAM) (0102);
    wherein:
    said MHT comprises:
        (1) hand truck frame (HTF) (0110);
        (2) hand truck wheels (HTW) (0120);
        (3) hand truck platform (HTP) (0130);
        (4) stack index rod (SIR) (0140);
        (5) stack alignment rod (SAR) (0150);
        (6) charger power strip (CPS) (0160); and
        (7) battery charger array (BCA) (0170);
    said MAM each comprises:
        (1) mobile speaker enclosure (MSE);
        (2) perforated acoustic tube (PAT);
        (3) battery charging jack (BCJ); and
        (4) battery charging switch (BCS);
    said HTF, said HTW, said HTP, said CPS, and said BCA are mechanically coupled to form a singular unitary entity within said MHT;
    said HTP and said HTF are in perpendicular alignment;
    said SIR is mechanically coupled to said HTP;
    said SAR is configured to engage said SIR in a longitudinal axial sliding fit that allows longitudinal axial but not radial movement of said SAR;
    within each of said MAM, said PAT is positioned within said MSE to permit speaker energy generated by said MAM to be emitted from said MSE;
    within each of said MAM, said PAT is configured with an enclosure alignment pathway (EAP) within the MAM that allows said SAR to penetrate through said PAT and said MAM, capturing and securing said MAM in an aligned MAM stack (AMS);
    said SAR is configured for removal from said SIR to allow stacking or unstacking of said MAM on said HTP;
    said CPS comprises a power distribution cord (PDC) that supplies AC power to a plurality of power distribution receptacles configured to distribute AC power to said BCA;
    said BCA comprises a plurality of primary battery chargers (PBC) that are configured to charge batteries contained within each of said MSE; and
    said PBC are each configured with a battery charging cord (BCC) configured for electrical and mechanical connection to each of said MAM;
    wherein said method comprises the steps of:
    (1) stacking said MAMs on said HTP, aligning each said EAP with said SIR on said MHT HTP (0201);
    (2) inserting said SAR through each of said EAP and inserting said SAR into said SIR to form said AMS on said MHT to secure said MAMs to said MHT (0202)
    (3) optionally attaching said CPS to an AC power source, said CPS to said BCA, said BCA PBCs to said MAMs, and charging batteries in said MAM (0203);
    (4) inclining said MHT and rolling said MHT and said AMS assembly to a desired location (0204);
    (5) removing said SAR from said AMS and said SIR (0205); and
    (6) unstacking said MAMs from said HTP and deploying said MAMs to desired positions and then proceeding to step (1) (0206).

12. The mobile audio transportation method of claim 11 wherein said MHT further comprises a hand truck coupler (HTC) (0180) configured to permit mechanical coupling of one MHT to another MHT for the purposes of generating a train of MHTs that may be transported as a unitary entity.

13. The mobile audio transportation method of claim 11 wherein said MHT further comprises a hand truck coupler (HTC) (0180) configured to permit mechanical coupling of one MHT to a powered mobile transportation unit (MTU) for the purposes of transporting one or more of said MHT using said MTU.

14. The mobile audio transportation method of claim 11 wherein said MHT further comprises a hand truck ladder (HTL) (0190) that articulates from said HTF and is configured to provide an A-shaped ladder structure that may be configured in a folded position for transportation or in an extended position for use as a conventional ladder.

15. The mobile audio transportation method of claim 11 wherein said MHT further comprises a hand truck ladder (HTL) (0190) that articulates from said HTF and is configured to provide an A-shaped ladder structure that may be configured in a folded position for transportation or in an extended position for use as a conventional ladder, said A-shaped ladder structure held in said folded and said extended positions by a push-button detent at a vertex of said A-shape that positively locks an angle between said HTF and said HTL.

16. The mobile audio transportation method of claim 11 wherein said MHT further comprises a hand truck handle (HTH) affixed to said HTF.

17. The mobile audio transportation method of claim 11 wherein said MHT comprises two of said SIRs attached to said HTP and two of said SARs in alignment with said two of said SIRs.

18. The mobile audio transportation method of claim 11 wherein said BCA comprises a plurality of bins, each of said bins configured to store and/or mechanically couple one of said PBCs within said BCA.

19. The mobile audio transportation method of claim 11 wherein each of said MAMs comprises a power switch allowing for MAM OFF operation, MAM ON operation, and MAM charging operation.

20. The mobile audio transportation method of claim 11 wherein each of said MAMs comprises a DC power jack configured to accept charging power from one of said PBCs and a visual indicator that displays MAM ON/OFF and CHARGING states.

* * * * *